(12) United States Patent
Begel et al.

(10) Patent No.: US 9,129,038 B2
(45) Date of Patent: Sep. 8, 2015

(54) DISCOVERING AND EXPLOITING RELATIONSHIPS IN SOFTWARE REPOSITORIES

(76) Inventors: Andrew Begel, Seattle, WA (US); Thomas Zimmermann, Bellevue, WA (US); Yit Phang Khoo, Redmond, WA (US); Gina D. Venolia, Bellevue, WA (US)

( * ) Notice: Subject to any disclaimer, the term of this patent is extended or adjusted under 35 U.S.C. 154(b) by 1112 days.

(21) Appl. No.: 12/714,522

(22) Filed: Feb. 28, 2010

(65) Prior Publication Data

US 2010/0211924 A1    Aug. 19, 2010

Related U.S. Application Data

(63) Continuation-in-part of application No. 11/175,568, filed on Jul. 5, 2005, now Pat. No. 7,739,653, which is a continuation-in-part of application No. 11/175,570, filed on Jul. 5, 2005, now Pat. No. 7,743,360.

(51) Int. Cl.
*G06F 9/45* (2006.01)
*G06F 17/30* (2006.01)
*G06F 9/44* (2006.01)

(52) U.S. Cl.
CPC ............ *G06F 17/30958* (2013.01); *G06F 8/74* (2013.01); *G06F 17/30991* (2013.01); *G06F 17/30994* (2013.01)

(58) Field of Classification Search
USPC .......................................................... 717/101
See application file for complete search history.

(56) References Cited

U.S. PATENT DOCUMENTS

| | | |
|---|---|---|
| 5,606,669 A | 2/1997 | Bertin et al. |
| 6,026,362 A | 2/2000 | Kim et al. |
| 6,285,999 B1 | 9/2001 | Page |
| 6,339,776 B2 | 1/2002 | Dayani-Fard et al. |
| 6,523,027 B1 | 2/2003 | Underwood |
| 6,763,360 B2 | 7/2004 | Hartley |
| 6,907,546 B1 | 6/2005 | Haswell et al. |
| 6,931,328 B2 | 8/2005 | Braig et al. |
| 6,983,446 B2 | 1/2006 | Charisius et al. |
| 6,993,710 B1 | 1/2006 | Coad et al. |
| 7,003,560 B1 | 2/2006 | Mullen et al. |
| 7,051,316 B2 | 5/2006 | Charisius et al. |

(Continued)

OTHER PUBLICATIONS

Erkan et al., Lexrank . . . , 2004, Jorunal of AI res., pp. 457-479.*

(Continued)

*Primary Examiner* — John Chavis
(74) *Attorney, Agent, or Firm* — Sandy Swain; Judy Yee; Micky Minhas

(57) ABSTRACT

Software development items can be represented in a graph data structure. Relationships between the represented items can be detected and reflected in the graph data structure. Queries can be run against the data structure to determine which software development items are related to each other. Implicit query can be implemented in a software development context. A graph browser can present panes showing related items.

In some embodiments, a set of regular expressions can be used to identify paths in a graph. Probability scores for the identified paths can be computed. Path data for the identified paths, including the probability scores, can be stored in a searchable location accessible by one or more applications. A query of the path data can be processed to return query results associated with at least one of the identified paths.

21 Claims, 38 Drawing Sheets

(56) References Cited

U.S. PATENT DOCUMENTS

| | | | |
|---|---|---|---|
| 7,117,144 | B2 | 10/2006 | Goodman et al. |
| 7,162,694 | B2 | 1/2007 | Venolia |
| 7,171,646 | B2 | 1/2007 | Charisius et al. |
| 7,185,290 | B2 | 2/2007 | Cadiz et al. |
| 7,266,805 | B2 | 9/2007 | Weidman et al. |
| 7,305,399 | B2 | 12/2007 | Keith, Jr. |
| 7,318,216 | B2 | 1/2008 | Diab |
| 7,398,469 | B2 | 7/2008 | Kisamore et al. |
| 7,418,697 | B2 | 8/2008 | Gryko et al. |
| 7,657,582 | B1 | 2/2010 | Cram et al. |
| 7,721,250 | B2 | 5/2010 | Anand et al. |
| 7,739,653 | B2 * | 6/2010 | Venolia .......................... 717/101 |
| 7,743,360 | B2 | 6/2010 | Venolia |
| 8,214,484 | B2 * | 7/2012 | Arora et al. .................... 709/224 |
| 8,352,445 | B2 | 1/2013 | Begel et al. |
| 2002/0023257 | A1 | 2/2002 | Charisius et al. |
| 2002/0032900 | A1 | 3/2002 | Charisius et al. |
| 2002/0087950 | A1 | 7/2002 | Brodeur et al. |
| 2002/0180689 | A1 | 12/2002 | Venolia |
| 2002/0186257 | A1 | 12/2002 | Cadiz et al. |
| 2002/0188448 | A1 | 12/2002 | Goodman et al. |
| 2003/0131342 | A1 | 7/2003 | Bates et al. |
| 2003/0164862 | A1 | 9/2003 | Cadiz et al. |
| 2003/0182652 | A1 | 9/2003 | Custodio |
| 2005/0010880 | A1 | 1/2005 | Schubert et al. |
| 2005/0204343 | A1 | 9/2005 | Kisamore et al. |
| 2006/0041864 | A1 | 2/2006 | Holloway et al. |
| 2006/0101443 | A1 | 5/2006 | Nasr |
| 2006/0136904 | A1 | 6/2006 | Weidman et al. |
| 2006/0236301 | A1 | 10/2006 | Minium et al. |
| 2007/0143747 | A1 | 6/2007 | Taylor et al. |
| 2007/0204169 | A1 | 8/2007 | Bahl et al. |
| 2007/0250549 | A1 | 10/2007 | Meyer et al. |
| 2007/0261036 | A1 | 11/2007 | Drake et al. |
| 2007/0299825 | A1 | 12/2007 | Rush et al. |
| 2008/0059942 | A1 | 3/2008 | Brown et al. |
| 2008/0148225 | A1 | 6/2008 | Sarkar et al. |
| 2009/0070734 | A1 | 3/2009 | Dixon et al. |
| 2009/0083268 | A1 | 3/2009 | Coqueret et al. |
| 2011/0040808 | A1 | 2/2011 | Joy et al. |
| 2012/0331439 | A1 | 12/2012 | Zimmermann et al. |

OTHER PUBLICATIONS

Ohira, et al., "Accelerating Cross-Project Knowledge Collaboration Using Collaborative Filtering and Social Networks", Retrieved at << http://se.naist.jp/achieve/pdf/26.pdf >>, ACM SIGSOFT Software Engineering Notes vol. 30, Issue 4, Jul. 2005, pp. 111-115.

Huang, et al., "Mining Version Histories to Verify the Learning Process of Legitimate Peripheral Participants", Retrieved at << http://delivery.acm.org/10.1145/1090000/1083158/p16-huang.pdf?key1=1083158&key2=3926815621&coll=GUDIE&dl=GUIDE&CFID=76223536&CFTOKEN=55374898 >>, International Conference on Software Engineering,Proceedings of the 2005 international workshop on Mining software repositories, May 17-17, 2005, pp. 1-5.

Veras, et al., "Comparative Study of Clustering Techniques for the Organization of Software Repositories", Retrieved at << http://ieeexplore.ieee.org/stamp/stamp.jsp?arnumber=04344082 >>, Proceedings of the 7th International Conference on Hybrid Intelligent Systems,Sep. 17-19, 2007, pp. 372-377.

Valetto, et al., "Using Software Repositories to Investigate Sociotechnical Congruence in Development Projects", Retrieved at << http://delivery.acm.org/10.1145/1270000/1269039/29500025.pdf?key1=1269039&key2=7409715621&coll=GUIDE&dl=GUIDE&CFID=74493049&CFTOKEN=27418887 >>, Proceedings of the Fourth International Workshop on Mining Software Repositories,May 20-26, 2007, pp. 4.

Schneider, et al. "Mining a Software Developer's Local Interaction History", Retrieved at << http://msr.uwaterloo.ca/papers/Schneider.pdf >>, In Proceedings of the International Workshop on Mining Software Repositories, 2004, pp. 5.

Canfora, et al., "Ldiff: an Enhanced Line Differencing Tool", Retrieved at << http://delivery.acm.org/10.1145/1560000/1555082/05070564.pdf?key1=1555082&key2=9043815621&coll=GUIDE&dl=GUIDE&CFID=74500879&CFTOKEN=51946585 , Proceedings of the 31st International Conference on Software Engineering, May 16-24, 2009, pp. 595-598.

Zhang, et al., "Mining Software Repositories to Understand the Performance of Individual Developers", Retrieved at << http://ieeexplore.ieee.org/stamp/stamp.jsp?arnumber=04291065 >>, Proceedings of the 31st Annual International Computer Software and Applications Conference—vol. 1, Jul. 24-27, 2007, pp. 2.

Alkhateeb, Faisal, "Querying RDF(S) with Regular Expressions", PhD thesis, Joseph Fourier University of Grenoble, Jun. 2008, pp. 169.

Cencini, Andrew, "SQL Server 2005 Full-Text Search: Internals and Enhancements", Retrieved at << http://msdn.microsoft.com/en-us/library/ms345119(SQL.90).aspx >>, MSDN, Dec. 2003, pp. 1-17.

Anvik, et al., "Who should Fix this Bug?", Retrieved at << http://www.cs.ubc.ca/labs/spl/projects/bugTriage/papers/icse2006.pdf >>, Proceedings of the 28th international conference on Software engineering, May 20-28, 2006, pp. 10.

Aranda, et al., "The Secret Life of Bugs: Going Past the Errors and Omissions in Software Repositories", Retrieved at << http://research.microsoft.com/pubs/81022/SecretICSE.ppt >>, Microsoft Research Publications, May 2009, pp. 1-31.

Ashok, et al., "Debugadvisor: A Recommender System for Debugging", Retrieved at << http://research.microsoft.com/en-us/groups/adp/debugadvisorfse09.pdf >>, Microsoft Research Publications, Aug. 26, 2009, pp. 10.

Begel, et al., "Codebook: Social Networking over Code", Retrieved at << http://research.microsoft.com/pubs/81052/codebook-icse2009.pdf >>, Microsoft Research Publications, Jun. 2009, pp. 4.

Begel, et al., "Coordination in Large-Scale Software Teams", Retrieved at << http://research.microsoft.com/en-us/um/people/abegel/papers/coordination-chase09.pdf >>, Microsoft Research Publications, May 2009, pp. 7.

Cataldo, et al., "2nd International Workshop on Socio-Technical Congruence", Retrieved at << http://delivery.acm. org/10.1145/1590000/1586623/05071070.pdf?key1=1586623&key2=7563915621&coll=GUIDE&dl=GUIDE&CFID=74518640&CFTOKEN=81604801 >>, Proceedings of the 2009 31st International Conference on Software Engineering: Companion Volume, May 16-24, 2009, pp. 476-477.

Cataldo, et al., "Socio-Technical Congruence: A Framework for Assessing the Impact of Technical and Work Dependencies on Software Development Productivity", Retrieved at << http://reports-archive.adm.cs.cmu.edu/anon/isr2008/CMU-ISR-08-104.pdf >>, Proceedings of the Second ACM-IEEE international symposium of Empirical software engingeering and measurement, Oct. 9-10, 2008, pp. 1-20.

Cataldo, et al. "Identification of Coordination Requirements: Implications for the Design of Collaboration and Awareness Tools", Retrieved at << http://portal.acm.org/ft_gateway.cfm?id=1180929&type=pdf&coll=GUIDE&dl=GUIDE&CFID=74519061&CFTOKEN=86616077 >>, Proceedings of the 2006 20th anniversary conference on Computer supported cooperative work, Nov. 4-8, 2006, pp. 353-362.

Consens, et al., "Visualizing and Querying Software Structures", Retrieved at << http://portal.acm.org/ft_gateway.cfm?id=143106&type=pdf&coll=GUIDE&dl=GUIDE&CFID=74519141&CFTOKEN=16979182 >>, Proceedings of the 14th international conference on Softare engineering, May 11-15, 1992, pp. 138-156.

Yurko, Chris; "Search the Web Without Searching: Kenjin analyzes you documents and finds what you need on the Web with surprising accuracy."; PC World; Feb. 11, 2000; pp. 1-2.

De Souza, et al., "Seeking the Source: Software Source Code as a Social and Technical Artefact", Retrieved at << http://www.cs.washington.edu/homes/jfroehli/publications/GROUP2005_SeekingTheSource.pdf >>, Proceedings of the 2005 international ACM SIGGROUP conference on Supporting group work, Nov. 6-9, 2005, pp. 10.

De Souza, et al., "An Empirical Study of Software Developers' Management of Dependencies and Changes", Retrieved at << http://

(56) References Cited

OTHER PUBLICATIONS portal.acm.org/ft_gateway.cfm?id=1368122&type=pdf&coll=GIDE&dl=GUIDE&CFID=74519617&CFTOKEN=93302421 >>, Proceedings of the 30th international conference on Software engineering, May 10-18, 2008, pp. 241-250.
Hassan, Ahmed E., "The Road ahead for Mining Software Repositories", Retrieved at << http://sail.cs.queensu.ca/publications/pubs/FOSM2008Hassan.pdf >>, In Proceedings of the Future of Software Maintenance at the 24th IEEE International Conference on Software Maintenance, 2008. pp. 10.
Hinds, et al., "Structures that Work: Social Structure, Work Structure and Coordination Ease in Geographically Distributed Teams", Retrieved at << http://portal.acm.org/ft_gateway.cfm?id=1180928&type=pdf&coll=GUIDE&dl=GUIDE&CFID=74519894&CFTOKEN=38174928 >>, Proceedings of the 2006 20th anniversary conference on Computer supported cooperative work, Nov. 4-8, 2006, pp. 343-352.
Holmes, et al., "Deep Intellisense: A Tool for Rehydrating Evaporated Information", Retrieved at << http://research.microsoft.com/pubs/75112/deep-intellisense.pdf >>, Proceedings of the 2008 international working conference on Mining software repositories, May 10-11, 2008, pp. 4.
Wood, et al., "Toward a Software Maintenance Methodology using Semantic Web Techniques", Retrieved at << http://www.itee.uq.edu.au/~dwood/papers/TowardASoftwareMaintenanceMethodology.pdf >>, Proceedings of the Second International IEEE Workshop on Software Evolvability, Sep. 24-24, 2006, pp. 8.
Kagdi, et al., "A Survey and Taxonomy of Approaches for Mining Software Repositories in the Context of Software Evolution", Retrieved at << http://www.cs.kent.edu/~jmaletic/papers/JSME07-survey.pdf >>, Journal of Software Maintenance and Evolution: Research and Practice, vol. 19, Issue 2, Mar. 2007, pp. 77-131.
Keifer, et al., "Mining Software Repositories with iSPARQL and a Software Evolution Ontology", Retrieved at << http://portal.acm.org/ft_gateway.cfm?id=1269048&type=pdf&coll=GUIDE&dl=GUIDE&CFID=74520434&CFTOKEN=51311218 >>, Proceedings of the 29th International Conference on Software Engineering Workshops, May 20-26, 2007, pp. 8.
Kochut, et al., "SPARQLeR: Extended Sparql for Semantic Association Discovery", Retrieved at << http://lsdis.cs.uga.edu/~mjanik/KJ07-ESWC2007.pdf >>, Proceedings of the 4th European conference on the Semantic Web: Research and Applications, Jun. 3-7, 2007, pp. 1-15.
"RDS Primer", Retrieved at << http://www.w3.org/TR/REC-rdf-syntax/ >>, W3C, Editor—Dave Beckett, Feb. 10, 2004, pp. 1-32.
Mockus, et al., "Expertise Browser: A Quantitative Approach to Identifying Expertise", Retrieved at << http://portal.acm.org/ft_gateway.cfm?id=581401&type=pdf&coll=GUIDE&dl=GUIDE&CFID=74520885&CFTOKEN=40295523 >>, Proceedings of the 24th International Conference on Software Engineering, May 19-25, 2002, pp. 503-512.
"SPARQL Query Language for RDF", Retrieved at << http://www.w3.org/TR/rdf-sparql-query/ >>, W3C, Editors—Eric Prud'hommeaux & Andy Seaborne, Jan. 15, 2008, pp. 1-66.
Runeson, et al., "Detection of Duplicate Defect Reports using Natural Language Processing", Retrieved at << http://portal.acm.org/ft_gateway.cfm?id=1248882&type=pdf&coll=GUIDE&d1=GUIDE&CFID=74521224&CFTOKEN=44100536 >>, Proceedings of the 29th international conference on Software Engineering, May 20-26, 2007, pp. 10.
Saul, et al., "Recommending Random Walks", Retrieved at << http://portal.acm.org/ft_gateway.cfm?id=1287629&type=pdf&coll=GUIDE&dl=GUIDE&CFID=74521326&CFTOKEN=94976031 >>, Proceedings of the the 6th joint meeting of the European software engineering conference and the ACM SIGSOFT symposium on the foundations of software engineering, Sep. 3-7, 2007, pp. 15-24.
Tarvo, Alexander, "Mining Software History to Improve Software Maintenance Quality: A Case Study", Retrieved at << http://ieeexplore.ieee.org/stamp/stamp.jsp?tp=&isnumber=&arnumber=4721181 >>, IEEE Software, vol. 26, Issue 1, Jan. 2009, pp. 34-40.
Trainer, et al., "Bridging the Gap between Technical and Social Dependencies with Ariadne", Retrieved at << http://portal.acm.org/ft_gateway.cfm?id=1117702&type=pdf&coll=GUIDE&dl=GUIDE&CFID=74521518&CFTOKEN=16540565 >>, Proceedings of the 2005 OOPSALA workshop on Eclipse technology eXchange, Oct. 16-17, 2005, pp. 26-30.
Venolia, Gina, "Textual Alusions to Artifacts in Software-Related Repositories", Retrieved at << http://portal.acm.org/ft_gateway.cfm?id=1138018&type=pdf&coll=GUIDE&dl=GUIDE&CFID=74521576&CFTOKEN=79317830 >>, Proceedings of the 2006 international workshop on Mining software repositories, May 22-23, 2006, pp. 151-154.
Zimmermann, et al., "Mining Version Histories to Guide Software Changes", Retrieved at << http://www.st.cs.uni-saarland.de/papers/icse2004/icse.pdf >>, Proceedings of the 26th International Conference on Software Engineering, May 23-28, 2004, pp. 1-10.
Cadiz, J.J. et al.; "Designing and Deploying an Information Awareness Interface"; Proceedings of the 2002 ACM Conference on Computer Supported Cooperative Work; Aug. 20, 2002; pp. 314-323.
Čubranić, Davor et al.; "Hipikat: Recommending Pertinent Software Development Artifacts"; Department of Computer Science, University of British Columbia, 201-2366 Main Mall, Vancouver BC, Canada V6T 1Z4; 2003; pp. 1-12.
Dumais, Susan; "Beyond Content-Based Retrieval: Modeling Domains, Users, and Interaction"; http://research.microsoft.com/~sdumais; May 21, 1998; pp. 1-45.
Dumain, Susan et al.; "Stuff I've Seen: A System for Personal Information Retrieval and Re-Use"; Microsoft Research, One Microsoft Way, Redmond, WA 98052 USA; Aug. 1, 2003; pp. 1-8.
Fremuth-Paeger; "GOBLIN: A Graph Object Library for Network Programming"; http://www.math.uni-augsburg.de/opt/goblin.html; May 20, 2005; pp. 1-13.
Kaiser, Gail E. et al.; "An Architecture for Intelligent Assistance in Software Development"; Proceedings of the 9th International Conference on Software Engineering; 1987; pp. 1-9.
Kanellos, Michael; "Microsoft Aims for Search on its own Terms"; http://news.com.com/Microsoft+aims+for+search+on+its+own+terms/2001-1008_3-5110910.html; Nov. 24, 2003; pp. 1-4.
Mathys, Yves; "A Graph Browser for Large Directed Graphs"; Motorola Inc. Semiconductor Systems Design Technology; 1992; pp. 1-6.
Perforce; "The Perforce SCM System"; http://www.perforce.com/perforce/products.html; May 24, 2005; pp. 1-2.
Siracusa; "Mac OS X 10.0"; arstechnica; http://arstechnica.com/reviews/01q2/macos-x-fina;/macos-x-10.html; May 20, 2005; pp. 1-6.
Sullivan, Tom; "Microsoft Researchers Discuss Forthcoming End-User .NET Functionality"; http://www.infoworld.com/articles/hn/xml/01/09/05/010905hnmsfuture.html; Sep. 5, 2001; pp. 1-4.
Venolia, Gina et al.; "Understanding Sequence and Reply Relationships within Email Conversations: A Mixed-Model Visualization"; Technical Report, MSR-TR-2002-102, Revised Jan. 13, 2003; Sep. 23, 2002; pp. 1-9.
www.technewsworld.com; "Search Beyond Google"; Posted to addict3d.org; Feb. 3, 2004; pp. 1-10.
Brun, et al.; "Speculative Analysis: Exploring Future Development States of Software"; Proceedings of the Workshop on the Future of Software Engineering Research; Nov. 7-8, 2010; pp. 59-64.
Buse, et al.; "Information Needs for Software Development Analytics"; MSR-TR-2011-8; Microsoft Research; Jan. 30, 2011; pp. 16.
Cubranic, D. et al.; "Hipikat: A Project Memory for Software Development"; IEEE Transactions on Software Engineering; vol. 31, No. 6; Jun. 2005; pp. 446-465.
Hindle, A. et al.; "Software Process Recovery: Recovering Process from Artifacts"; 17th Working Conference on Reverse Engineering; Oct. 13-16, 2010; Beverly, Massachusetts; pp. 305-308.
Lucia, A. et al.; "Traceability Management for Impact Analysis"; Frontiers of Software Maintenance; Sep. 28-Oct. 4, 2008; Beijing, China; pp. 21-30.
U.S. Appl. No. 13/165,811, filed Jun. 22, 2011.

(56) References Cited

OTHER PUBLICATIONS

U.S. Appl. No. 11/175,568, filed Jul. 5, 2005.
U.S. Appl. No. 11/175,570, filed Jul. 5, 2005.
Cataldo, et al., "2nd International Workshop on Socio-Technical Congruence", Retrieved at <<http://delivery.acm.org/10.1145/1590000/1586623/05071070.pdf?key1=1586623&key2=7563915621&coll=GUIDE&dl=GUIDE&CFID=74518640&CFTOKEN=81604801>>, Proceedings of the 2009 31st International Conference on Software Engineering: Companion Volume, May 16-24, 2009, pp. 476-477.
Buse, Raymond PL, and Thomas Zimmermmann, "Analytics for software development", Proceedings of the FSE/SDP Workshop on Future of Software Engineering Research, ACM, 2010, pp. 77-80.
Trkman, et al., "The Impact of Business Analytics on Supply Chain Performance", Elsevier, Decision Support Systems 49, 2010, pp. 318-327.
Telea, et al., "Visual Software Analytics for the Build Optimization of Large-Scale Software Systems", Springer 2011, pp. 635-654.
"Eclipse Metrics plugin", Retrieved at <<http://sourceforge.net/p/metrics/news/?page=0>> and <<http://sourceforge.net/p/metrics/news/?page=1>>, 2013, SourceForge, 5 pages.
Wilcox, Glen, "Managing Your Dependencies with JDepend", Retrieved at <<http://www.onjava.com/pub/a/onjava/2004/01/21/jdepend.html>>, Jan. 21, 2004, 3 pages.
"Metrics 1.3.5—Getting started", Retrieved at <<http://web.archive.org/web/20050703020346/http:/metrics.sourceforge.net/>>, Wayback Machine, SourceForge.net, Jul. 3, 2005, 9 pages.
"Metrics 1.3.6—Getting started", Retrieved at <<http://web.archive.org/web/20100214223536/http:/metrics.sourceforge.net/>>, Wayback Machine, SourceForge.net, Feb. 14, 2010, 10 pages.
"Intellisense for Vim", Sourceforge, Retrieved at: http://sourceforge.net/docman/display_doc.php?docid=19936&group_id=94700, Reprinted from the Internet on Feb. 28, 2008.
"Visual Basic IntelliSense Code Snippets", http://msdn.microsoft.com/en-us/library/18yz4be4(VS.80).aspx, Reprinted from the Internet on Feb. 28, 2008.
Begel, et al., "Codebook: Discovering and Exploiting Relationships in Software Repositories", in Proceedings of the ACM/IEEE 32nd International Conference on Software Engineering, May 2010.
Biehl, et al., "FASTdash: A Visual Dashboard for Fostering Awareness in Software Teams," in Proceedings of CHI, pp. 1313-1322, San Jose, CA, 2007, ACM Press.
Curtis, et al, "A Field Study of the Software Design Process for Large Systems", CACM, 31 (11): 1268-1287, 1988.
Hipikat, "Recommending Useful Software Artifacts", http://www.cs.ubc.ca/tabs/spi/projects/hipikat/, Reprinted from the Internet on May 22, 2008, 1 page.
Fitzpatrick, et al., "CVS Integration with Notification and Chat: Lightweight Software Team Collaboration", in Proceedings of CSCW, pp. 49-58, Banff, Alberta, Canada, 2006, ACM Press.
Harrison, et al., "Re-place-ing Space: The Roles of Place and Space in Collaborative Systems", in CSCW '96: Proceedings of the 1996 ACM Conference on Computer Supported Cooperative Work, pp. 67-76, New York, NY, USA, 1996, ACM.
Herbsleb, et al., "Splitting the Organization and Integrating the Code: Conway's Law Revisited", in Proceedings of ICSE, 1999, pp. 85-95.
Holt, R.C., "Grokking Software Architecture", in Proceedings of WCRE, pp. 5-14, 2008.
Hupfer, et al., "Introducing Collaboration Into an Application Development Environment", in Proceedings of CSCW, pp. 21-24, Chicago, IL, 2004. ACM Press.
Ko, et al, "Information Needs in Collocated Software Development Teams", in Proceedings of ICSE, 2007, pp. 344-353.
Kraut, et al., "Coordination in Software Development", CACM, 38(3): 69-81, 1995.
LaToza, et al., "Maintaining Mental Models: A Study of Developer Work Habits", in Proceedings of ICSE, 2006, pp. 492-501.
McCarey, et al., "A Case Study on Recommending Reusable Software Components using Collaborative Filtering", Proceedings of Mining Software Repositories (MSR) Workshop, Edinburgh, Scotland, UK, May 2004, 5 pages.
Mockus, et al., "Two Case studies of Open Source Software Development: Apache and Mozilla", ACM TOSEM, 11(3): 309-346, 2002.
Perry, et al., "People, Organizations, and Process Improvement", in IEEE Software, 11(4): 36-45, 1994.
Poile, et al., "Coordination in Large-Scale Software Development: Helpful and Unhelpful Behaviors", in submission, Sep. 28, 2009.
Sarma, et al., "Palantir: Raising Awareness Among Configuration Management Workspaces", in Proceedings of ICSE, pp. 444-454. Portland, Oregon, 2003. IEEE Computer Society.
Sillito, et al., "Questions Programmers Ask During Software Evolution Tasks", in Proceedings of FSE, pp. 23-34, 2006.
Singer, J., "Practices of Software Maintenance", in Proceedings of ICSM, pp. 139-145, 1998.
Stecher, et al., "Thin Slices of Online Profile Attributes", in Proceedings of International Conference on Weblogs and Social Media, Seattle, WA, Mar. 2008.
Sugumaran, et al., "A Semantic-Based Approach to Component Retrieval", The Data Base for Advances in Information Systems—Summer 2003 (vol. 34. No. 3). Pages 8-24.
"Non-Final Office Action," From U.S. Appl. No. 12/126,251, Filed Date: May 23, 2008, Mailed Date: Jun. 17, 2011.
"Response to the Jun. 17, 2011 Non-Final Office Action," From U.S. Appl. No. 12/126,251, Filed: Sep. 19, 2011.
"Applicant Initiated Interview Summary," From U.S. Appl. No. 12/126,251, Mailed: Sep. 23, 2011.
"Final Office Action," From U.S. Appl. No. 12/126,251, Mailed: Dec. 7, 2011.
"Applicant Initiated Interview Summary," From U.S. Appl. No. 12/126,251, Mailed: Feb. 24, 2012.
"Response to the Dec. 7, 2011 Final Office Action," From U.S. Appl. No. 12/126,251, Filed: Mar. 6, 2012.
"Notice of Allowance," From U.S. Appl. No. 12/126,251, Mailed: Mar. 19, 2012.
"Notice of Allowance," From U.S. Appl. No. 12/126,251, Mailed: Aug. 31, 2012.

\* cited by examiner

| RE: BUG 57 CLOSED |
|---|
| FROM: GINAV<br>TO: DEVB<br>CC: DEVC<br>WOW, THAT BUG IS FIXED ALREADY? THE LAST TIME WE HAD TROUBLE WITH THE INDEX, IT TOOK TWO DAYS TO FIX ISERVEREXTENSION.NEWQUERY. I GUESS OUR NEW TOOLS ARE HELPING THE DEVS.<br><br>GINA        1600 |

...
I THOUGHT THAT BUG 153 WAS A
CINCH TO FIX
...

...
AS OF TODAY, ACCOUNT.ADD
ISN'T WORKING AGAIN. CAN YOU
CHECK THE . . .
...

DISCOVERING AND EXPLOITING RELATIONSHIPS IN SOFTWARE REPOSITORIES

This application is a continuation-in-part of, and claims priority to, U.S. application Ser. No. 11/175,568, filed Jul. 5, 2005 and U.S. application Ser. No. 11/175,570, filed Jul. 5, 2005, the disclosures of which are both incorporated by reference herein in their entireties.

BACKGROUND

Developing software can be difficult, especially when coordinating many software development tasks within a group or between groups of developers. Typically, different developers spend their time planning, writing or revising different parts of the software project. Some developers may be tracking down bugs, others are fixing the bugs, and still others may be adding new features to the software. Communication between developers and groups is critical to coordinate efforts because no single developer can possibly know every detail about the project.

During the development process, a developer often wishes to become familiar with the history of a piece of code. Knowing how the code fits in with the rest of the project can help determine how the developer proceeds when modifying the code. So, for example, the developer might want to know who on the development team is most familiar with the code.

However, determining which of the developers to contact is not always easy. For example, the code may have been modified by a variety of developers for a variety of reasons. The developer might consult a number of sources, such as emails, the source code store, and a bug tracking database. However, it may be difficult or impossible to find an answer via these resources because of the time required to sift through them.

On a large project, one of the developers may take up the role of project historian. The historian can be a valuable resource who can recount which developers worked on what code and can identify the developers who are most likely to be familiar with a particular issue or piece of code. However, even the historian cannot possibly know the entire history of the software project and may eventually leave the development team to pursue other projects. Further, if the software team is separated geographically, it may be impossible to consult the historian in a face-to-face conversation.

SUMMARY

A graph browser can present items represented as nodes in a graph. In some embodiments, a set of regular expressions can be used to identify paths in the graph. Probability scores for the identified paths can be computed. Path data for the identified paths, including the probability scores, can be stored in a searchable location accessible by one or more applications. A query of the path data can be processed to return query results associated with at least one of the identified paths.

The foregoing and other features and advantages will become more apparent from the following detailed description of disclosed embodiments, which proceeds with reference to the accompanying drawings.

BRIEF DESCRIPTION OF THE FIGURES

FIG. 17A is a block diagram showing exemplary recognition of a mention of a bug within plain text.

FIG. 17B is a block diagram showing exemplary recognition of a mention of a method within plain text.

FIG. 28 is a screen shot showing an exemplary user interface implementing a graph browser to browse a graph data structure constructed according to the technologies described herein.

DETAILED DESCRIPTION

Example 1

Exemplary System Employing a Combination of the Technologies

Figure 1:
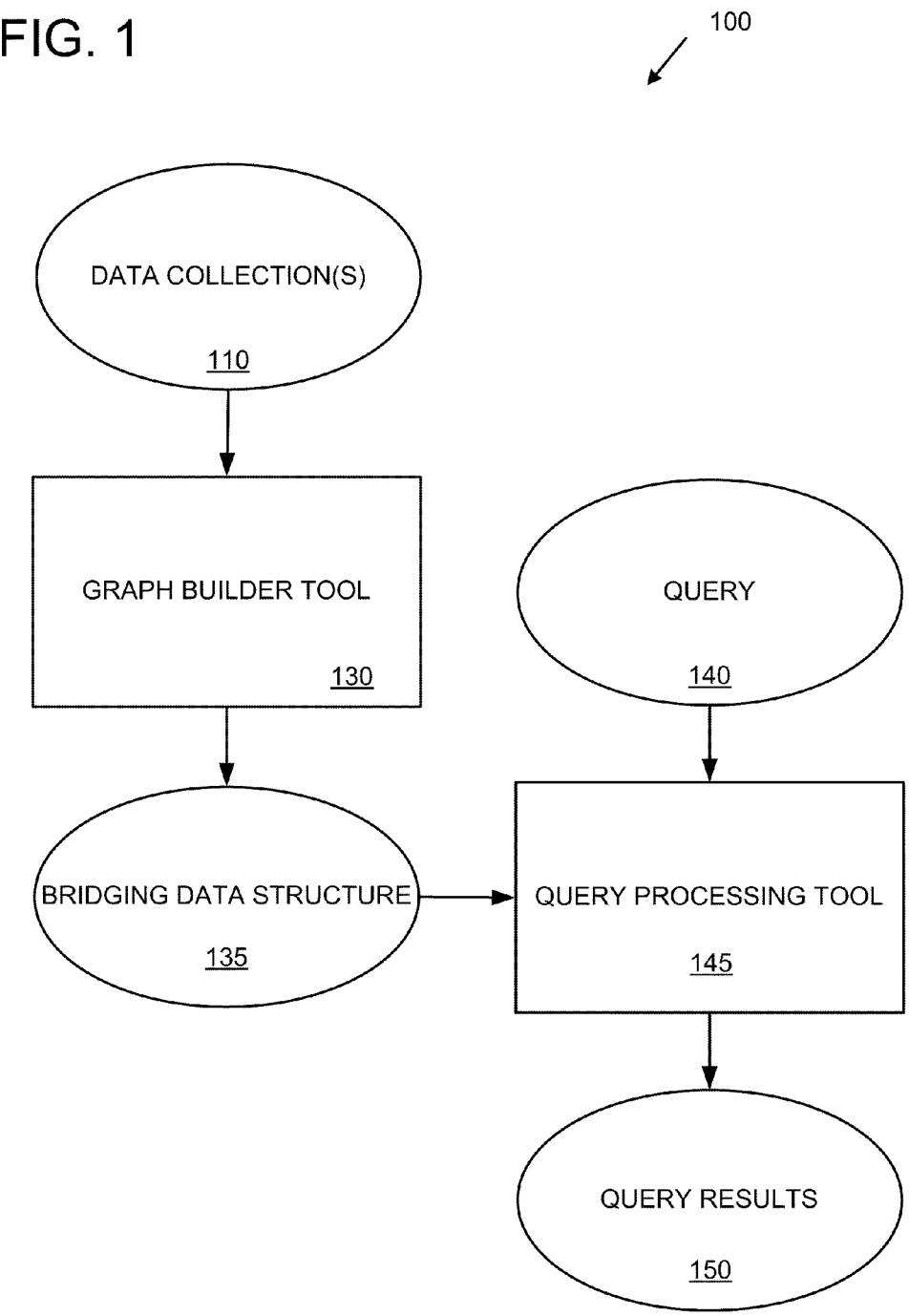
FIG. 1 is a block diagram of an exemplary system employing a combination of the technologies described herein.

FIG. 1 is a block diagram of an exemplary system 100 employing a combination of the technologies described herein. Such a system 100 can be provided separately or as part of a software development environment. In the example, a graph builder tool 130 takes one or more data collections 110 as input and generates a bridging data structure 135 representing software development items and relationships between them. The bridging data structure 135 is sometimes called an "index" and can include any of a variety of forms (e.g., a graph represented by a database or other data structure). A query tool 145 makes use of the bridging data structure 135 when it accepts a query 140 for software development items. In response to the query 140, the query tool 145 generates the query results 150.

Example 2

Exemplary System Employing a Combination of the Technologies

Figure 2:
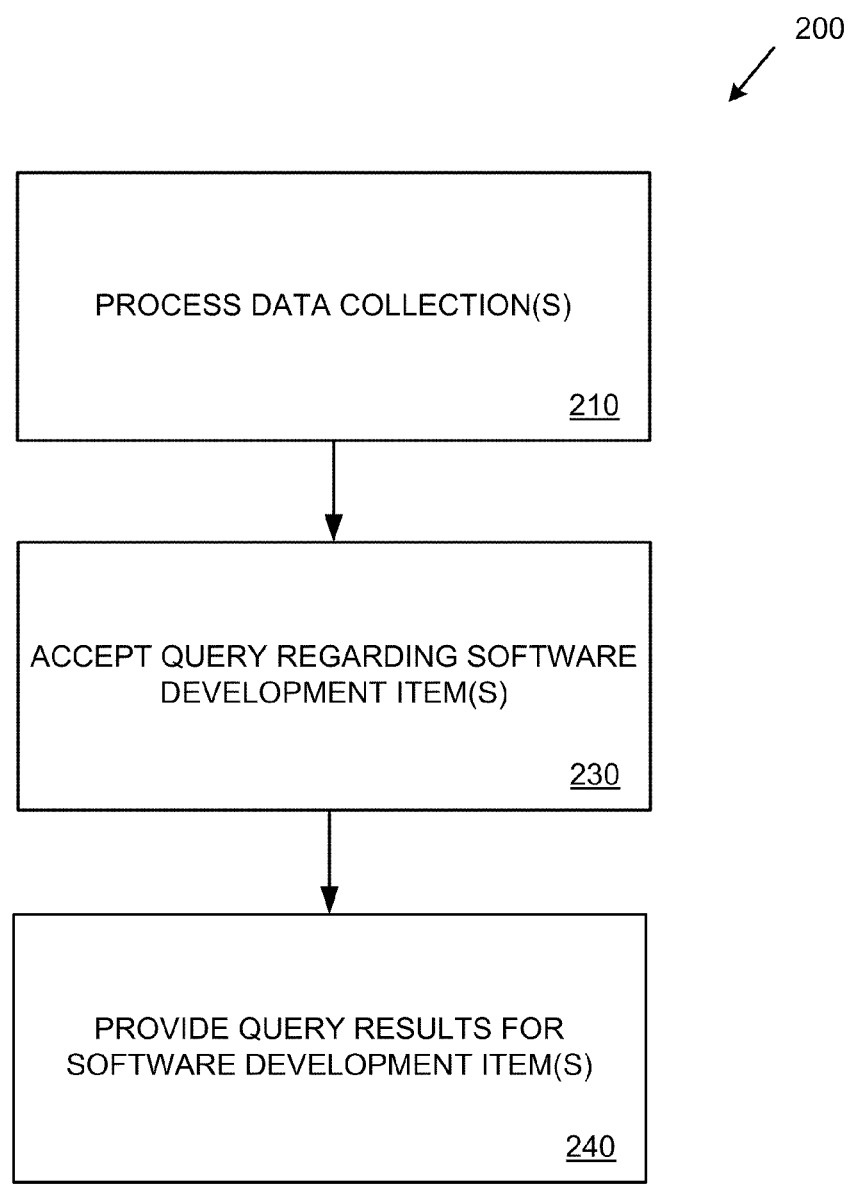
FIG. 2 is a flowchart of an exemplary method employing a combination of the technologies described herein and can be implemented in a system such as that shown in FIG. 1.

FIG. 2 is a flowchart of an exemplary method 200 employing a combination of the technologies described herein and can be implemented in a system such as that shown in FIG. 1. In the example, at 210 the one or more data collections (e.g., the data collections 110 of FIG. 1) are processed. As described herein, the processing can include generating a graph data structure (e.g., the bridging data structure 135) representing software development items and relationships between them.

At 230, a query is accepted regarding one or more software development items. In any of the examples described herein, a query can be determined via explicit or implicit techniques.

At 240, results of the query can be provided to indicate software development items as determined via the query.

Example 3

Figure 3:
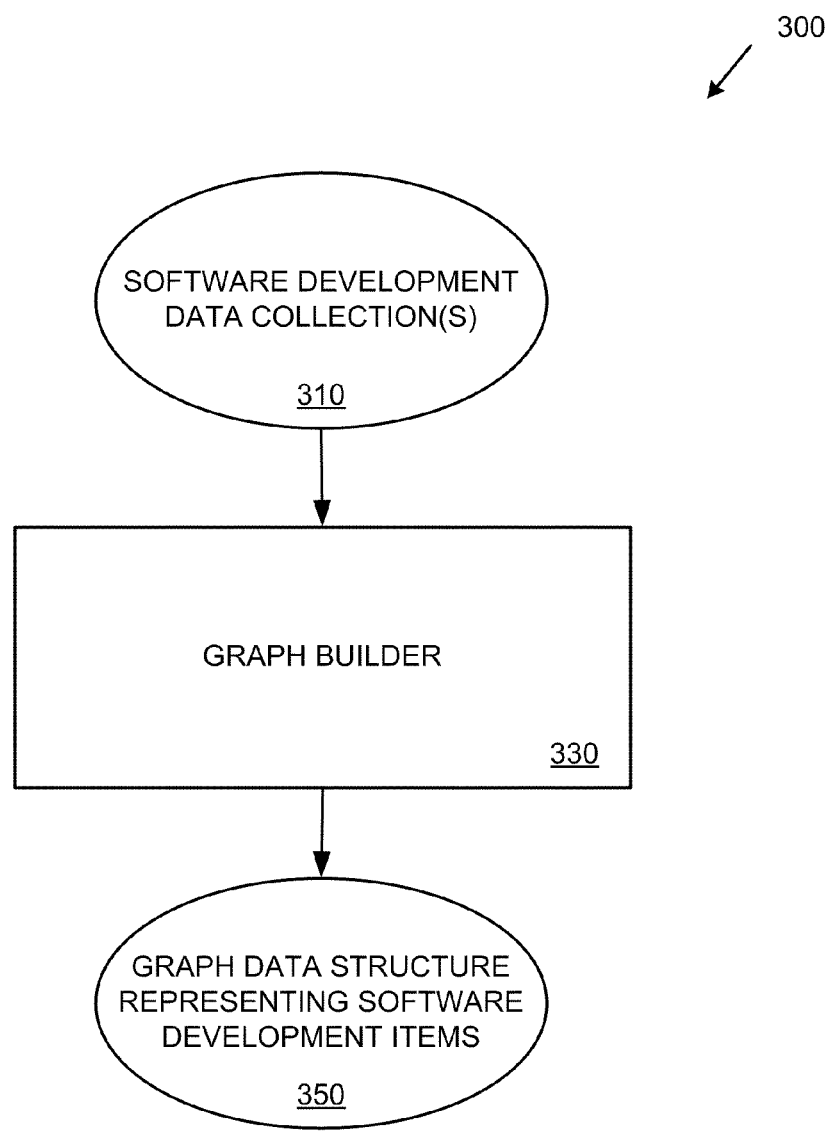
FIG. 3 is a block diagram of a system generating a graph data structure representing software development items based on one or more software development data collections.

Exemplary System Generating a Graph Data Structure Representing Software Development Items FIG. 3 is a block diagram of a system 300 generating a graph data structure representing software development items based on one or more software development data collections. In the example, a graph builder tool 330 can accept one or more software development data collections as input 310 and generate a graph data structure 350 representing software development items based on (e.g., detected in or mentioned in) the data collections 310. The graph builder tool 330 can be a creator of the graph 350, a modifier of the graph 350, or both.

Example 4

Figure 4:
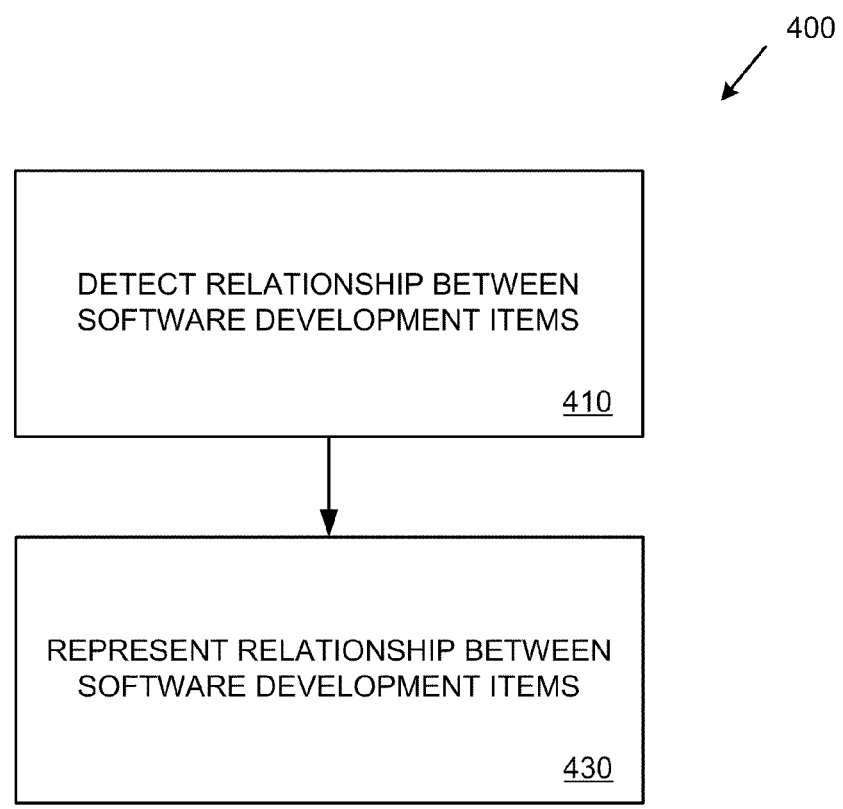
FIG. 4 is a flowchart of an exemplary method of building a data structure that represents relationships between software development items and can be used in a system such as that shown in FIG. 3.

Exemplary Method of Generating a Graph Data Structure Representing Software Development Items FIG. 4 is a flowchart of an exemplary method of building a graph data structure that represents relationships between software development items and can be used in a system such as that shown in FIG. 3. In the example, at 410, a relationship is detected (e.g., in a data collection) for a plurality of the software development items represented in the graph. At 430, the relationship between the software development items is represented. Such relationships can be represented by modifying the graph data structure. Modification can include addition one or more nodes, adding one or more edges, changing values for one or more nodes, changing values for one or more edges, or some combination thereof.

In practice, a method generating a graph data structure can also create nodes representing the software development items based on (e.g., detected in or mentioned in) a data collection.

Example 5

Exemplary Software Development Items

In any of the examples described herein, a variety of software development items can be represented. Software development items can include any identifiable item related to software development. An identifiable item related to software can include persons (e.g., engineers, managers, developers, testers, users, customers) or any other type of item related to software and its development.

Software development items can include programming language constructs such as object classes, methods, structures, enumerated types, enumerated type constants, and the like.

Software development items can also include the developers working on the software. Such developers can be identified by a plain language name, a user name, or an email address or alias.

Other software development items can include items tracked during the development process, such as software bugs, code check-ins, changes to source code, software features, and the like.

Further, specifications or other documents containing information on the software being developed can be included as software development items. For example, files such as word processing documents, spreadsheets, slide shows, and the like can be software development items. As another example, data that is analyzable into a structure, such as data stored in columns, cells, data structure components/sections, and the like can be considered a software development item(s). Further, the locations of documents (e.g., file paths or URLs) can also be software development items.

Also, emails sent by a developer or containing information on any of the other software development items can be software development items and represented accordingly.

Example 6

Exemplary Data Collections

A data collection can include any collection of data related to software development. In practice, such data collections can include an email database associated with communications between developers, a bug tracking database, an issue tracking database, a source code store, and other databases or data collections.

In addition, one or more documents (e.g., word processing documents, spreadsheets, slide shows, and the like) can be a data collection.

A data collection can include structured information, unstructured information, semi-structured information, or some combination thereof. Further, a data collection can include plain text. Any data collection can serve as a source of information from which nodes are created (e.g., by a graph builder tool) to represent the software development items detected or mentioned therein.

Example 7

Exemplary Relationships

In any of the examples herein, nodes representing software development items can be indicated as related, thus indicating a relationship between the represented software development items. For example, an edge can connect two nodes to indicate that the two represented software development items are related. Such a node may or may not indicate the type of relationship.

Examples of possible relationships include contains, mentions, received, sent, has a reply, authored, etc. Such relationships may be directed. A reverse direction may indicate a reciprocal relationship (e.g., contained by, mentioned in, received by, sent by, is a reply to, authored by, etc.)

Relationships can be between two different types of nodes. For example, a software developer can be related to a software development item other than a developer.

Relationships can take the form of explicit relationships, implicit-but-exact relationships, ambiguous relationships (e.g., with an associated confidence score), textual relationships, and textual allusion relationships.

Relationships can be direct or indirect. For example, an email may directly indicate its sender and what was mentioned in the email. The sender is thus indirectly indicated as related to what was mentioned in the email. In this way, if two bugs are mentioned by a same sender, the two bugs are indirectly indicated related.

Example 8

Exemplary Plain Text

In any of the examples herein, plain text can include any natural language text that is meant to be read by a human being. Examples of plain text include the text of emails, email subjects lines, notes fields, comments fields, description fields, and the like. Plain text can also be found in word processing documents, spreadsheets, slide shows, and the like. Mentions of software development items (e.g., identifiers, names, and the like) can appear in plaintext documents. Upon detection of such mentions, a graph data structure can be updated (e.g., an edge can be created) to indicate that the software development item was mentioned in a portion of the plain text.

In addition, in the software development context, plain text can appear in source code, bug reports, bug resolution descriptions, notes associated with source code check-ins, and the like.

In any of the examples herein, the technologies applied to plain text can also be applied to linguistic text, such as any text that is intended to be read by users in a natural language (e.g., English, Italian, Chinese, and the like).

Because a graph data structure can indicate the plain text mentions of software development items, it is possible that two different software development items are mentioned in the same portion plain text (e.g., an email body). In such a case, two edges (e.g., one for each software development item) may connect to a same node (e.g., representing the email) to indicate that the two software development items were mentioned in the same portion of plain text. In this way, the two items are related in the graph data structure. Such a relationship may be helpful when attempting to research either of the software development items during development (e.g., to learn that the two development items are somehow connected).

Example 9

Exemplary Disconnected Data Collections

In any of the examples herein, two or more of the data collections can be disconnected. A disconnected data collection can include any data collection that is logically stored separately from another data collection. Separate storage can also be characterized by different formats for storing the data, different clients for accessing the data, different clients for searching the data, different clients for querying the data, a different protocol for accessing the data, or other heterogeneous characteristics. Such disconnected data collections are sometimes called "data silos" because the data is effectively shielded from full connectivity with data in other silos. For example, the application used with one data silo typically cannot access or query the data in another silo. Thus, one query cannot pull data from both silos. Email databases are typically disconnected from any other data collection. Thus, email and a non-email data collection are considered to be disconnected.

Examples of disconnected data collections include an email database and a bug tracking database; an email database and a source code management database; a source code management database and a bug tracking database; and a bug tracking database and an email database. A disconnected data collection can also take the form of one or more unstructured documents (e.g., a word processing document, a spreadsheet, a slide show, or the like).

Example 10

Exemplary System Bridging Disconnected Data Collections

Figure 5:
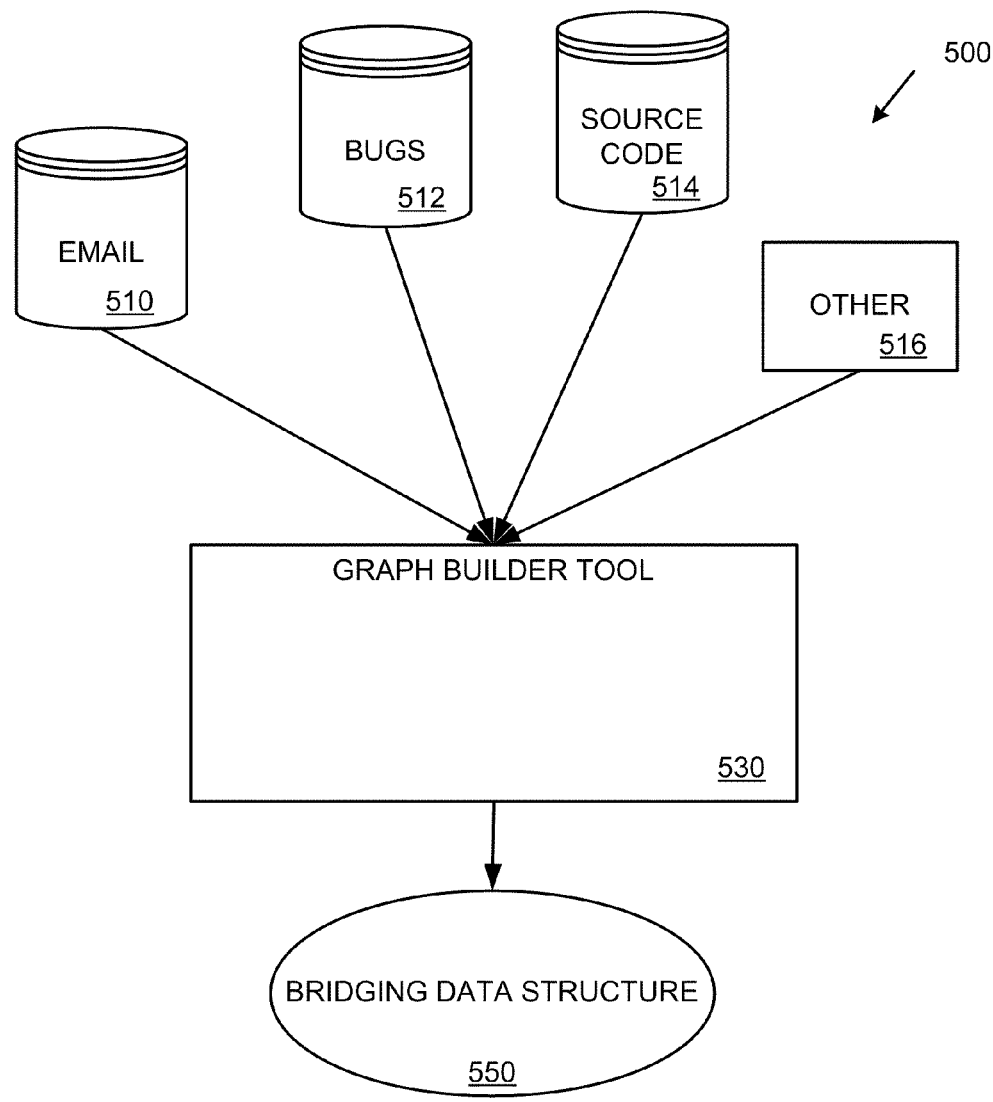
FIG. 5 is a block diagram of an exemplary system for creating a bridging data structure based on a plurality of disconnected data collections.

FIG. 5 is a block diagram of an exemplary system 500 for creating a bridging data structure based on a plurality of disconnected data collections. The bridging data structure can take the form of any of the graph data structures described herein.

In the example, a graph builder tool 530 creates a bridging data structure 550 based on the disconnected data collections 510, 512, 514, and 516. The bridging data structure can indicate relationships detected between the various software development items that are involved in the software development project related to or discussed in the disconnected data collections.

As shown in the example, the disconnected data collections can include an email database 510 (e.g., used by an email server to store the contents of emails and related information), a bug management database 512, a source code management database (e.g., 514), other data collections 516 (e.g., documents), or some combination thereof.

Example 11

Exemplary System Bridging Disconnected Data Collections Via Recognizer(s)

Figure 6:
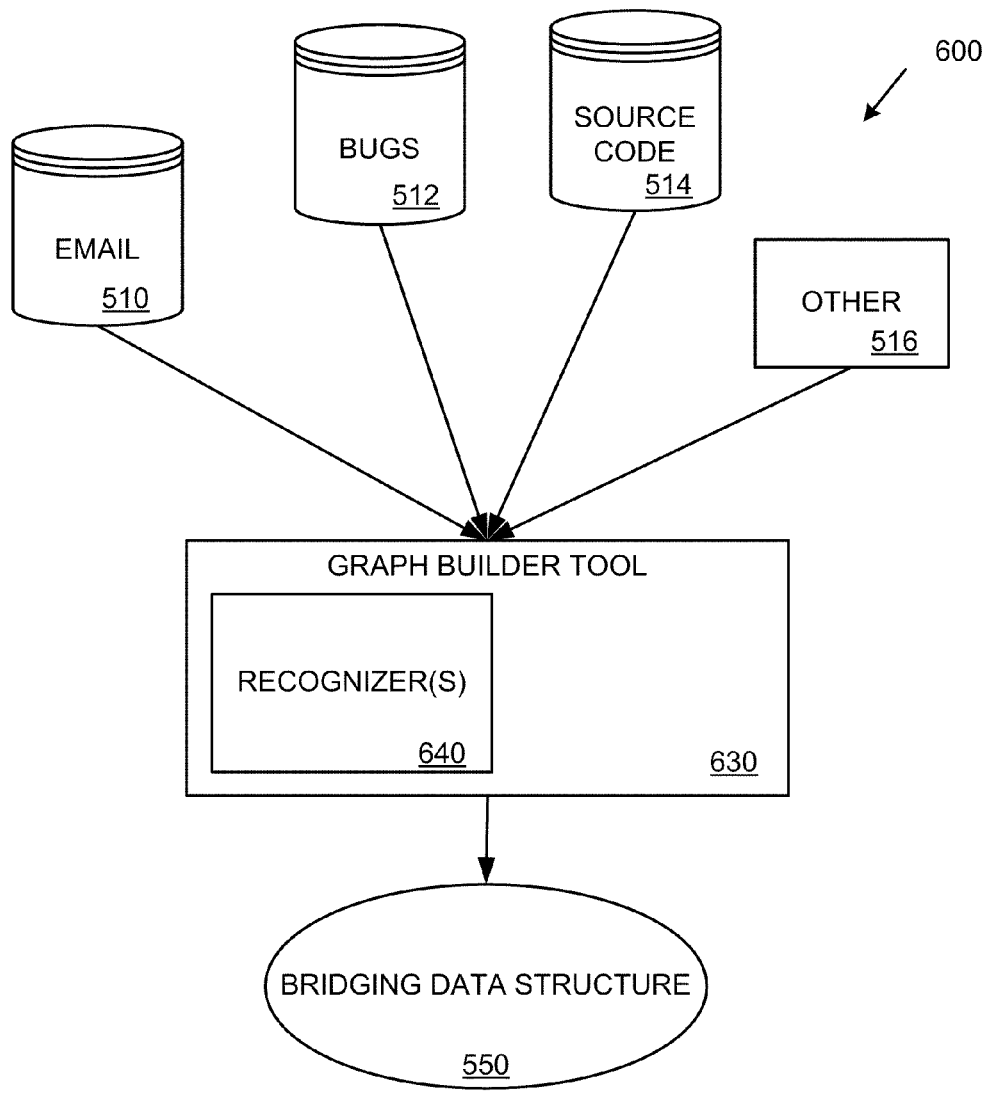
FIG. 6 is a block diagram of an exemplary system for creating a bridging data structure based on a plurality of disconnected data collections via one or more recognizers.

FIG. 6 is a block diagram of an exemplary system 600 for creating a bridging data structure based on a plurality of disconnected data collections via one or more recognizers 640. The system can be similar to that shown in FIG. 5, except that the graph builder tool 630 can include one or more recognizers 640.

The recognizers 640 can examine the content of text within the disconnected data collections to detect relationships between software development items (e.g., if a mention of a software development item is recognized as appearing in plain text).

Example 12

Exemplary Graph Data Structure for Representing Software Development Items

Figure 7:
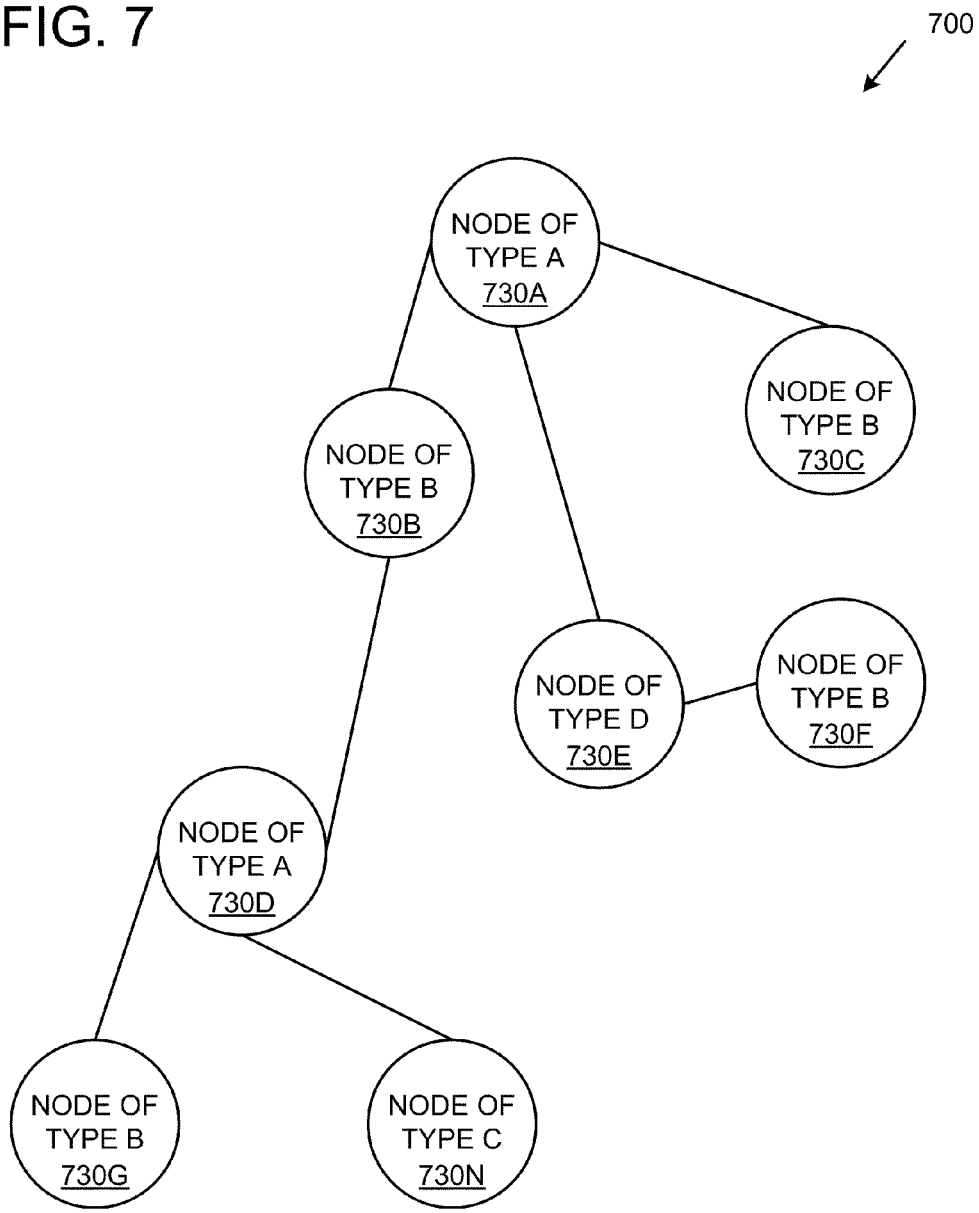
FIG. 7 is a diagram showing an exemplary graph data structure for representing software development items.

FIG. 7 shows an exemplary graph data structure 700 that can be used in any of the examples herein for representing software development items. In the example, nodes of different types represent different respective types of software development items. For example, a node of type A (e.g., 730A, 730D) can represent an email. A node of type B (e.g., 730B, 730C, 730F, 730G) can represent a developer (e.g., who sent or received an email). A node of type D can represent a bug. For example, the different types of nodes can be represented by different object classes, resulting in a heterogeneous collection of typed nodes.

Example 13

Figure 8:
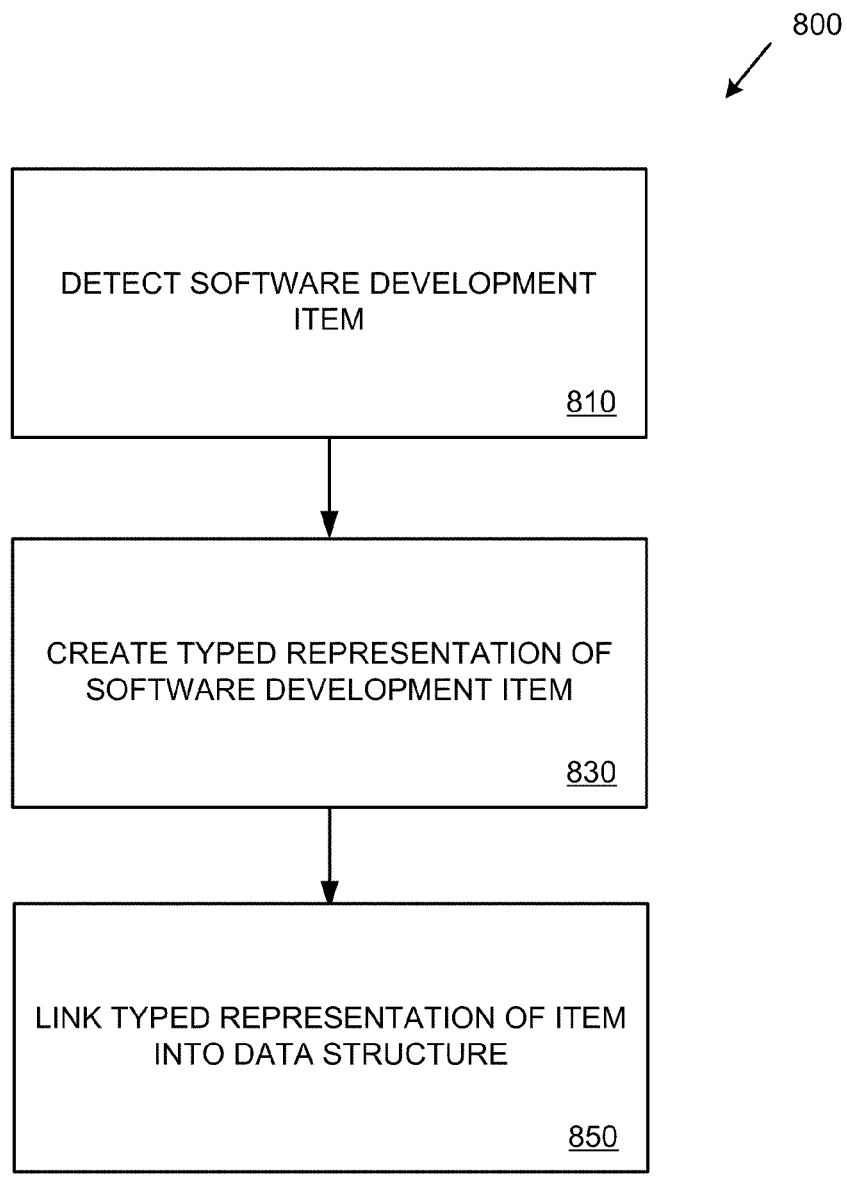
FIG. 8 is a flowchart showing an exemplary method of creating a typed data structure for representing software development items, such as that shown in FIG. 7.

Exemplary Method of Creating Graph Data Structure for Representing Software Development Items FIG. 8 is a flowchart showing an exemplary method of creating a typed data structure for representing software development items, such as that shown in FIG. 7. In the example, at 810 a software development item is detected. At 830, responsive to detection of the software development item, a typed representation of the software develop item is created. For example, as described in Example 12, different types of nodes can represent respective different types of software development items.

At 850, the typed representation is linked into the data structure. For example, an edge can link a node into a graph data structure.

Example 14

Exemplary Weighted Edges

In any of the examples described herein, edges in the graph data structure can be weighted to indicate a value (e.g., cost or strength) for the edge. If desired, the edge can have two values, indicating a value when traversing the edge in one or the other direction. Such a value can indicate a perceived (e.g., semantic) strength relationship between the items. For example, if an item is mentioned several times in an email, the relationship may be stronger. So, the edge connecting the item and the email can be weighted accordingly as compared to an item that is mentioned only once in the same email.

Another use for edge weightings is to indicate a confidence score. In the case of a recognizer, confidence of the relationship can be indicated or otherwise factored into edge weight.

Example 15

Figure 9:
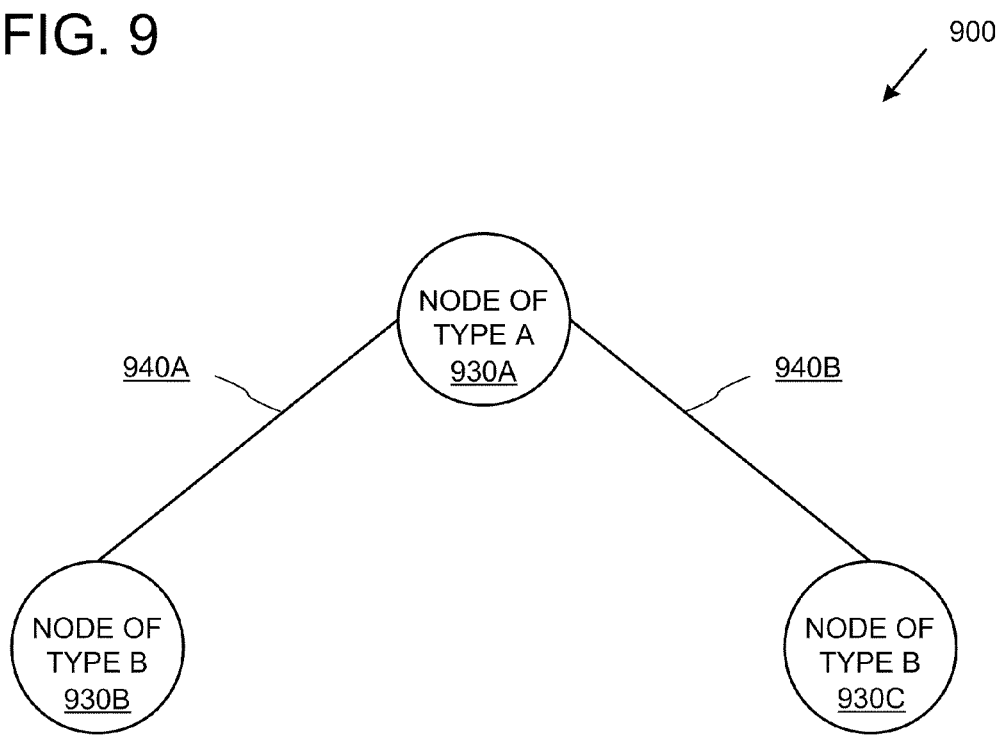
FIG. 9 is a diagram of an exemplary graph data structure comprising typed edges to indicate a relationship type between represented software development items.

Exemplary Graph Data Structure for Representing Relationships Between Software Development Items Via Typed Edges FIG. 9 shows an exemplary graph data structure 900 comprising typed edges to indicate a relationship between represented software development items. Such an arrangement can be used to indicate relationships in any of the examples herein.

In the example, a node 930A is connected to another node 930B via an edge 940A and the node 930A is connected to another node 930C via an edge 940B. The edges 940A and 940B can be of different types to indicate different relationships. For example, one type of edge 940A can indicate a sent/sent-by relationship and another type of edge 940B can indicate a received/received-by relationship. For example, the different types of edges can be represented by different object classes.

Example 16

Figure 10:
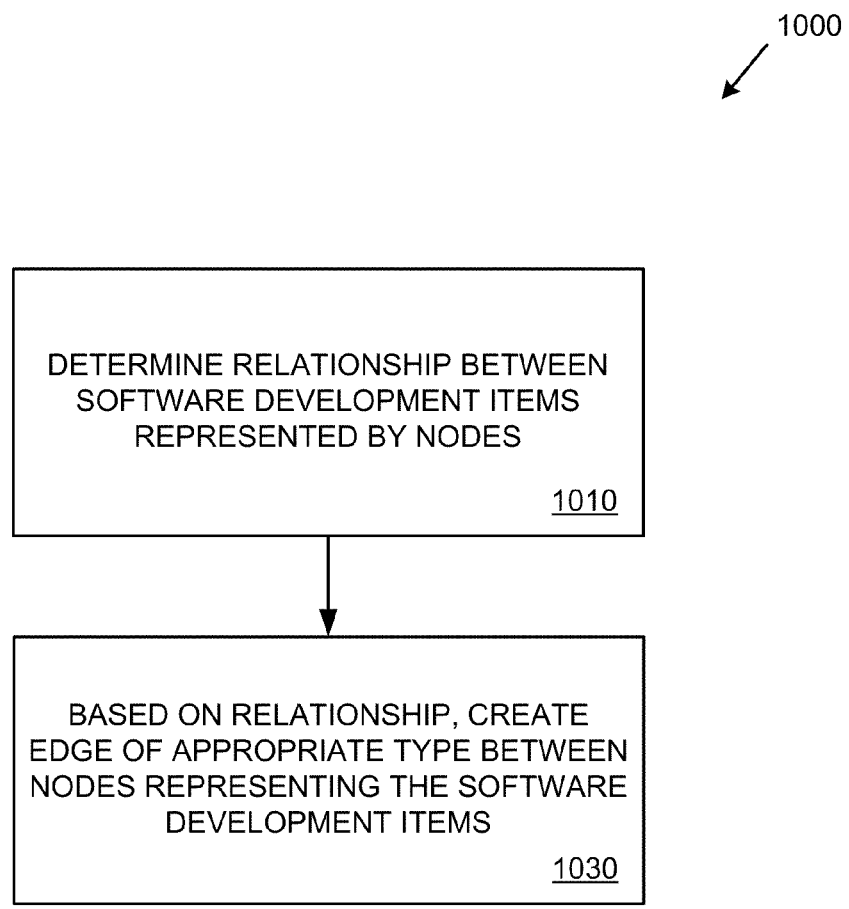
FIG. 10 is a flowchart showing an exemplary method of creating a graph data structure comprising typed edges to indicate a relationship between nodes, such as that shown in FIG. 9.

Exemplary Method for Representing Relationships between Software Development Items Via Typed Edges FIG. 10 is a flowchart showing an exemplary method 1000 of creating a graph data structure comprising typed edges to indicate a relationship between nodes, such as that shown in FIG. 9. The method 1000 may be used in any of the examples herein to represent relationships between nodes in a graph data structure representing any of the software development items described herein.

In the example, at 1010 a relationship between software development items represented by nodes is determined. At 1030, based on the relationship detected, an edge of appropriate type is created between nodes representing the software development items.

The edge creation can be done in conjunction with node creation or separately.

Example 17

Exemplary Class Hierarchy for Nodes

Figure 11A:
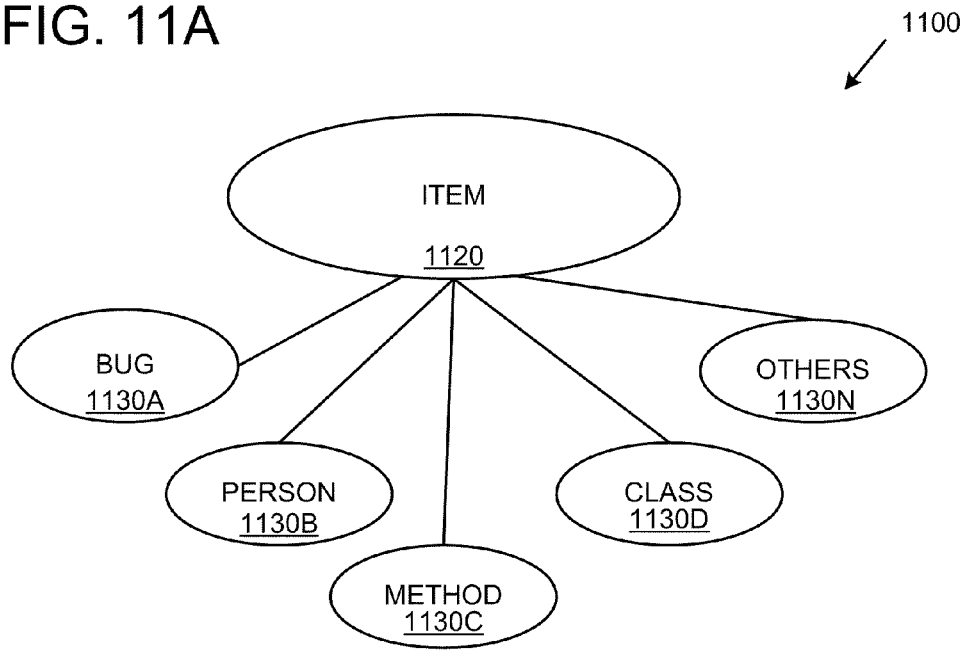
FIG. 11A is a diagram showing an exemplary class hierarchy for use when representing software development items in a graph data structure.

FIG. 11A shows an exemplary class hierarchy for use when representing software development items in a graph data structure. In the example, a different object class for a node can be used when representing different software development items. Such an approach can be used when representing any of the software development items described herein.

In the example, the object classes bug 1130A, person (e.g., developer) 1130B, method 1130C, class 1130D, and others 1130N are child classes (e.g., inherit from) a same parent class item 1120. In this way, functionality and properties can be extended as appropriate for the particular software development item being represented. For example, the bug class 1130A can include properties indicating a bug identifier and the status of the bug. When a node representing a bug is created in the graph data structure, a node of type bug 1130A can be instantiated, filled with the appropriate data, and linked into the graph data structure.

Example 18

Exemplary Class Hierarchy for Edges

Figure 11B:
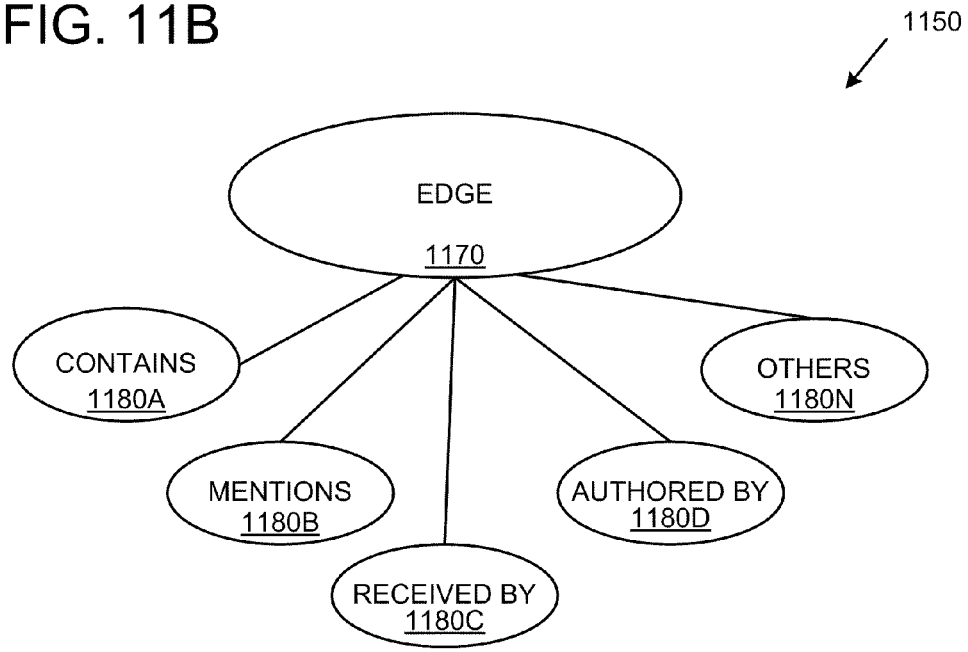
FIG. 11B is a diagram showing an exemplary class hierarchy for use when representing edges in a graph data structure such as those created with nodes having classes as shown in FIG. 11A.

FIG. 11B shows an exemplary class hierarchy for use when representing edges in a graph data structure representing software development items. In the example, a different object class for an edge can be used when representing different relationships between software development items. Such an approach can be used when representing any of the relationships between software development items described herein.

In the example, the object classes contains 1180A, mentions 1180B, received-by 1190C, authored-by 1180D, and others 1180N are child classes (e.g., inherit from) a same parent class edge 1170. In this way, functionality and properties can be extended as appropriate for the particular relationship being represented. For example, the received-by class 1180C can include properties indicating what was received and which developer received it. Also, any of the edges can be associated with a cost, which can be determined at least in part by the object class. When an edge representing the received-by relationship is created in the graph data structure, a node of type received-by 1180C can be instantiated, filled with the appropriate data, and placed into the graph data structure.

Example 19

Exemplary Query Tool

Figure 12:
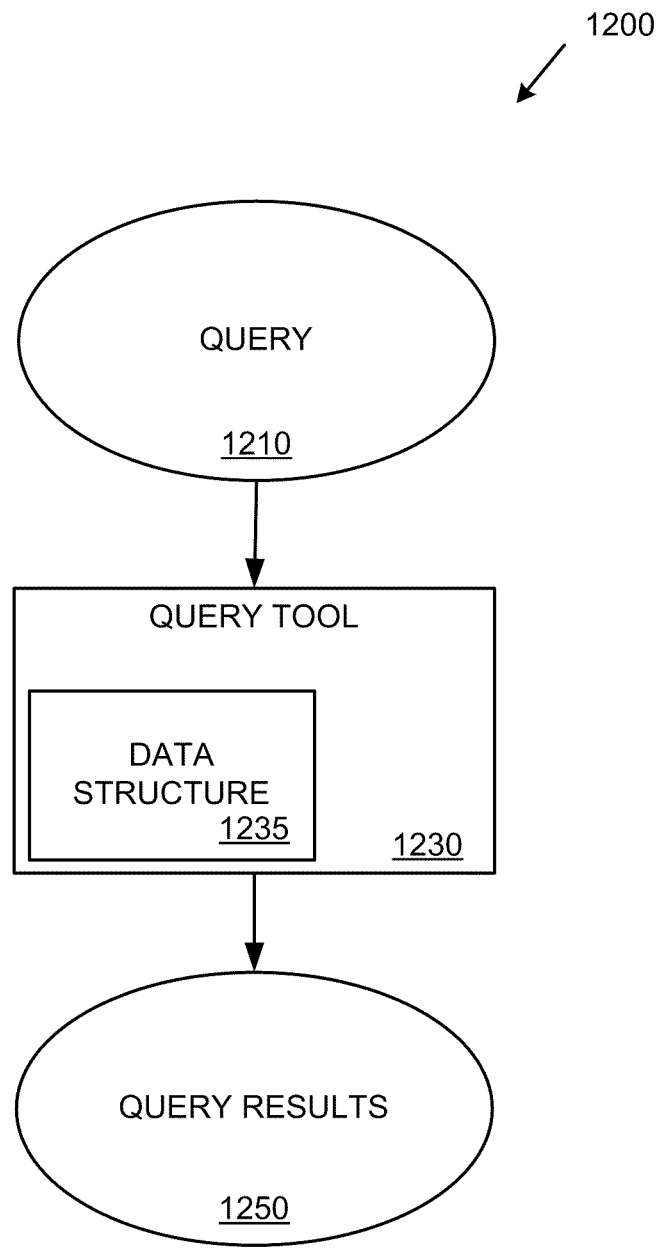
FIG. 12 is a block diagram of an exemplary query tool for inspecting a data structure and providing query results based on a query.

FIG. 12 shows an exemplary query tool 1230 for inspecting a graph data structure and providing query results 1250 based on a query 1210. Such a tool 1230 can be used to query any of the graph data structures described herein.

In the example, the query tool 1230 has access to a graph data structure 1235 (e.g., any of the graph data structures described herein).

Example 20

Exemplary Method for Providing Results

Figure 13A:
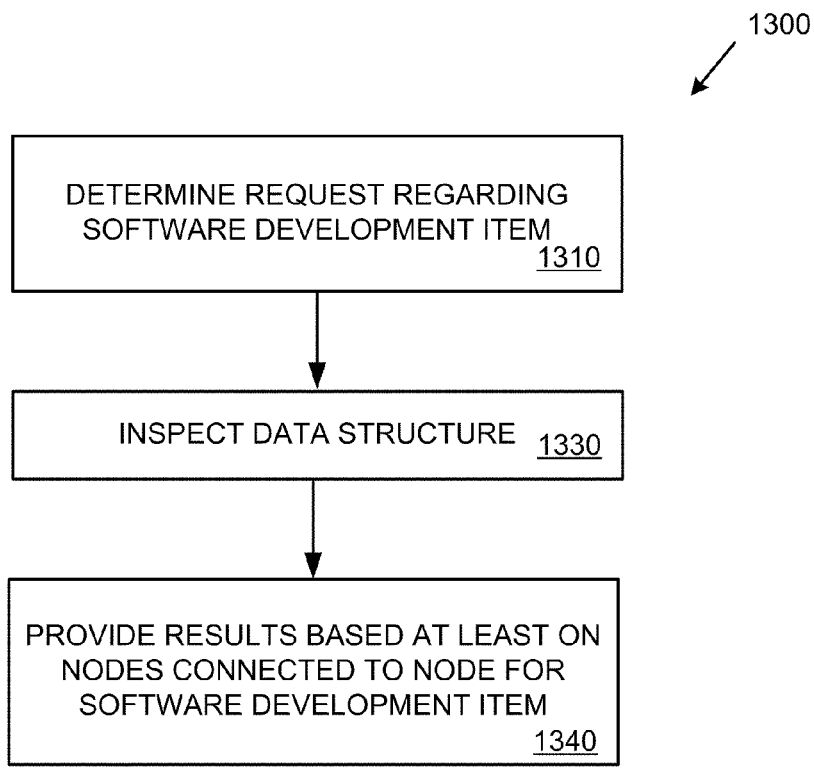
FIG. 13A is a flowchart showing an exemplary method of processing a request to show software development items related to a specified software development item and can be used in a system such as that shown in FIG. 12.

FIG. 13A is a flowchart showing an exemplary method 1300 of processing a request to show software development items related to a specified software development item and can be used in a system such as that shown in FIG. 12.

In the example, at 1310, the request (e.g., query) regarding a specified software development item is determined. At 1330, the graph data structure is inspected based on the request. At 1340, results are provided based at least on nodes connected to the node representing the specified software development item. For example, the closest nodes (e.g., nodes proximate to the node representing the specified software development item) can be provided. Results can be presented in a user interface if desired. Other factors can be included when presenting results.

Example 21

Exemplary Method for Implementing a Query to Determine Results

Figure 13B:
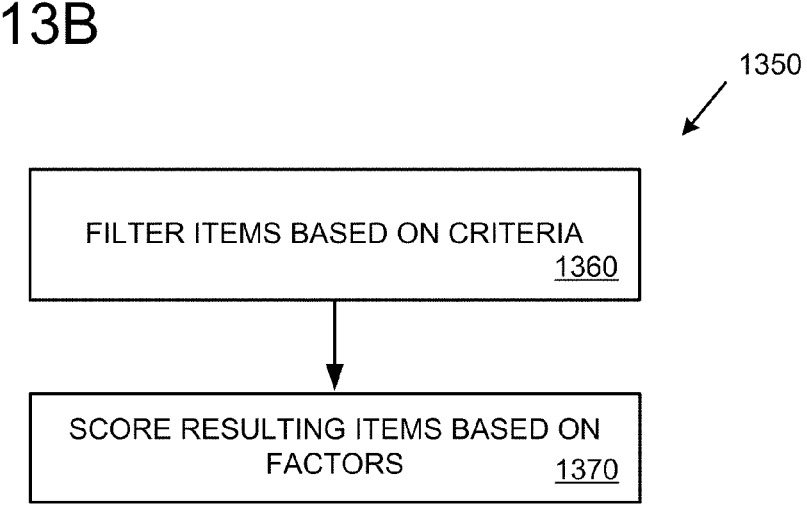
FIG. 13B is a flowchart showing an exemplary method of implementing a query with both filtering and scoring and can be used in conjunction with the method shown in FIG. 13A.

In any of the examples herein, a query of the graph data structure can be used to determine results. Such a query can comprise filtering and scoring. FIG. 13B shows an exemplary method 1350 for implementing a query on a graph data structure.

At 1360, software development items in the graph data structure are filtered based on specified criteria. Filtering can involve selecting a subset of the items that match a set of criteria. For example, a query may specify that only items that contain the word "banana" should be returned in the result set, or only items of type bug, or only items of type bug that contain "banana" or only items that are of type bug or contain "banana."

At 1370, the resulting items from the filtering are scored based on factors. Scoring can compute an estimate of the importance of items in the result set. For example, the score may be composed of one or more factors that are combined (e.g., multiplied or added together) into an overall score value.

Factors can include any one or more of those shown in Table 1. For example, connectivity score can be combined with any one or more of the others.

TABLE 1

Scoring Factors

| Factor | Description |
| --- | --- |
| Static score | An estimate of relevance of an item based on measurable human behavior on the item such as linking, editing, viewing, and the like |
| Query-dependent score | An estimate of the extent to which the item matches the filter (e.g., the number of times an item mentions "banana") |
| Time-dependent score | An estimate of the relevance of an item based on its age. Generally, an item becomes less relevant as it ages. |
| Type-dependent score | Some types of items can be considered more relevant that others (e.g., a developer will typically be much more interested in bugs and people than test cases and test results) |
| Connectivity score | An assessment of the degree to which the item in the result set is connected through the graph to one or more anchor items |
| Other scores | Other factors can be included or added in the future. Other factors/scores may in some circumstances overlap with one or more of the factors/scores described above in this table (e.g., query-dependent score, type-dependent score, connectivity score, etc.), |

With respect to the connectivity score, anchor items may be represented as individual respective nodes in a graph data structure and thus may also be referred to interchangeably herein as anchor nodes. In some embodiments, individual nodes can be enumerated as one or more relevant anchor nodes for a target item, which may also be referred to herein as a target node. Similar to how anchor text may be used in the context of the web (e.g., the Internet) to describe a target of a link and be used as a ranking factor for the target in web search results, an anchor node(s) for a target node of the graph data structure may describe the target node and thus be used as a weighting factor.

To enumerate an anchor node(s), in some embodiments a group of regular expressions (e.g., twenty five or more regular expressions) may be utilized to locate the anchor node(s) for the target node. Anchor nodes can include, for example, the owner of a piece of code, the person responsible for tracking a work item task, the filename where a particular source code symbol is defined, the specification document that describes a piece of code, etc. Items, or nodes, associated with a high degree of "anchor" edges convey authority about another node (e.g., a target node) in a manner similar to how a high-degree hub does in the context of the web.

In some embodiments, target node(s) can be enumerated for each represented node in the graph data structure. In other words, each node of the data structure may be considered a target node that is associated with a corresponding anchor node(s). An algorithm, such as a SQL Server full-text search algorithm for example, can be utilized to attribute query-dependent ranking scores to each of the individual nodes to be returned in the query response.

The anchor items can vary as desired. For example, the anchor items can be specified as part of the query. When using implicit query, the one or more focus items can be the anchor items (e.g., if the user is focusing on a bug, then the anchor item set is the bug; if the user is focusing on a method, then the anchor item set contains the method, its class, and the file that contains the class). In a search interface, a user may add or remove items to the anchor set (e.g., via right-click commands or drag-and-drop.)

If desired, the connectivity score factor can be adjusted based on the number of edges incident to a particular intervening node. So, consider a scenario anchored on node A and calculating the connectivity score factor for node C in the results. If there are edges connecting A to B and B to C, there is connectivity between A and C. However, if there are few incident edges for intervening node B, then the strength of the connection between A and C can be made higher than if B has many incident edges.

With respect to the other scores, in some embodiments probability scores can be computed for individual paths (e.g., paths that are identified) in a graph data structure. Probability scores are described in detail further below. Such probability scores are one type of "other score". Another type of other score may be a user-specific score. In some embodiments, user-searcher specific scores can be utilized to rank individual items, or nodes, to be returned in a query response. In some embodiments, user-specified scores can be derived from user-adjustable settings of an application that is utilized to submit a particular query. For instance, a customized application may instruct a ranking function (e.g., a customized user-specific ranking function, general purpose ranking function, etc.) to apply user-specified scores (e.g., by default, in certain situations, etc.) to rank individual items returned in the query response, and/or in subsequent query responses. Alternatively or additionally, such a ranking function may be configured to apply the user-specified scores whenever a query associated with a particular user and/or application is received.

Individual user-specified scores can be applied to certain types of nodes, edges, and/or metadata by such a ranking function. As a result, the order in which items are ranked in a particular response can be influenced by the user-specified scores. For example, symbol definitions may be ranked higher than symbols that appear as references. Open work items may be ranked higher than closed work items. People who are individual contributors may be ranked higher than managers.

Having performed filtering and scoring, the resulting items can be provided as results.

Example 22

Exemplary Queries

In any of the examples described herein, a query can take a variety of forms. For example, a query can take the form of a request for software development items "related to" a particular software development item. Further, the request can specify that results are to be limited to a particular type (e.g., "show me all items of type x related to item y."). In this way, for example, a query could ask, "which developers are related to bug number 1325?" Or, a query could ask, "which discussions (e.g., emails) are related to method Account.Add?" Scoring can be applied to the results.

Queries can be received in a variety of ways via various user interfaces, such as via drop down menus, query-by-example, and the like. Also, as described herein, implicit query can be supported.

Example 23

Exemplary Other Techniques for Determining Results

In any of the examples described herein, results of a query can be determined in a variety of other ways, alone, or in combination with the other techniques already described. For example, when a request for items "related to" a specified software item is received, results can indicate the software development items having nodes connected to the node for the specified software item in the graph data structure. Alternatively, results can indicate those items within n nodes of the specified item, where the value for n can be configured as desired. Nodes within one node are adjacent to each other. Still alternatively, results can indicate any of those items connected to the specified item, regardless of path length. Other techniques can be employed.

Alternatively, items can be ranked according to their distance from the specified software item in the graph. Further, if desired, the distance can be calculated via weighted edges in the graph. In this way, items having stronger relationships can be presented more prominently, ranked higher, or both.

Example 24

Exemplary Recognition of Software Development Item Mentions in Plain Text

In any of the examples herein, any of the sources of plain text described herein can be processed to recognize mentions of software development items.

Mentions of the following items can be recognized in plain text: bugs, object classes, object method names, filepaths (e.g., according to the universal naming convention), file names, email addresses (e.g., including aliases), interfaces (e.g., collections of semantically-related functions), structures, enumerated types, enumerated type constants, and Uniform Resource Locators.

Figure 14A:
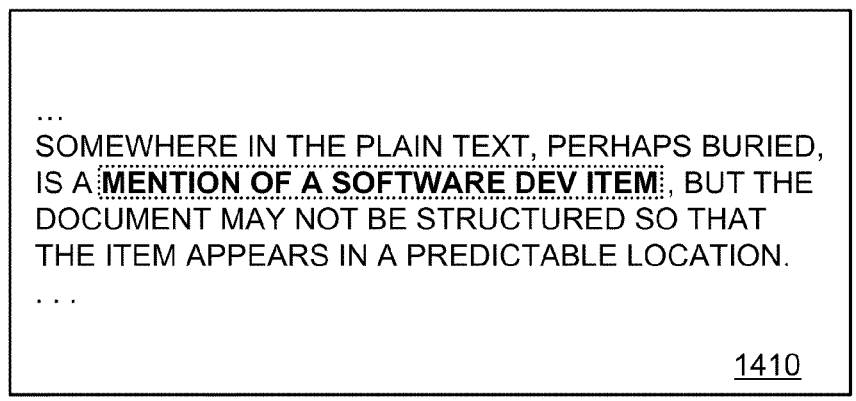
FIG. 14A is a block diagram showing an exemplary snippet of plain text including a detected mention of a software development item.

FIG. 14A shows an exemplary snippet 1410 of plain text including a detected mention of a software development item. A variety of techniques can be used to find such mentions, including recognition or deduction based on the form of the mention or text pattern preceding or following the mention.

Example 25

Figure 14B:
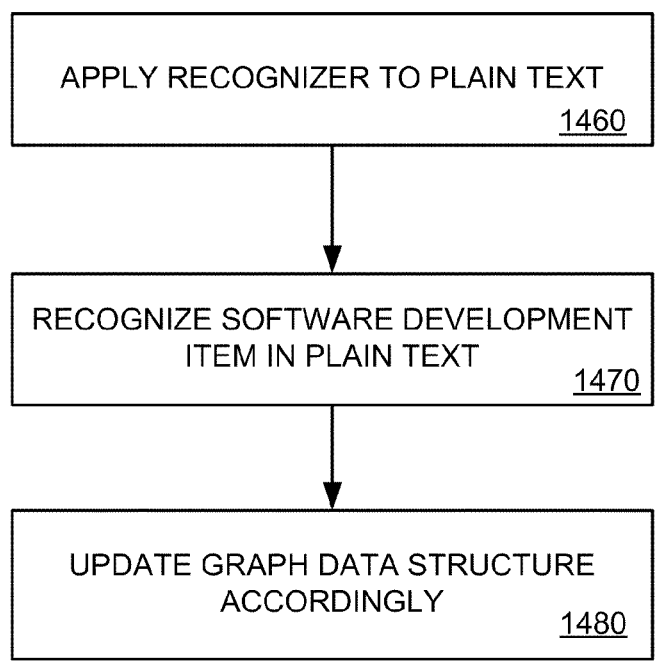
FIG. 14B is a flowchart showing an exemplary method of recognizing a software development item mention within plain text, such as that shown in FIG. 14A.

Exemplary Method for Recognizing Software Development Item Mentions in Plain Text FIG. 14B shows an exemplary method of recognizing a software development item mention within plain text, such as that shown in FIG. 14A, which can be used in any of the examples herein when modifying a graph data structure.

At 1460, a recognizer is applied to the plain text. For example, a parser or other software can scan through the plain text to apply a set of rules or other logic to recognize mentions of software development items.

At 1470, a mention of a software development item is recognized in the plain text. For example, a portion of the plain text may satisfy a particular rule, which indicates that neighboring text is a mention of a software development item.

At 1480, responsive to having recognized the mention, the graph data structure is updated accordingly. For example, a node representing the item mentioned can be added if appropriate. Also, a relationship can be created or strengthened based on having recognized the mention.

Example 26

Exemplary Techniques for Recognizing Software Development Items

Although some of the examples herein are directed to recognizing software development item mentions, it is also possible to recognize the software development items themselves. So, for example, when scanning source code in a data collection (e.g., a source code store), it is possible to recognize the definition of an object class. Accordingly, an appropriate relationship can be created (e.g., "contained in" to relate a method to a class or "defined in" to relate a definition to a source code file) responsive to such recognition.

Example 27

Exemplary Information Stored for a Node

In any of the examples herein, a node in the graph data structure can also be associated with an indication of time (e.g., a starting date or an ending date). Such time indications can be used when making a request to limit results to those within a date range. When displayed, the date can be shown, the number of days relative to today can be shown (e.g., "3 days ago"), or both.

Example 28

Exemplary Software Development Item: Email

In any of the examples herein, an email can be processed to detect software development items and the relationships between them. For example, a graph builder tool can process (e.g., crawl) emails in an email database and add a node to the graph data structure to represent the email. Links can then be made from the node representing the email to items related to the email, such as who sent the email and what was mentioned in the email.

TABLE 2

Exemplary Software Items in Email

| Item Detected | Software Development Item Action |
| --- | --- |
| Sender, recipient, cc recipient | Node ("sent," "received," etc.) for developer; edge from email to developer |
| Mention of software development item in plain text (e.g., subject or body) | Node ("mentioned in") for software development item; edge from email to item |
| Predecessor or successor message (e.g., forward, reply, reply all) | Edge ("has reply," etc.) from email to other message |

Example 29

Exemplary Software Development Item: Source Code Check-In

In any of the examples herein, a code check-in can be processed to detect software development items and the relationships between them. For example, a graph builder tool can process a source code management system and add a node to the graph data structure to represent the code check-in. Links can then be made from the node representing the code check-in to items related to the code check-in, such as who checked the code in and what was mentioned in the code check-in.

Additionally, any changes to the code can be determined (e.g., via a compare), and such changes can themselves be treated as software development items, which can in turn be inspected for detection of or mentions of software development items.

TABLE 3

Exemplary Software Items in Code Check-in

| Item Detected | Software Development Item Action |
|---|---|
| Developer checking in | Node for developer; edge ("checked-in") from check-in to developer |
| Mention of software development item in plain text (e.g., check-in notes or description) | Node for software development item; edge ("mentioned in") from check-in to item |
| Source code change | Node for change; Process for detection or mention of software development items; create edges to change; also edge from change to changing developer (e.g., the developer who checked in the related code) |

Example 30

Exemplary Software Development Item: Bug

In any of the examples herein, a bug report can be processed to detect software development items and the relationships between them. For example, a graph builder tool can process a bug tracking system and add a node to the graph data structure to represent the bug. Links can then be made from the node representing the bug to items related to the bug, such as who opened the bug and what was mentioned in the bug report.

TABLE 4

Exemplary Software Items in Bug Report

| Item Detected | Software Development Item Action |
|---|---|
| Developer opening, closing, etc. | Node for developer; edge ("opened," "closed") from bug to developer |
| Mention of software development item in plain text (e.g., bug notes or description) | Node for software development item; edge ("mentioned in") from bug to item |

Example 31

Exemplary Software Development Item: Document

In any of the examples herein, a document (e.g., specification, design document, presentation, and the like) can be processed to detect software development items and the relationships between them. For example, a graph builder tool can process a document and add a node to the graph data structure to represent the document. Links can then be made from the node representing the document to items related to the document, such as who created the document and what was mentioned in the document.

TABLE 5

Exemplary Software Items in Document

| Item Detected | Software Development Item Action |
|---|---|
| Developer authoring, modifying, etc. | Node for developer; edge ("authored-by") from document to developer |
| Mention of software development item in plain text (e.g., document contents or properties) | Node for software development item; edge ("mentioned in") from document to item |

Example 32

Figure 15A:
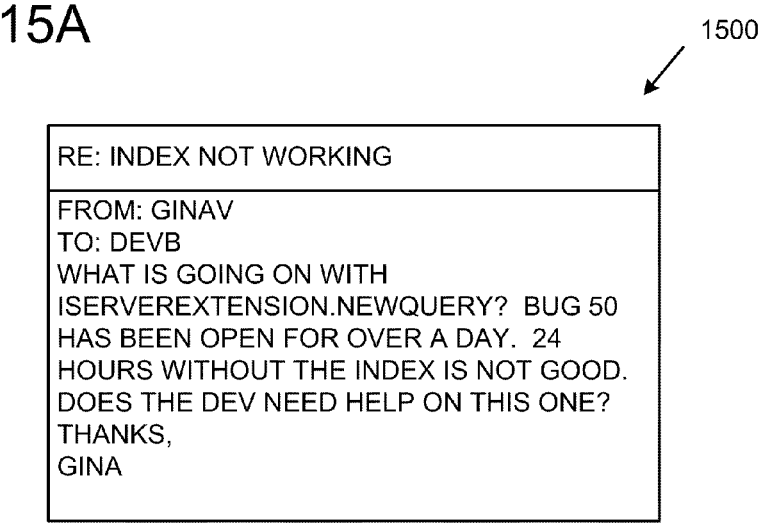
FIG. 15A shows an exemplary email containing software development item mentions.

Exemplary Processing of Item with Software Development Item Mentions in Plain Text FIG. 15A shows an exemplary email 1500 containing software development mentions. When such an email is processed by a graph builder tool to update the graph data structure, it can consider the software development items for the email 1500 and update the graph accordingly. For example, the graph builder tool can create a node for the email, determine which developers are involved, and recognize mentions of software development items in the plain text of the email.

Figure 15B:
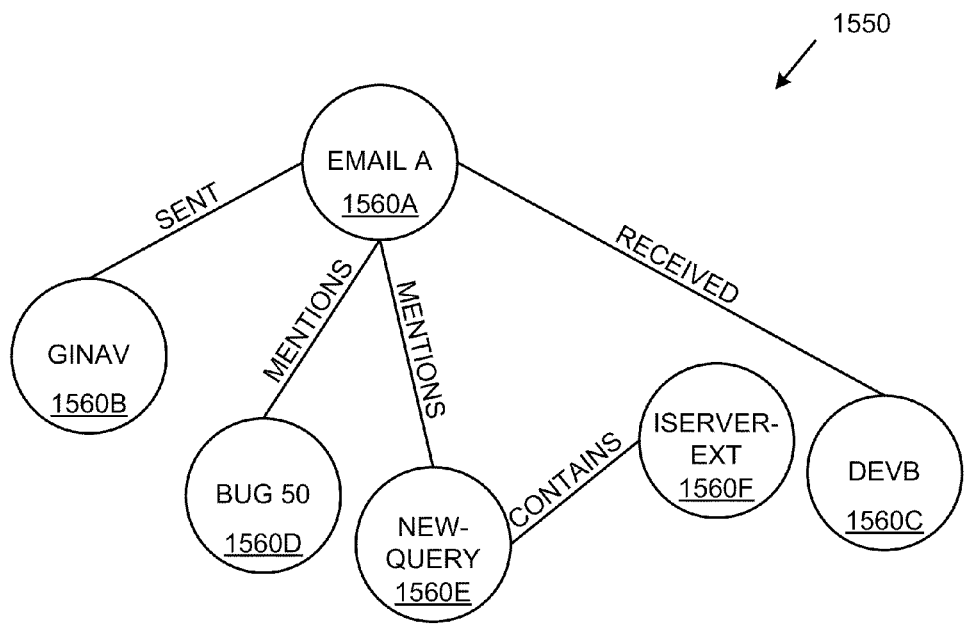
FIG. 15B is an exemplary graph data structure representing relationships created between represented software development items based on the email shown in FIG. 15A.

FIG. 15B shows a graph data structure 1550 that has been constructed based on having processed the email 1500. As described herein, the nodes (1560A-1560F) can be of different types (e.g., an object class corresponding to the software development item). The nodes shown in the graph can be of types that are child object classes of the node object class. In the example, a node 1560A has been created to represent the email 1500. Appropriate nodes 1560B and 1560C can be created for the developers involved (e.g., ginav and devb).

Based on having detected a mention of bug 50 in the plain text of the email, a node 1560D can be created to represent bug 50. Alternatively, the node 1560D may have already existed in the graph data structure 1550 (e.g., based on having processed the bug database).

Based on having detected a mention of method IServerExtension.NewQuery in the plain text of the email, a node 1560E can be created to represent the method. Also, a node 1560F can be created for the related interface IServerExtension. Alternatively, these nodes 1560E and 1560F may have already been present in the graph data structure 1550 (e.g., based on having processed source code defining them).

Also, the edges connecting the various nodes can indicate the relationships between them. Thus the nodes 1560A and 1560B can be connected by an edge of type "sent" to indicate that the email was sent by the developer ginav. If desired, the edges can be associated with values. Object classes can be used to represent the edges, or some other technique can be used.

Example 33

Another Exemplary Plain Text with Software Development Item Mentions

Figures 16A, 16B:
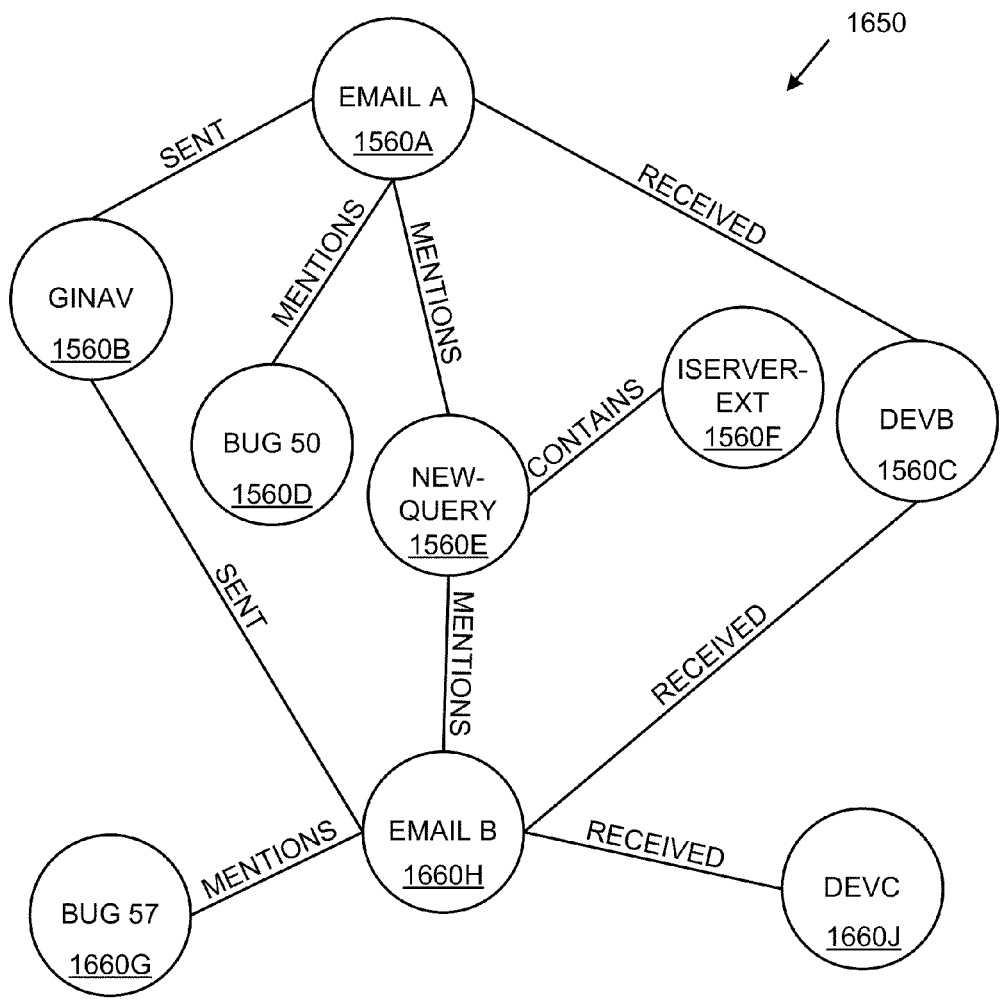
FIG. 16A is another exemplary email containing software development item mentions.
FIG. 16B is an exemplary version of the graph data structure shown in FIG. 15B, updated to represent relationships created between represented software development items based on the email shown in FIG. 16A.

FIG. 16A is another exemplary email 1600 containing software development item mentions. When such an email is processed by a graph builder tool to update the graph data structure, it can consider the software development items for the email 1600 and update the graph accordingly. For purposes of illustration, an updated version of the graph 1550 is shown. The graph 1550 has been updated to reflect having processed the email 1600. As with the other email, the graph builder tool can create a node for the email, determine which developers are involved, and recognize mentions of software development items in the plain text of the email.

FIG. 16B is an exemplary version of the graph data structure shown in FIG. 15B. The data structure has been updated to represent relationships created between represented software development items based on the email shown in FIG. 16A.

In the example, a node 1560H has been created to represent the email 1600. Because appropriate nodes 1560B and 1560C already exist for two of the developers, they are merely connected to the node representing the email. A third developer node 1660J can be created for developer devc.

Based on having detected a mention of bug 57 in the plain text of the email, a node 1660G can be created to represent bug 57. Alternatively, the node 1660G may have already existed in the graph data structure 1650 (e.g., based on having processed the bug database).

Based on having detected a mention of method IServerExtension.NewQuery in the plain text of the email, the node 1560E can be connected to the node 1660H representing the email.

Again, the edges connecting the various nodes can indicate the relationships between them. Although not shown, additional edges can be includes (e.g., an edge of type "reply" connecting a node representing an email to a node representing a reply to the email).

Given the data structure 1650 shown in FIG. 16B, a request for "All bugs related to bug 50" can traverse the data structure 1650 from the node 1660D representing bug 50 through intermediate nodes and will reach the node 1660G, which is of type "bug" and indicates bug 57. Accordingly, the results can indicate that bug 57 is related to bug 50. In this way, having recognized discussion of two different bugs by the same sender in two different emails 1500 and 1600, the bugs have been linked in the data structure. The represented relationship is that the two bugs are mentioned in a set of emails involving the same sender. Although it is not certain what other relationships may exits, it is useful to know that the two bugs are so related. Such a relationship may also indicate other relationships (e.g., being related to a same issue, even if such an issue has not yet been uncovered by the development team).

Example 34

Exemplary Recognizer: Bug

FIG. 17A shows exemplary recognition of a bug mention in plain text 1710, which can be used with any of the examples described herein. In the example, a mention of bug 153 has been recognized based on the pattern "bug ###" (e.g., the word "bug" followed by a number). Other techniques can be used, and variations can also be used (e.g., "bug no. ###," "bug number ###," and the like).

Example 35

Exemplary Recognizer: Method

FIG. 17B shows exemplary recognition of a method mention in plain text 1760, which can be used with any of the examples described herein. In the example, a mention of the method Account.Add has been recognized based on the pattern "abc.def" (e.g., a word immediately followed by a period, immediately followed by another word). However, the recognition can be informed by consulting a list of known classes or interfaces, a list of known methods, or both. For example, the pattern can be "knownclass.knownmethod." Other techniques can be used, and variations can also be used (e.g., "knownmethod( )," and the like).

Example 36

Additional Sources for Relationships Between Nodes

Additional sources of information can be used to create relationships between nodes. For example, if it is determined that a code check-in occurred substantially at the same time as (e.g., within n minutes of, where n is a threshold) closing a bug by the same developer, a relationship between the code check in (e.g., and the related changed code) and the bug can be created. Such a relationship can be weighted based on how close in time the two events occurred (e.g., a strong relationship if within 5 minutes or less, and a weaker relationship if more than 3 hours).

Example 37

Exemplary Access by Client Applications

In any of the examples herein, functionality for building the graph data structure, or querying it can be accessed by client applications (e.g., via programming interfaces exposing functionality).

Example 38

Exemplary Implicit Query in a Software Development Context

Figure 18:
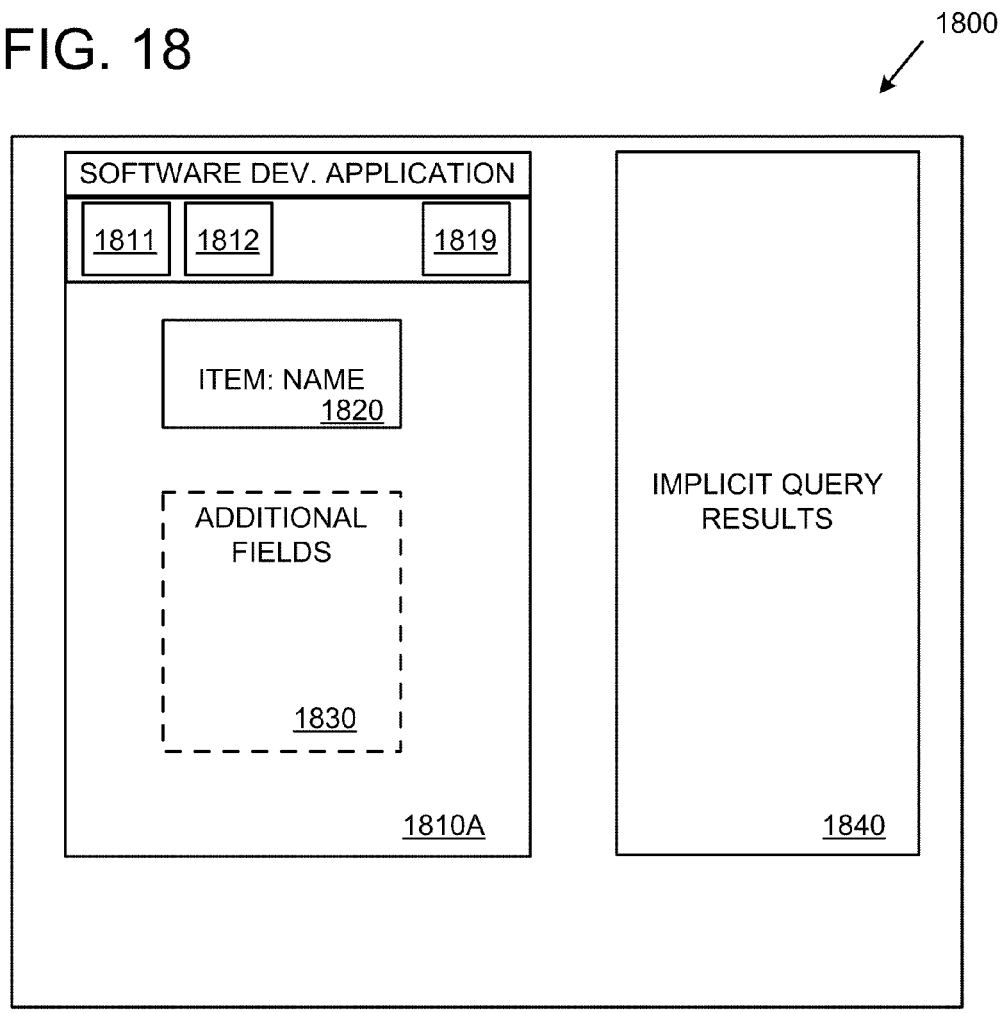
FIG. 18 is a screen shot showing an exemplary user interface implementing implicit query in a software development context.

FIG. 18 shows an exemplary user interface 1800 presenting implicit query results 1840 based on an implicit query detected in a software development application presenting a window 1810A. Such an implicit query can be determined by monitoring the user's interaction with the user interface controls and fields (e.g., controls 1811, 1812, and 1819 or fields 1820 and 1830 by an application outside of the software development application.

Figure 19:
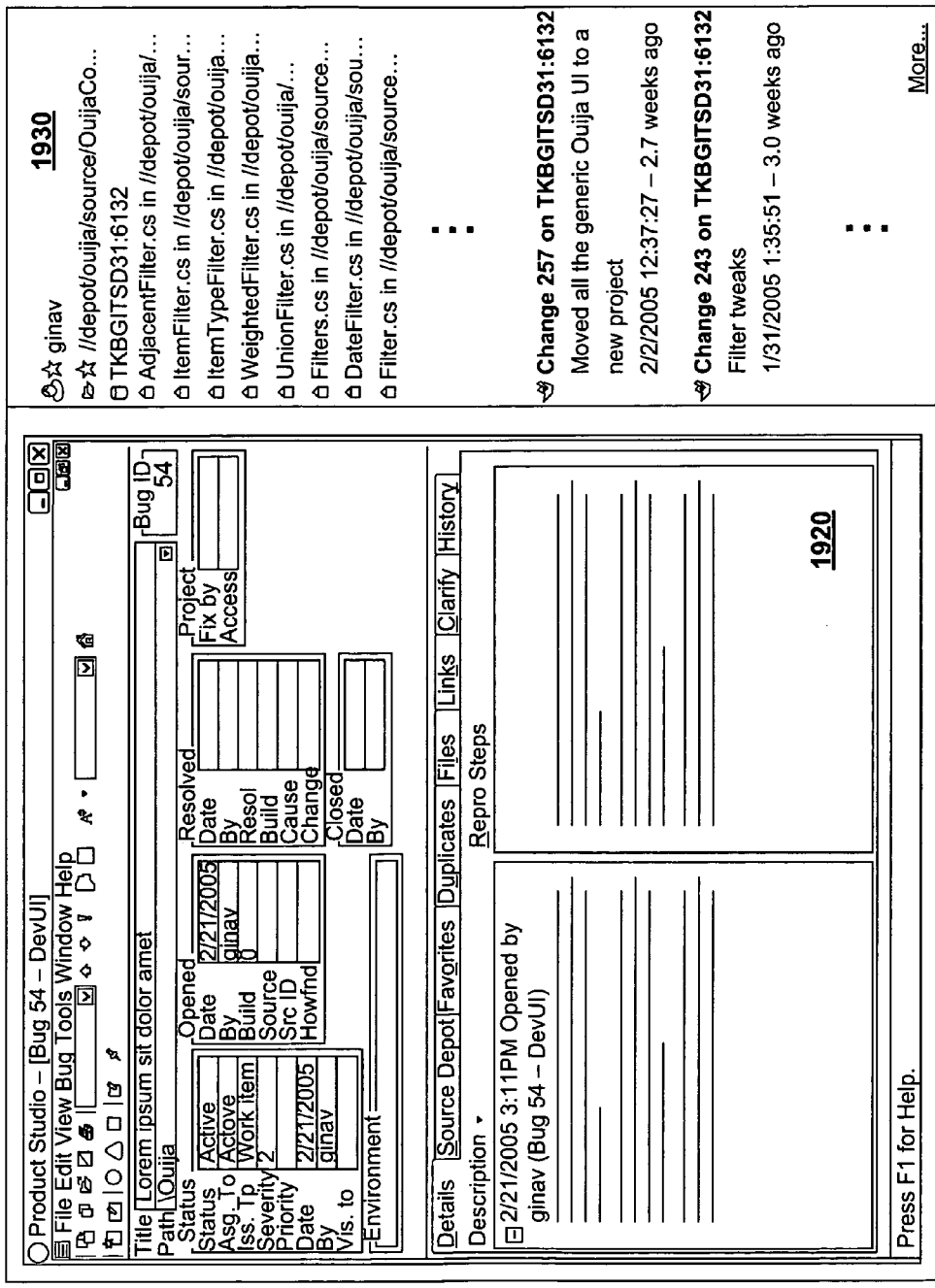
FIG. 19 is a screen shot showing another exemplary user interface implementing implicit query for software development items.

FIG. 19 shows another exemplary user interface 1900 presenting implicit query results 1930 based on an implicit query detected in a software development application presenting a window 1920. Similarly, the query can be determined by monitoring the user's interaction with the user interface controls and fields.

An implicit query technique can be used to perform a query in any software development scenario. For example, any of the queries or requests for software development items described herein can be so performed.

Example 39

Figure 20:
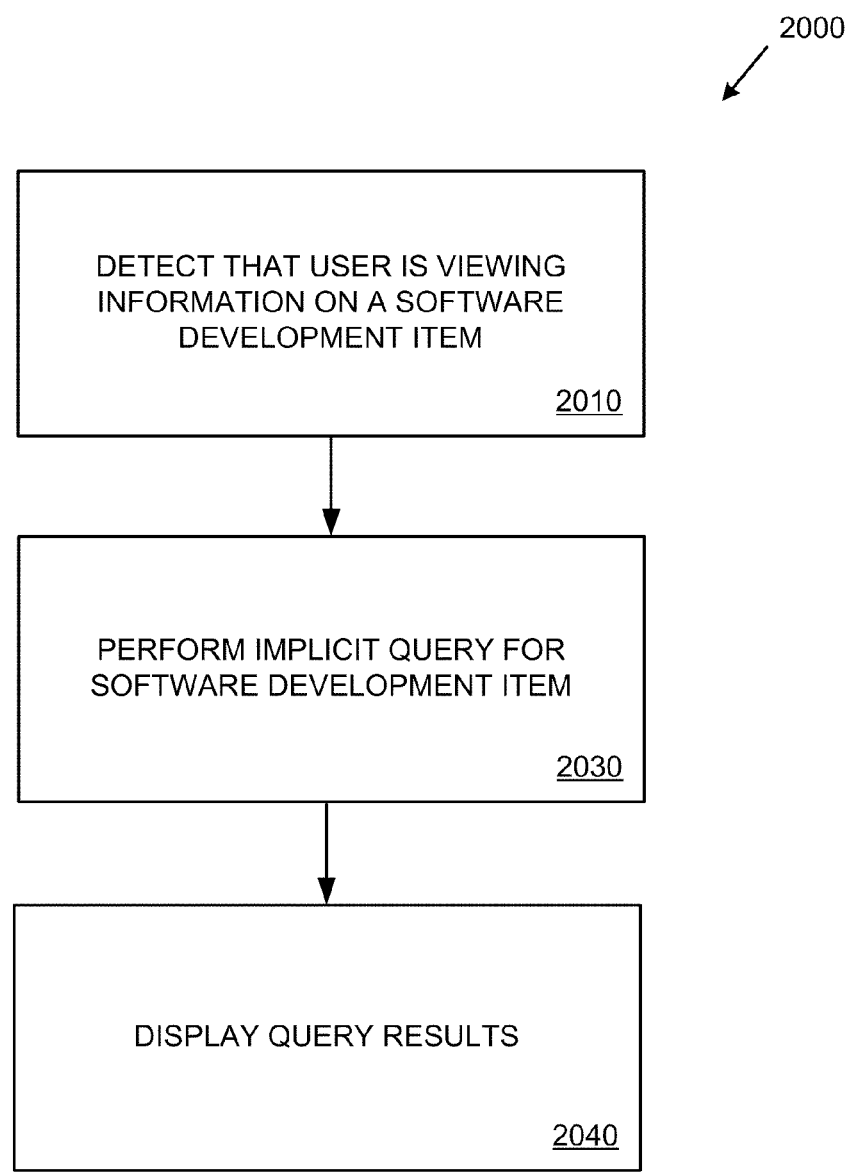
FIG. 20 is a flowchart showing an exemplary method for implementing implicit query for software development items and can be used to generate a user interface such as that shown in FIG. 18.

Exemplary Method for Performing Implicit Query in a Software Development Context FIG. 20 shows an exemplary method 2000 for performing implicit query in a software development context, such as via the user interfaces shown in FIGS. 19 and 20. In the example, it is detected that a user is viewing information on a software development item 2010 (e.g. in a software development tool or application). For example, an application or other mechanism outside of the software development application can monitor the user's activity within a software development application (e.g., a bug tacking tool, source code management tool, and the like).

At 2030, an implicit query is performed for the software development item, responsive to the detecting. The query can be determined via the user's interaction with the user interface. The query can comprise a search for information on the software development item extrinsic to the software development tool or application. At 2040, the results are displayed. The results can be presented outside of the software development tool (e.g., in a sidebar). Alternatively, results can be presented in the tool (e.g., in a pane).

Such a technique can be used in combination with any of the examples described herein (e.g., the graph representing relationships between software development items). So, for example, the results can comprises at least one reference to a mention of a software development item (e.g., in a plain text item, such as an email).

Example 40

Exemplary Graph Browser

Figure 21A:
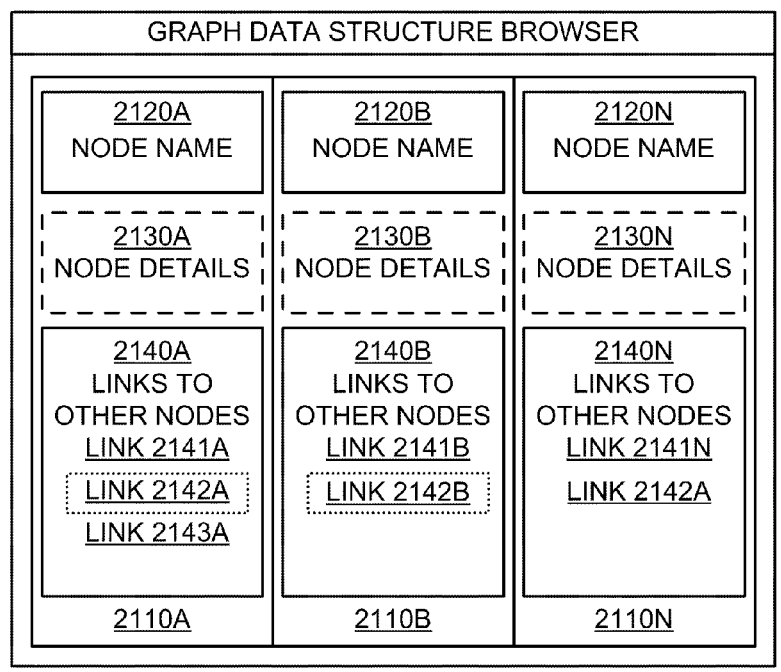
FIG. 21A is a screen shot showing an exemplary user interface implementing a graph data structure browser.

FIG. 21A shows an exemplary user interface 2100 implementing a graph data structure browser. Such a user interface 2100 can be used to browse any graph data structure, including the graph data structures described herein.

The browser interface 2100 can be constructed to display a plurality of panes. In the example, three panes 2110A, 2110B, and 2110N are shown. For each pane, a node name 2120A-N, links to other nodes 2140A-N, and node details 2130A-N can be shown. For the panes 2110A-2110N, the links to other nodes (e.g., 2140A) can show links adjacent to the subject link (e.g., node name 2120A) in the graph data structure. In practice, the links can show the linked-to node's name or some other identifier. The links can serve as respective activatable representations of the other nodes adjacent to the node in the graph data structure. An additional pane can appear or be filled upon having activated any of the links. Upon reaching an upper limit on the number of panes, the panes can be shifted (e.g., and the oldest pane dropped).

By activating any of the links in the links to other nodes 2140A (e.g., the link 2142A), the user can navigate within the graph. Such an activation displays the linked-to node in an adjacent pane (e.g., the pane 2110B). Links to other nodes are then shown in the adjacent pane (e.g., links 2141B and 2142B), by which the user can similarly navigate within the graph to display the linked-to node in an adjacent pane (e.g., the pane 2120N), which also displays links to other nodes (e.g., links 2141N and 2142A).

Figure 21B:
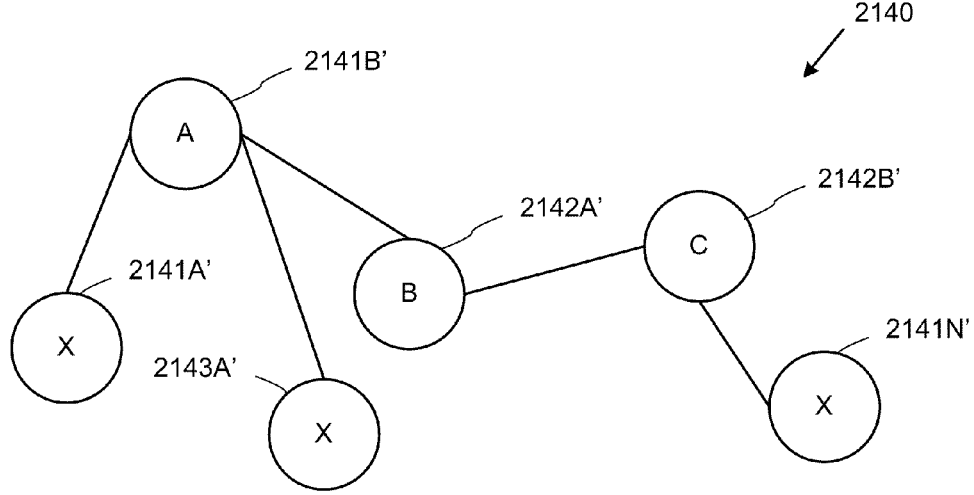
FIG. 21B is a diagram showing a graph data structure which is being browsed as shown in the user interface of FIG. 21A.

For purposes of illustration, FIG. 21B shows a graph 2140 having nodes 2141A', 2142A', 2143A' 2141B', 2142B', and 2141N', which correspond to the displayed panes and links shown in FIG. 21A (Node A corresponds to pane 2110A, Node B corresponds to pane 2110B, etc. and node A 2141B' can be navigated to via link 2141B, etc.). The graph 2140 can also be used with reference to FIGS. 22, 23, 25, 26A, and 26B in the same way, except that Node B corresponds to pane 2210B, and so forth.

The graph browser can navigate graph data structures more complex than a tree. If desired, the links to other nodes (e.g., 2140B) can present a link (e.g., 2141B) to at least the node (e.g., Node A) from which the user navigated the current node. If desired, the links to other nodes (e.g., 2140A) can present links for all nodes adjacent to the node presented.

In this way, the graph browser can support limitless browsing (e.g., no dead end to the graph is reached via the user interface) so that additional adjacent panes can always be presented in any graph having a plurality of connected nodes.

Example 41

Exemplary User Interfaces Presented by a Graph Browser

Figure 22:
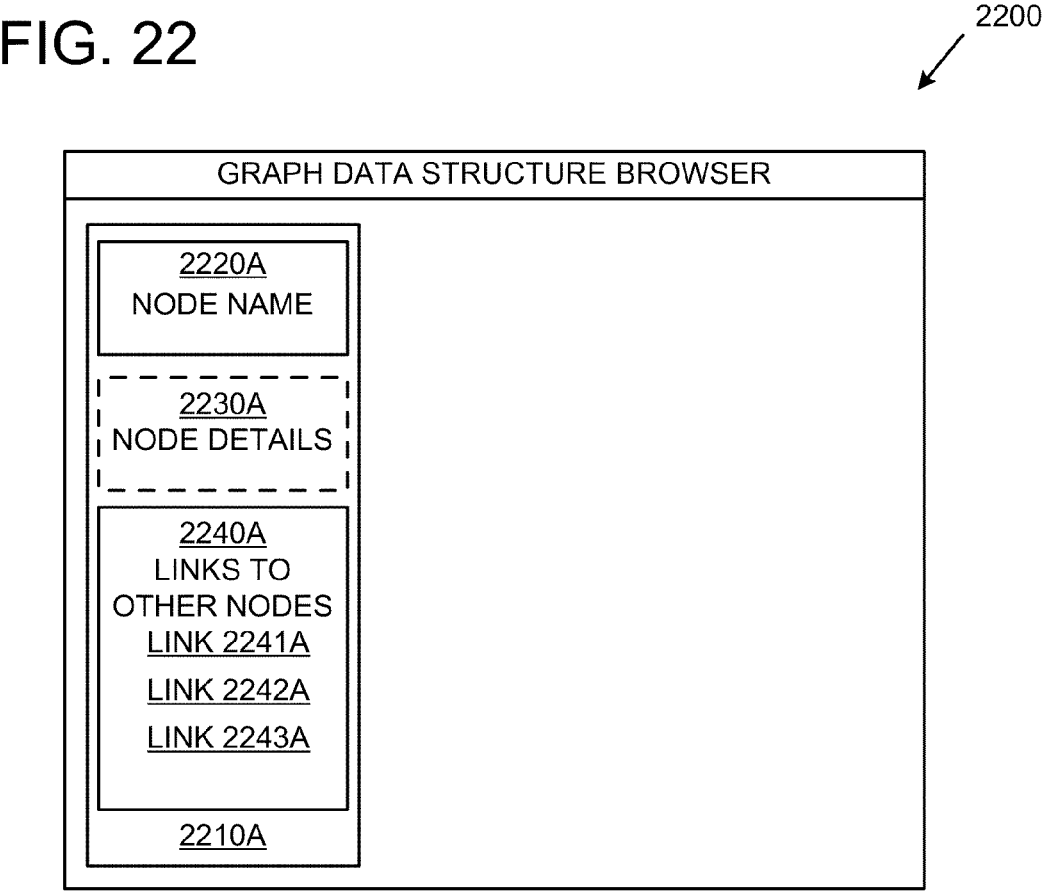
FIG. 22 is a screen shot showing an exemplary user interface implementing a graph data structure browser showing one pane.

FIG. 22 shows an exemplary user interface 2200 implementing a graph data structure browser showing one pane. Such a user interface can be used in conjunction with the graph browser described in Example 40.

In the example, a single page 2210A is shown, along with a node name 2220A, node details 2230A, and links to other nodes 2240A. By activating any of the links 2241A, 2242A, or 2243, the user can navigate to an adjacent node corresponding to the link.

Figure 23:
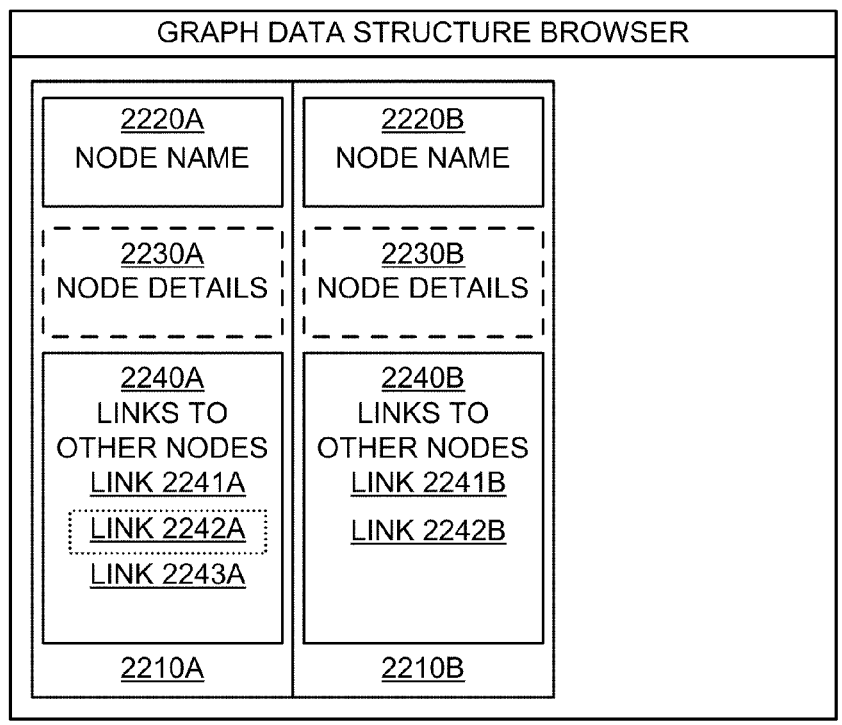
FIG. 23 is a screen shot showing an exemplary user interface implementing a graph data structure browser showing two panes, after having navigated within the graph data structure with the user interface shown in FIG. 22.

FIG. 23 shows the user interface 2200 of FIG. 22 after the user has activated link 2242A as user interface 2300. As a result, the node corresponding to the link 2242A is displayed in the adjacent pane 2210B (e.g., along with node name 2220B, node details 2230B, and links to other nodes 2240B (e.g., links 2241B and 2242B)).

Example 42

Exemplary Method for Generating User Interfaces Presented by a Graph Browser

Figure 24:
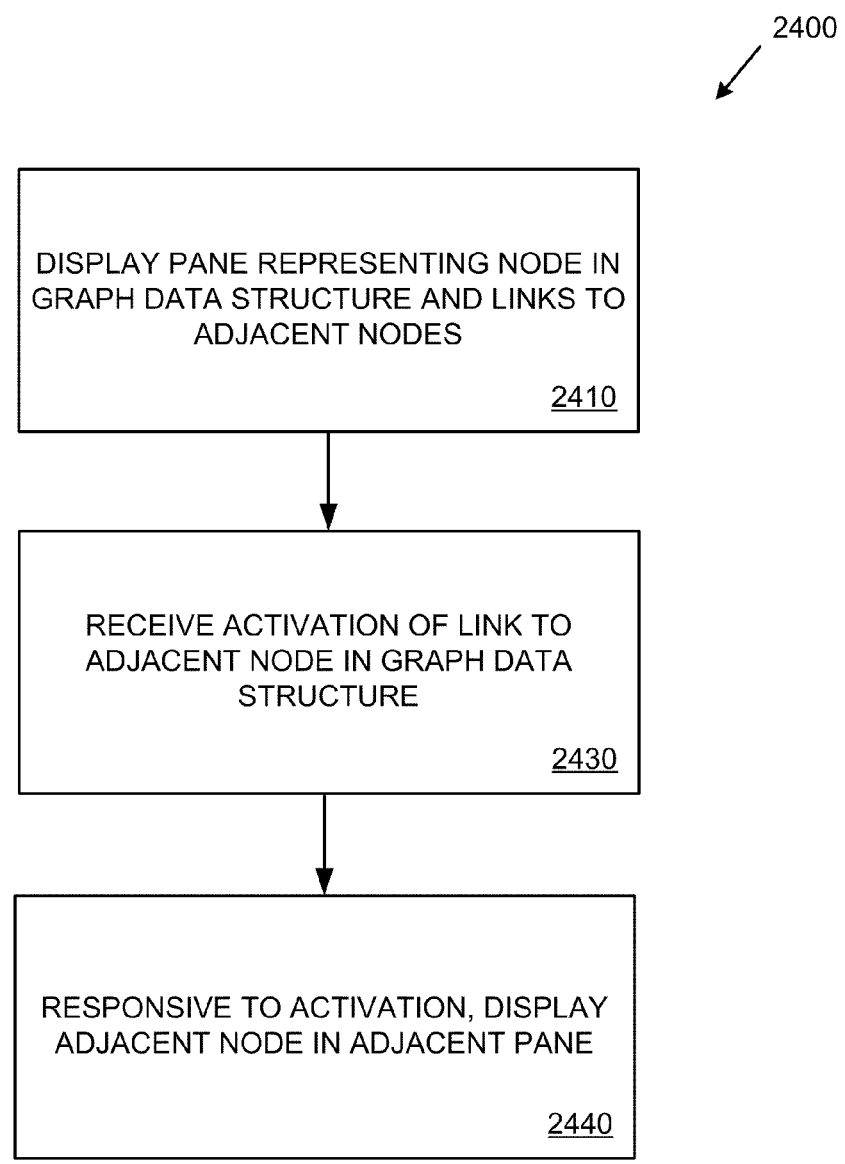
FIG. 24 is a flowchart showing an exemplary method of navigating within a graph browser such as those shown in FIGS. 21A, 22, 23, and 25.

FIG. 24 shows an exemplary method 2400 of navigating within a graph browser such as those shown in FIGS. 21A, 22, 23, and 25.

In the example, at 2410, a pane representing a node in the graph data structure and links to adjacent nodes are displayed. At 2430, an activation of one of the links to an adjacent node in the graph data structure is received. Then, at 2440, responsive to activation, information for the adjacent node is displayed in an adjacent pane.

Example 43

Exemplary Interfaces Presented by a Graph Browser

Figure 25:
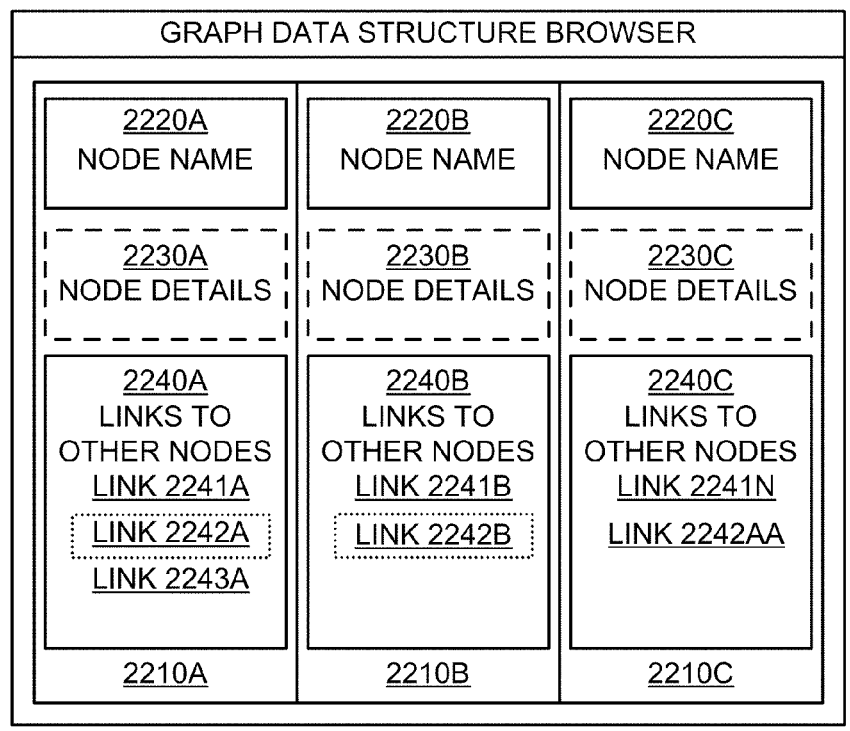
FIG. 25 is a screen shot showing an exemplary user interface implementing a graph data structure browser showing three panes.

FIG. 25 shows a user interface 2500 depicting the user interface 2300 of FIG. 23 after the user has activated the link 2242B. As a result, the node corresponding to the link 2242B is displayed in the adjacent pane 2210C (e.g., along with node name 2220C, node details 2230C, and links to other nodes 2240C (e.g., links 2241N and 2242AA, which links to the same node as the link 2242A)).

Figure 26A:
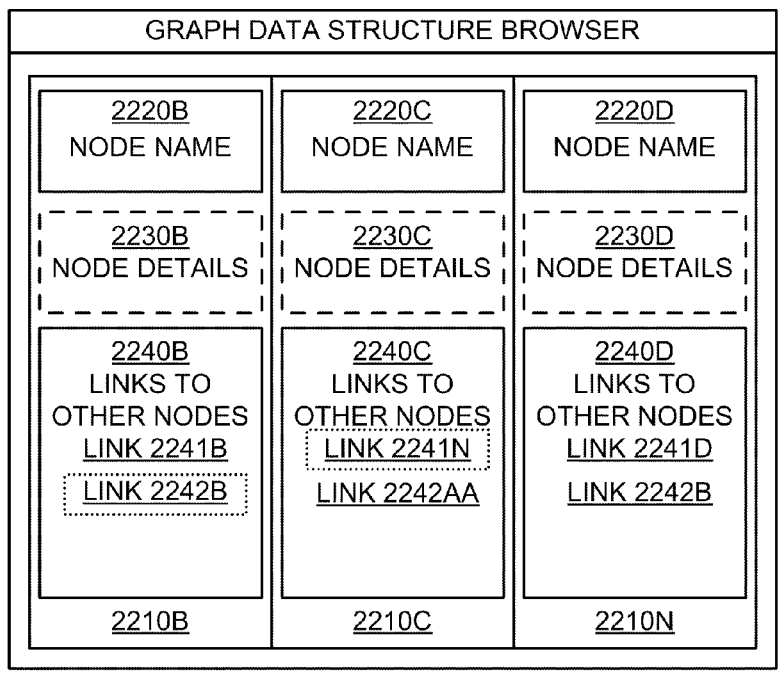
FIG. 26A is a screen shot showing an exemplary user interface implementing a graph data structure browser showing three panes, after having navigated within the graph data structure with the user interface shown in FIG. 25.

FIG. 26A shows the user interface 2600 depicting the user interface 2500 of FIG. 25 after the user has activated the link 2241N. As a result, the node corresponding to the link 2241N is displayed in the adjacent pane 2210D. Because the browser has been configured to display three panes, the earliest-most (e.g., leftmost) pane can no longer fit in the interface and is discarded (e.g., no longer shown). The panes have been shifted (e.g., to the left).

Instead of simply discarding the pane, a back button can be provided by which the pane will be recovered after temporarily removing it from the interface. Alternatively, a smaller version of the pane (e.g., a panelet such as a strip, header, or title, such as node name) can be shown instead of discarding it. In such a way, the panelets can stack on top of each other like a hand of playing cards.

Figure 26B:
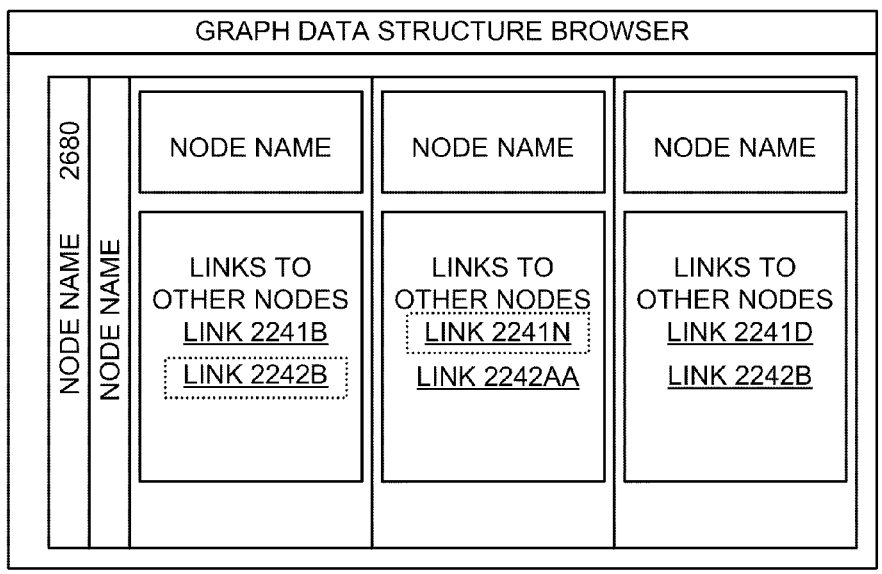
FIG. 26B is a screen shot showing an exemplary stacking of panes within a graph browser.

FIG. 26B shows such an exemplary stacking of nodes after a threshold number of panes has been met. Activating one of the stacked panelets 2680 (e.g., by clicking on it) can cause the panelet to be restored to original size and gain the current focus (e.g., as a pane from which additional links can be selected).

Example 44

Exemplary Method for Generating Interfaces Presented by a Graph Browser

Figure 27:
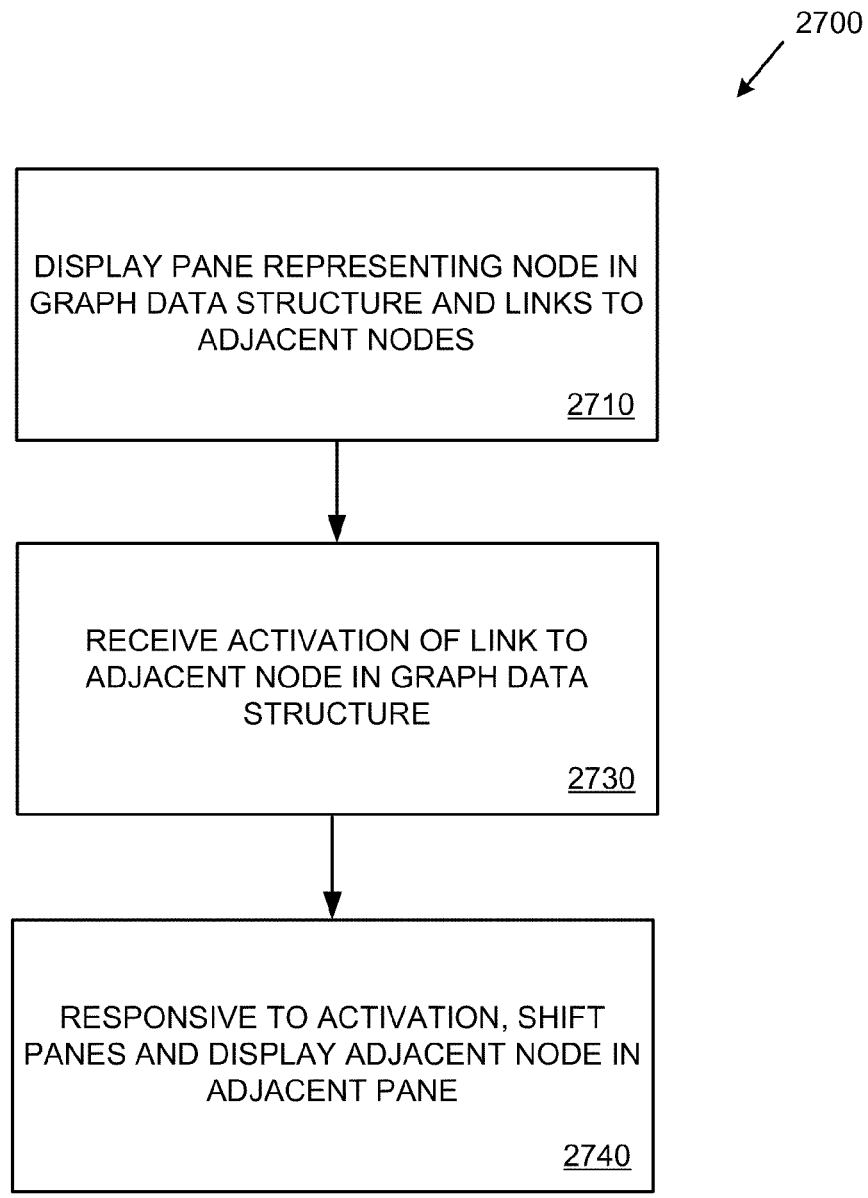
FIG. 27 is a flowchart showing an exemplary method of shifting panes within a graph browser, as shown in the user interface of FIG. 26.

FIG. 27 shows an exemplary method 2700 of shifting panes within a graph browser, such as shown in the user interface of FIG. 26.

In the example, a pane representing a node in the graph data structure and links to adjacent nodes are displayed at 2710. At 2730, an activation of a link in the pane to an adjacent node in the graph data structure is received. At 2740, responsive to the activation (e.g., and determining that no more panes will fit), the panes are shifted and the adjacent node is displayed in an adjacent pane. The earliest displayed (e.g., leftmost) pane can be discarded. Thus, the panes can be shifted and at least one of the panes discarded upon reaching a threshold number of panes. A method supporting panelets can also be implemented.

Example 45

Exemplary Additional User Interface Features for Browser

In any of the examples described herein, a graph data structure browser can include additional features. For example, selecting a link in an earlier pane, after subsequent panes have already been shown can cause the subsequent panes to disappear, and a pane for the selected node to appear adjacent to the earlier pane. For example, with reference to FIG. 25, selecting the link 2541A would cause the two panes 2510B and 2510C to disappear, and a pane for the node related to the link 2541A would appear adjacent to the pane 2510A (e.g., in place of the pane 2510B). Selecting the link 2541B would have a similar effect.

Example 46

Exemplary User Interface

Figure 28:
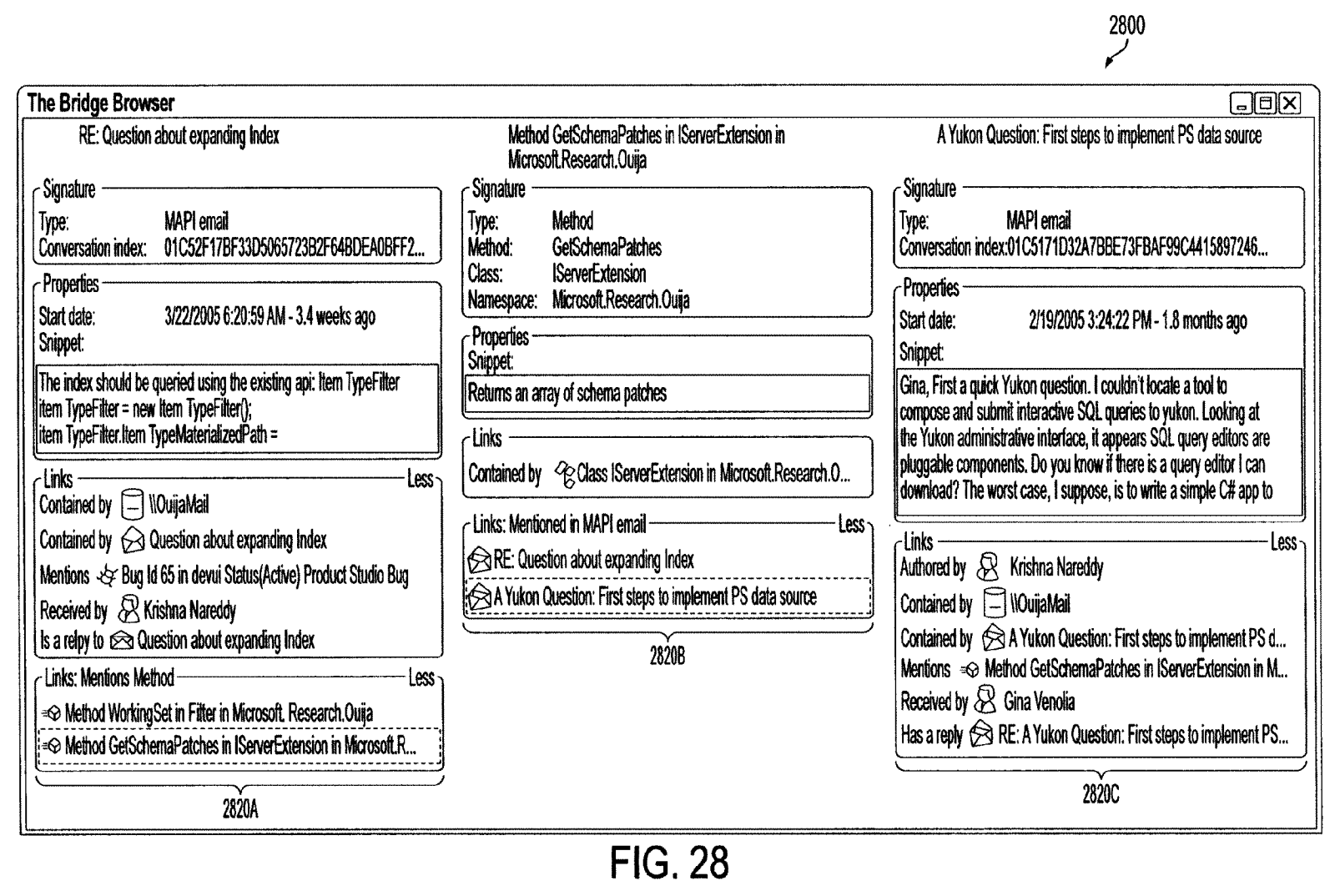

FIG. 28 shows an exemplary user interface 2800 for browsing a graph data structure. In the example, a three-pane 2820A, 2820B, 2820C graph browser is shown, which can be presented via any of the techniques described herein. In the example, the browsing technology has been applied to a graph data structure representing software development items and the relationships therebetween.

Example 47

Exemplary Computing Environment

Figure 29:
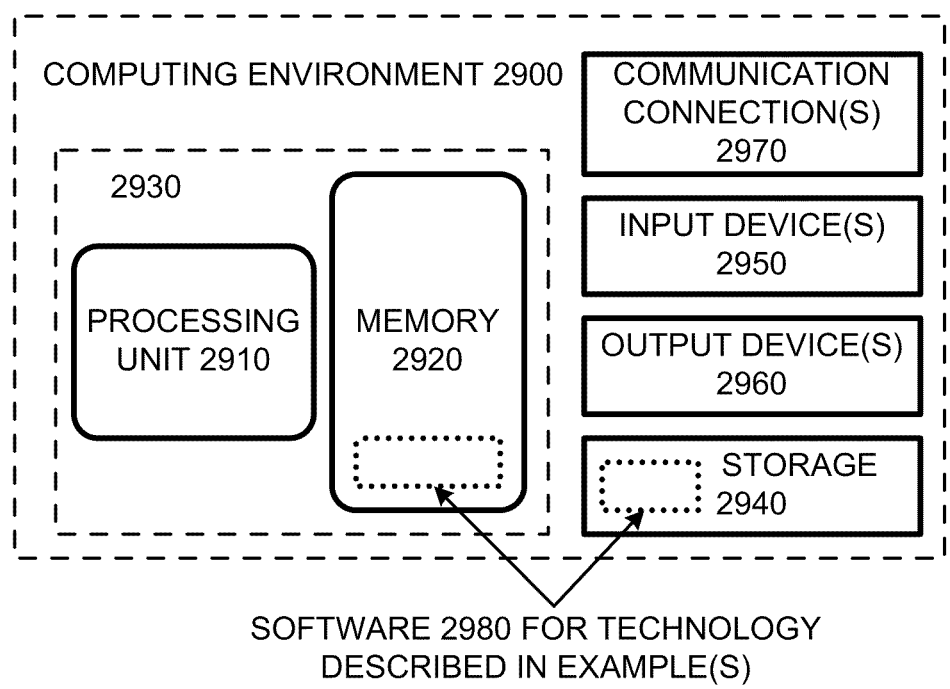
FIG. 29 is a block diagram of an exemplary suitable computing environment for implementing described implementations.

FIG. 29 illustrates a generalized example of a suitable computing environment 2900 in which the described techniques can be implemented. The computing environment 2900 is not intended to suggest any limitation as to scope of use or functionality, as the technologies may be implemented in diverse general-purpose or special-purpose computing environments.

With reference to FIG. 29, the computing environment 2900 includes at least one processing unit 2910 and memory 2920. In FIG. 29, this most basic configuration 2930 is included within a dashed line. The processing unit 2910 executes computer-executable instructions and may be a real or a virtual processor. In a multi-processing system, multiple processing units execute computer-executable instructions to increase processing power. The memory 2920 may be volatile memory (e.g., registers, cache, RAM), non-volatile memory (e.g., ROM, EEPROM, flash memory, etc.), or some combination of the two. The memory 2920 can store software 2980 implementing any of the technologies described herein.

A computing environment may have additional features. For example, the computing environment 2900 includes storage 2940, one or more input devices 2950, one or more output devices 2960, and one or more communication connections 2970. An interconnection mechanism (not shown) such as a bus, controller, or network interconnects the components of the computing environment 2900. Typically, operating system software (not shown) provides an operating environment for other software executing in the computing environment 2900, and coordinates activities of the components of the computing environment 2900.

The storage 2940 may be removable or non-removable, and includes magnetic disks, magnetic tapes or cassettes, CD-ROMs, CD-RWs, DVDs, or any other computer-readable media which can be used to store information and which can be accessed within the computing environment 2900. The storage 2940 can store software 2980 containing instructions for any of the technologies described herein.

The input device(s) 2950 may be a touch input device such as a keyboard, mouse, pen, or trackball, a voice input device, a scanning device, or another device that provides input to the computing environment 2900. For audio, the input device(s) 2950 may be a sound card or similar device that accepts audio input in analog or digital form, or a CD-ROM reader that provides audio samples to the computing environment. The output device(s) 2960 may be a display, printer, speaker, CD-writer, or another device that provides output from the computing environment 2900.

The communication connection(s) 2970 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Executable Media

Any of the methods described herein can be implemented by computer-executable instructions in one or more computer-readable media.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims.

Example Platform

Figure 30:
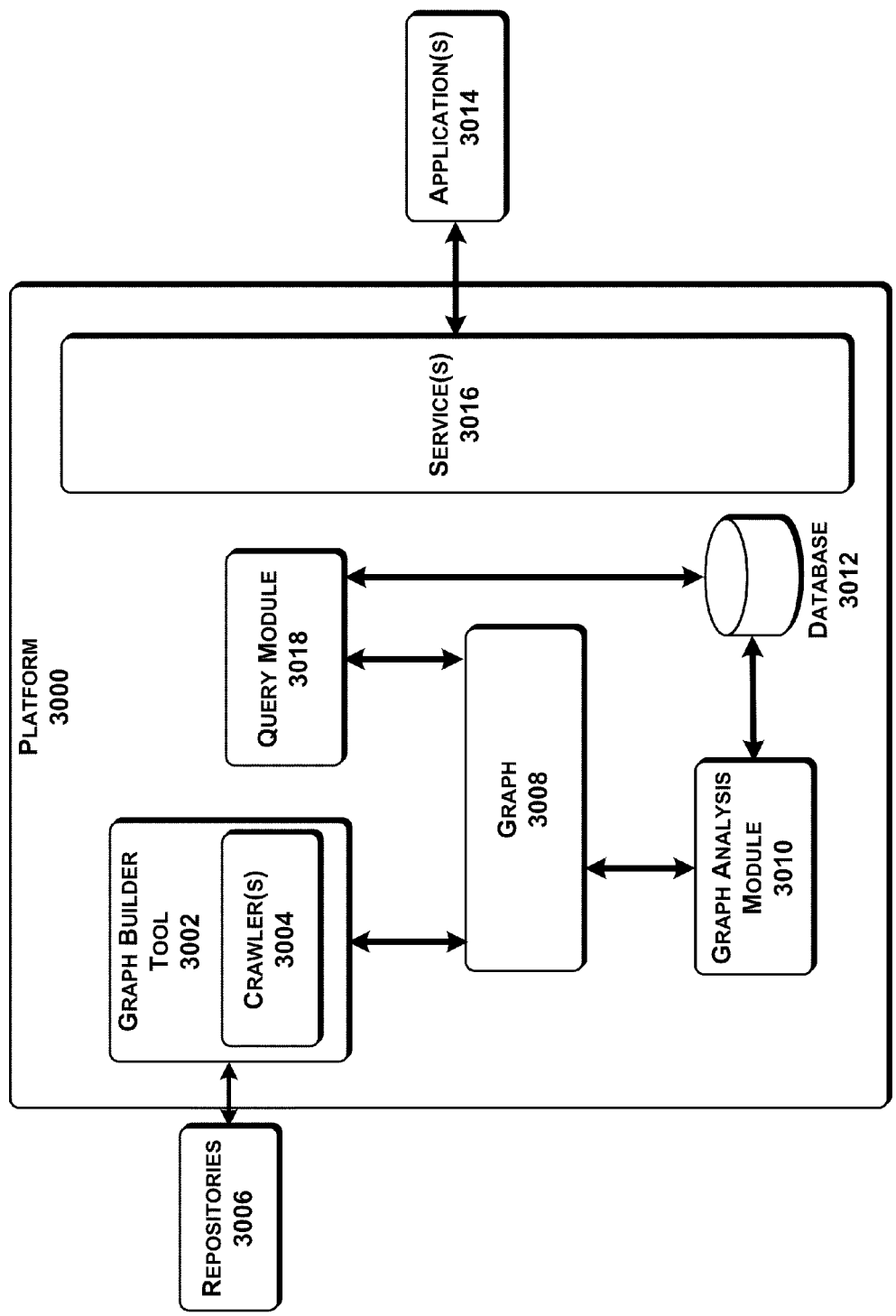
FIG. 30 illustrates an example platform, in accordance with some embodiments.

FIG. 30 shows an example platform, generally at 3000, that may be implemented to provide customizable, extensible, and efficient graph analysis and querying techniques which allow for discovering and exploiting relationships in repositories, such as software repositories for example. In some embodiments, platform 3000 may be implemented in and/or as a suitable system, such as in a system similar to system 100 described above for example. In that regard, recall that a graph builder tool such as graph builder tool 130 described above can be configured to take, as input, data from individual data collections, which may also be referred to herein as individual repositories. The graph builder tool can then process the input to generate and/or modify a graph that represents software development items (e.g., objects found in the repositories) as individual corresponding nodes of a graph. The graph builder can also detect relationships between individual software development items. The relationships of the graph can be represented as individual edges between individual nodes of the graph.

Accordingly, in this example the platform 3000 includes a graph builder tool 3002 that includes crawlers 3004. The crawlers 3004 can be configured to process data from one or more repositories 3006 to generate and/or modify a graph 3008. Without limitation, the crawlers 3004 can generate and/or modify the graph 3008 by examining the data to discover individual software development items to be represented as individual corresponding nodes, and individual relationships between the individual items to be represented as individual corresponding edges.

For example, the crawlers 3004 may process the repositories 3006 by mining individual objects and storing mined objects (e.g., in a database, memory, etc.) as nodes of the graph 3008. Individual nodes of the graph 3008 can be connected to one another by one or more edges. Each edge can indicate the relationship between two nodes of a node pair. A node pair can be considered two individual paired nodes connected to one another by a corresponding edge. Individual nodes can be represented in a graph structure as individual artifacts that correspond to individual software development items. Accordingly, for purposes of discussion, the terms "node" and "artifact" may be used interchangeably herein.

The repositories 3006 can include any number and type of repositories with any amount and type of data. For example, without limitation, the repositories 3006 may include source code, work item databases/data, employee directories/data, email data, source code assemblies, web sites, etc.

In some embodiments, individual crawlers of the crawlers 3004 may be configured to process an individual corresponding type of repository of the repositories 3006. For example, an email crawler may be configured to process, and thus may correspond to, one or more email repositories containing email data.

Furthermore, the crawlers 3004 may generate and/or modify the graph 3008 in a single instance or in a modular fashion. For example, the crawlers 3004 may process the repositories 3006 in individual phases. This may result in fewer computing resources being necessary to generate/modify the graph 3008. Thus, the scalability of the graph 3008 and the speed by which the graph 3008 may be generated and/or modified can be enhanced. A more detailed discussion of some specific example crawlers is provided below.

The graph 3008 may be loaded for use (e.g., for modification, analysis, etc.) and saved after use by individual algorithms, applications, modules, tools, and/or other functionalities in any suitable fashion. For example, the graph 3008 may be an in-memory data structure, all or part of which may be loaded from disk into memory for use and then saved back to disk. Alternatively or additionally, the graph 3008 may be made available for use while stored on disk.

In some embodiments, individual portions of the graph 3008 may be independently loaded (e.g., into memory) for use in a modular fashion. Without limitation, the individual portions can include individual nodes, individual node types, metadata for individual nodes, and/or individual node edges for instance. The individual portions may be less than all of the graph 3008. By loading less than all of the graph 3008, fewer computing resources may be used, which in turn may serve to enhance the scalability of the graph 3008 and the speed/efficiency by which the graph 3008 may be accessed and used.

For example, a portion of nodes and/or corresponding edges that is less than all of the nodes and/or edges of the graph 3008 may be loaded for use. This may include loading one or more specified node types (e.g., Person, Check-in, and SourceCode nodes) for use. As another example, metadata for individual nodes of the graph 3008 can be loaded for use independently of the node(s). In other words, a node may be loaded for use without the metadata of the node being loaded. As yet another example, individual nodes can be loaded independently of the individual nodes' corresponding edges. In other words, a node may be loaded for use without the node's associated edges being loaded. Similarly, an edge may be loaded for use without nodes associated with the edge being loaded.

As explained above, individual nodes of the graph 3008 may be of any suitable type. As such, the nodes of the graph 3008 can be considered typed nodes. Depending on the level of tolerable graph complexity, any number of different node types might be recognized. Here in this example, some example node types include: person, bug, method, class, change-set, work item, file, test result, file revision, and source code, for instance.

Furthermore, individual edges can be one of any suitable type as well. As such, the edges of the graph 3008 can be considered typed edges. Depending on the level of tolerable graph complexity, any number of different edge types might be recognized. Here in this example, some example edge types include: contains, mentions, received by, author/authored by, assigned to, created, commits/committer, bug assignments, caller/callee, used by, defined at, lexically enclosed, or textual allusions, for instance.

In this example, the platform 3000 also includes a graph analysis module 3010. The graph analysis module 3010 can be configured to analyze the graph 3008 based on a set of one or more regular expressions. Each regular expression in the set can be written by a user and can define one or more corresponding paths of the graph 3008. In operation, the graph analysis module 3010 can utilize the set of regular expressions to identify (e.g., compute) one or more paths for the set of regular expressions. The graph analysis module 3010 can also utilize the computed path(s) to compute additional information, or metadata, about the path(s). Data describing the computed path(s) (including data identifying the computed paths, metadata (e.g., probability scores) about the computed paths, etc.) can be referred to as path data.

Each computed path can include one or more node pairs, with each two nodes of a node pair (i.e., each paired node) separated by an edge describing the relationship between the two nodes. Since each node in a path can represent an individual software development item in the repositories 3006, each path can represent a possible answer (in terms of data in the repositories 3006) for a corresponding regular expression. Each of the regular expressions can be user-written. Thus, the path data can be searched in response to a query from the user of a team, or another team member of the user's team, to return query results associated with (e.g., describing) one or more paths (and thus one or more individual nodes) that satisfy the query and that are relevant to the user (or a team member). For example, the query results may identify and/or describe one or more particular nodes of the path(s) that satisfy one or more terms of the query. In addition, in some embodiments the query may identify and/or describe a relationship(s) between individual identified nodes.

For purposes of discussion, a user and/or the user's team members may be considered to be a domain expert(s) with respect to subject matter that the team works on and/or is responsible for. An example of a team might be a group of developers in an organization that are responsible for, and work on, a particular software product. An individual user may be part of a single team in the organization or, alternatively, part of several different teams.

In some embodiments, the graph analysis module 3010 can utilize one or more algorithms to compute the path data. For example, the graph analysis module 3010 can run a path analysis algorithm on all or part of the graph 3008 to identify (e.g., compute) individual node pairs—each paired node of a node pair serving as an endpoint for a corresponding path. Recall that each paired node of a node pair can be directly connected to the other paired node of the node pair by an edge describing the relationship between the two paired nodes of the node pair. Data (including metadata) describing the node pairs and corresponding edges (and thus the corresponding paths) can be stored as path data.

The graph analysis module 3010 can also run a weighting algorithm on the graph 3008 to compute probability scores for each of the node pairs (and thus for each of the paths) computed by the path analysis algorithm. Alternatively or additionally, the weighting algorithm can also identify (e.g., compute) other node pairs (and thus other paths) of the graph 3008 and compute probability scores for each of the other node pairs. The other identified node pairs may not have been computed by the path analysis algorithm, and thus may not be connected via a path defined by an individual regular expression of the set of inputted regular expressions. Probability scores computed by the weighting algorithm can be included in the path data.

The graph analysis module 3010 can also run a self-join algorithm on the node pairs (paths) computed by the path analysis algorithm. The self-join algorithm can compute additional paths by joining individual node pairs (paths) in the path data. Additional paths can thus include at least two nodes separated (i.e. connected) by one or more intervening nodes and multiple intervening edges. In this regard, an individual additional path may be defined by two nodes serving as endpoints.

Each intervening node and intervening edge in an additional path can serve to explain how and why two other nodes, separated by the intervening node and edge, are connected via a path. As such, the path data can describe the connection between two indirectly connected nodes (i.e., nodes separated by at least one other intervening node) in a particular path.

The self-join algorithm can also compute additional probability scores for each of the additional paths based on the probability scores for the node pairs and/or the other node pairs. Data (including metadata) describing the additional paths, and the additional probability scores for the additional paths, can also be included in the path data. A more detailed discussion of each of these algorithms is provided further below.

In some embodiments, the graph analysis module 3010 can be configured to load a portion of the graph 3008, rather than all of the graph 3008, into memory for use by the path analysis algorithm, weighting algorithm, and/or self-join algorithm. For example, the graph analysis module 3010 may be configured to only load certain nodes and/or edge types associated with the set of regular expressions into memory for use.

In some embodiments, the path data can be stored by the graph analysis module 3010 in a database 3012. The database 3012, and thus the path data stored therein, can be made accessible to various applications. To facilitate the path data being searched/queried, in some embodiments the path data can be organized in the database 3012 as an index or other type of data structure.

In this example, the platform 3000 also includes services 3016 and a query module 3018. The services 3016 can include any suitable type of service (e.g. a web service). The services 3016 can be configured to allow various application(s) 3014 to access the database 3012, graph 3008, and/or query module 3018 via the services 3016. The application(s) 3014 can be any suitable type of application such as a user-accessible front-end application configured to facilitate a user to submit queries to the platform 3000 for instance.

The query module 3018, in turn, can be configured to provide query functionality associated with the graph 3008 and/or the database 3012. For example, the query module 3018 may be utilized to process a query of the path data that is stored in the database 3012. More particularly, the query (which may be submitted by application(s) 3014 for instance) may contain an expression with one or more search terms (e.g., one or more keywords). The query module 3018 may receive the query and in response, search the path data (e.g., the indexed path data) according to the search terms. As a result of searching the data, the query module 3018 can identify and/or return data (i.e., a query results) associated with one or more nodes or paths that satisfy the search term(s). For example, as explained above the data may identify and/or describe one or more nodes of the path(s) and/or one or more relationships between individual nodes.

In some embodiments, each node of the graph 3008 may be uniquely identified by a corresponding Uniform Resource Identifier (URI). In such embodiments, query module 3018 may retrieve the data in the form of tuples of node URIs for the returned path(s). Recall that the returned path(s) may include a path that includes nodes separated (i.e., connected) by at least one intervening node (and two intervening edges). As such, the URI for intervening node, and/or the intervening edges, can describe how and why the separated nodes are connected.

The query functionality provided by the query module 3018 can include some or all of the functionality provided by the exemplary query tool 1230 described above. In some embodiments, the query module 3018 may include additional functionality. For example, in some embodiments the query functionality may include ranking functionality for ranking artifacts and/or paths from the graph 3008 that are described in returned query results. For example, the query module 3018 can utilize a ranking function to rank individual artifacts and/or paths (that include individual artifacts) to be returned in the query results based at least in part on one or more suitable ranking factors. Suitable ranking factors can include, without limitation, one or more of the scoring factors listed in Table 1 above and discussed, for example, in Example 21 above and/or with respect to the graph analysis module 3010 (e.g., probability scores and/or additional probability scores computed by the graph analysis module 3010).

Note that the terms, "module", "tool", "functionality", etc. as used herein may represent software, hardware, firmware, or any combination thereof. Furthermore, also note that the described module(s), tool(s), and functionality described herein can be located at a single site (e.g., as implemented by a computing device), or can be distributed over multiple locations (e.g., as implemented over multiple computing devices).

Crawlers

Recall that the repositories 3006 can include any number and type of repositories and that individual crawlers may be configured to process a corresponding type of repository. Some example crawlers that might be included in the crawlers 3002 are described in detail below. The example crawlers described below can be utilized to process corresponding repositories of the repositories 3006. Individual generated and/or modified artifacts and edges (which may represent individual artifacts and the relationships between individual artifacts) can be stored with metadata such as, without limitation, a start date, an end date, and/or a last modified date. In some embodiments, each artifact can be stored with a corresponding unique URI that uniquely identifies the artifact. Individual artifacts can contain a list or "bag" of words used for indexing and consisting of a concatenation of several strings of metadata specific to each artifact type. Relationships may be defined and stored uni-directionally, while paths through artifacts and edges may be defined and stored bi-directionally such that the paths may be traversed in a forward and/or a backward direction.

Example source code repository crawler: one example type of crawler 3004 is a source code repository crawler which can be configured to process one or more source code repositories of the repositories 3006. Source code crawlers can be configured to analyze various types of source code, such as C, C++, C#, and VBScript source code for instance. In some embodiments, a source code repository crawler can start at a first code check-in and proceed until a recent code check-in. For each code check-in, the list of changed files can be enumerated, and each changed file's differences can be analyzed. In this regard, before snapshots and after snapshots of the modified files can be parsed and compared.

When differences overlap a source code element, the source code element can be considered to have been changed by the code check-in. In some embodiments, code that has been renamed or moved between files may not be tracked. Symbols (i.e., identifiers) contained within analyzed code, including inside method bodies and field initializers, can be stored as nodes in a database table, with metadata columns for the following: symbol name, fully qualified name, type (e.g., class, field, method, operator, etc.), programming language, and nesting depth. A distinct bag of words can also be stored for bodies of symbol definitions (e.g., class definitions and method definitions) to allow for scoped searches. In some embodiments, for each source code symbol definition encountered by the source code crawler, the source code crawler can create two corresponding nodes: a SourceCode definition node (e.g., artifacts 3102(M), 3102(N), and 3102(H) in FIG. 31 described below), and a SourceCode identifier node (e.g., artifact 3102(C) in FIG. 31). A SourceCode identifier node can be used to connect method callers to called methods, uses of variables to their definitions, and/or "Mentions" relationships between text and code in the face of imperfect name resolution (e.g., for code found in text fields).

Relationships between source code symbols, such as "LexicallyEnclosed" (lexical enclosure), "Superclass" (superclass and subclass links), "Calls" (method calls), "Assigns" (variable assignment), "Names" (labels), "Parameter" (parameter of a method or generic type), and "References" (appears in an expression) can be stored as edges of the graph 3008.

Relationships requiring name resolution may not be directly connected. Without perfect build or run-time information and fully linked DLLs, it may not be possible to uniquely link callers and callees to their definitions. Instead, an intermediate non-qualified SourceCode Identifier node may be created. The intermediate non-qualified SourceCode Identifier node may be connected to incoming and outgoing links. When an additional definition of a method is found, edges may not need to be added from all the callers of the methods with the same name to the new definition. Instead, the new definition can be connected to the already existing intermediate non-qualified SourceCode Identifier node.

For example, in the context of .NET assemblies, an additional crawler may crack open .NET assemblies and use a .NET reflection application program interface (API) to read out all of the source code symbols in each DLL. By reading DLLs, within-DLL linking can be already resolved, making it possible to resolve some caller/callee and def/use relationships more precisely than when reading source code alone.

Example employee directory crawler: another example type of crawler is an employee directory crawler which can be configured to process one or more employee directory repositories to discover employee information. For example, the employee directory crawler may analyze employee directory data to discover information, such as information about individual employees, that can be used to generate and/or build the graph 3008. For example, each person in an employee directory can be looked up and their name, email, title, role, department, office address, phone number, picture, manager, etc. can be stored and represented of the graph 3008. Furthermore, each person's manager can also be looked up to create a sub-graph of "Manages" relationships. This look up process can be performed to the root of an organization's management hierarchy for instance.

Example work item crawler: another example type of crawler is a work item crawler which can be configured to process one or more work item repositories. For example, the work item crawler may begin at a first earliest work item and proceed to a recently created work item. Alternatively, the work item crawler can query the work item repositories and process the available work items in an arbitrary order. Since individual work items may have been revised multiple times, each revision can be processed separately.

As a practical example, consider a product such as Microsoft Corporation's Team Foundation Server (TFS) (Microsoft and Team Foundation Server are trademarks of Microsoft Corporation of Redmond, Wash.). An individual work item in TFS may consist of a title, a description, and a set of people who have "changed" the individual item. The rest of the individual work item may consist of a property "bag" or list of fields and values which can be stored in metadata for the individual work item. These fields may be defined by a process template customized for the organization which deployed the TFS repository. As such, a work item crawler configured to process these fields may be configured (e.g., by a domain expert for a particular team) to understand what the fields mean. For example, discovering who a bug is assigned to when analyzing TFS work items would likely include understanding process template definitions (e.g., in a TFS field labeled "System.AssignedTo") whose value may be any string and thus may not necessarily correspond to a person.

In the context of the TFS product example, consider a repository that uses a process template, such as Microsoft Process Template that may be shipped with a TFS product for instance. (Microsoft and Microsoft Process Template are trademarks of Microsoft Corporation). The process template may, for instance, support six types of work items: Value Proposition, Feature Group, Feature, Deliverable, Task, and Bug. Each type of supported work item may be associated with its own defined custom fields. Despite the presence of the process template, a team using the TFS product may put any desired data (possibly subject to one or more loose constraints) into fields of an individual work item's metadata. As such, a configuration file or other information source may be provided (e.g., by the domain expert) to specify which fields of the process template should be analyzed, and to identify data types that each of the specified fields are likely to have.

For example, the process template may suggests the use of the field "System.AreaPath" to specify a work item's component(s). However, the particular team may use this field to specify the milestone for which this work item is active and instead use a custom file (e.g., "Custom.01") to specify the work item's component(s). To analyze relationships in individual work items, it may be necessary to determine which fields have people, code, other work items, URLs, test cases, or a pointer to any other object inside. A configuration file or other information source defined by the domain expert may be used for such a determination.

In this regard, for each field where a type is known (e.g., a person field like "System.ClosedBy"), the work item crawler can analyze an employee database repository or other information source for a person matching that name or email address. Once found, the work item crawler can then create a relationship edge of the graph 3008, between the work item and that person, with an appropriate label (e.g., a "ClosedBy" label). For fields where the type is unknown, or those which may hold natural language (e.g., a title or description field), a set of regular expressions for each object type can be run over the text.

If a word is found that looks like a source code identifier (e.g., "AnnotateString-WithImage"), a "Mentions" edge can be created in the graph 3008 between the work item and a non-qualified source code Identifier node. In this regard, the work item may not be directly connected to a preexisting source code identifier node because the pre-existing source code identifier node may not yet have been discovered by the source work item crawler. When new Source Code nodes are created, they can be connected, if possible, to an appropriate preexisting source code identifier node using a "Names" edge.

Other crawlers: various other types of crawlers can be configured to process various other types of repositories. For example, consider mailing lists (e.g., public mailing lists) and discussion forums. Useful connections can often be derived from public mailing lists and discussion forums, inferring both affinity groups as well as expertise. To accomplish this, one or more crawlers can process individual messages in chronological order, processing the senders and receivers of the individual messages, as well as running regular expressions over text to find textual allusions to other objects.

Web sites, such as Microsoft's Sharepoint repositories, can be processed to find documents relevant to software development. (Microsoft and Sharepoint are trademarks of Microsoft Corporation). For example, in the context of Sharepoint, teams in an organization may store their specifications, meeting notes, marketing information, and legal documents in Sharepoint. The titles and contents of these documents may be processed and stored in the graph 3008 and linked to corresponding authors. In addition, specification documents are often constructed from templates which may indicate one or more developers and/or testers who have or will be working on a particular feature. A crawler can be configured with text recognizer functionality customized to read that section of the document to identify the owners of the feature. The rest of the document may contain names of classes, methods and fields, which can be connected to the source code that eventually is written to implement the feature.

Textual allusions: in some embodiments individual crawlers employed to build a graph, such as the graph 3008, may discover linguistic similarity (e.g., textual overlap) between individual nodes being generated. For example, in at least some repositories, a person's email address may be used to name the person in natural language documents, such as emails or bug reports. When a short word (e.g., eight characters or less) is found in a document, a crawler may search for the word as an email address in an employee directory. If the word is found, the crawler may link that person to a node of the graph 3008 where the word was found with a "Mentions" edge describing the relationship. Thus, a textual allusion in the document to a person in the employee directory can be discovered by the crawler.

Such textual allusions, however, may sometimes result in false positives. For example, an employee named "William Jones" may have the email address "will", which is a common English word that may shows up in many emails and bug reports, including emails and bug reports not referring to William Jones. To address these overzealous connections, individual edges of the graph 3008 may be attributed a corresponding confidence or probability field (e.g., configured to include a floating point number ranging from 0.0 to 1.0). The probability field may be used to store a probability score that indicates the strength of the relationship between the pair of two nodes that the edge connects. A more detailed discussion of probability scores is provided further below.

In some embodiments, structurally-defined edges (such as a lexical enclosure or bug assignment) can be attributed a probability score of 1.0, while other edges derived from using linguistic analysis (to discover email addresses or source code symbols in natural language text) can be attributed a score lower than 1.0. In some embodiments, a weighting algorithm and/or a self-join algorithm can be configured to attribute probability scores to individual pairs of nodes. These algorithms are described in further detail below.

Paths

Recall that any number of different node types and edges might be recognized in a graph, such as the graph 3008 for instance. Also recall that individual nodes, or artifacts, can be connected to one another by one or more edges. Given the connections between individual artifacts, various paths through artifacts and edges can be identified in the graph 3008. The paths may directly and/or indirectly link various individual nodes.

As noted above, each edge of the graph 3008 may connect two paired nodes and describe a relationship between the two paired nodes. The relationship may be defined and stored uni-directionally or bi-directionally. For example, a work item (represented by one of the connected nodes) may be assigned to a person (represented by the other connected node). The relationship of the work item to the person may be defined uni-directionally since the work item is assigned to the person. Furthermore, the edge that indicates or describes the relationship may be defined and stored bi-directionally such that the path between the connected nodes may be traversed in a forward and/or a backward direction.

An individual path of the graph 3008 can be represented by a corresponding regular expression. The regular expression's alphabet can be composed of node labels and edge labels of the graph 3008. More particularly, each term in a regular expression can name/identify a type of node or a type of edge. Each term can be written in a particular order such that one or more corresponding paths with consecutive nodes and edges that correlate with the sequence of ordered terms of the regular expression can be computed, and thus identified. As such, the individual paths of the graph 3008 can be thought of as being defined by a corresponding regular expression.

Regular expressions may be written, or defined, by a user. Individual paths in graph 3008 defined by each of the regular expressions can then be computed, or identified. Each path can effectively provide a solution or answer to the criteria of a corresponding regular expression. By virtue of the regular expressions having been defined by the user, the computed paths can be considered useful, relevant paths to the user and other members of the user's team.

Furthermore, given that the user may be a member of a team and/or have some expertise in a particular domain (i.e., be a domain expert), the computed path may also be useful to other members of the user's team. In this way, the user may effectively codify their knowledge into the regular expressions such that paths that are useful to the user and the user's team can be computed. Furthermore, since the computed path can include individual specific artifacts connected by one or more individual specific relationships (represented by one or more edges), the computed path can provide a relevant answer to a regular expression. More particularly, the computed path can provide an answer in terms of the data mined from the repositories 3006 and represented as individual artifacts and edges of the graph 3008.

Figure 31:
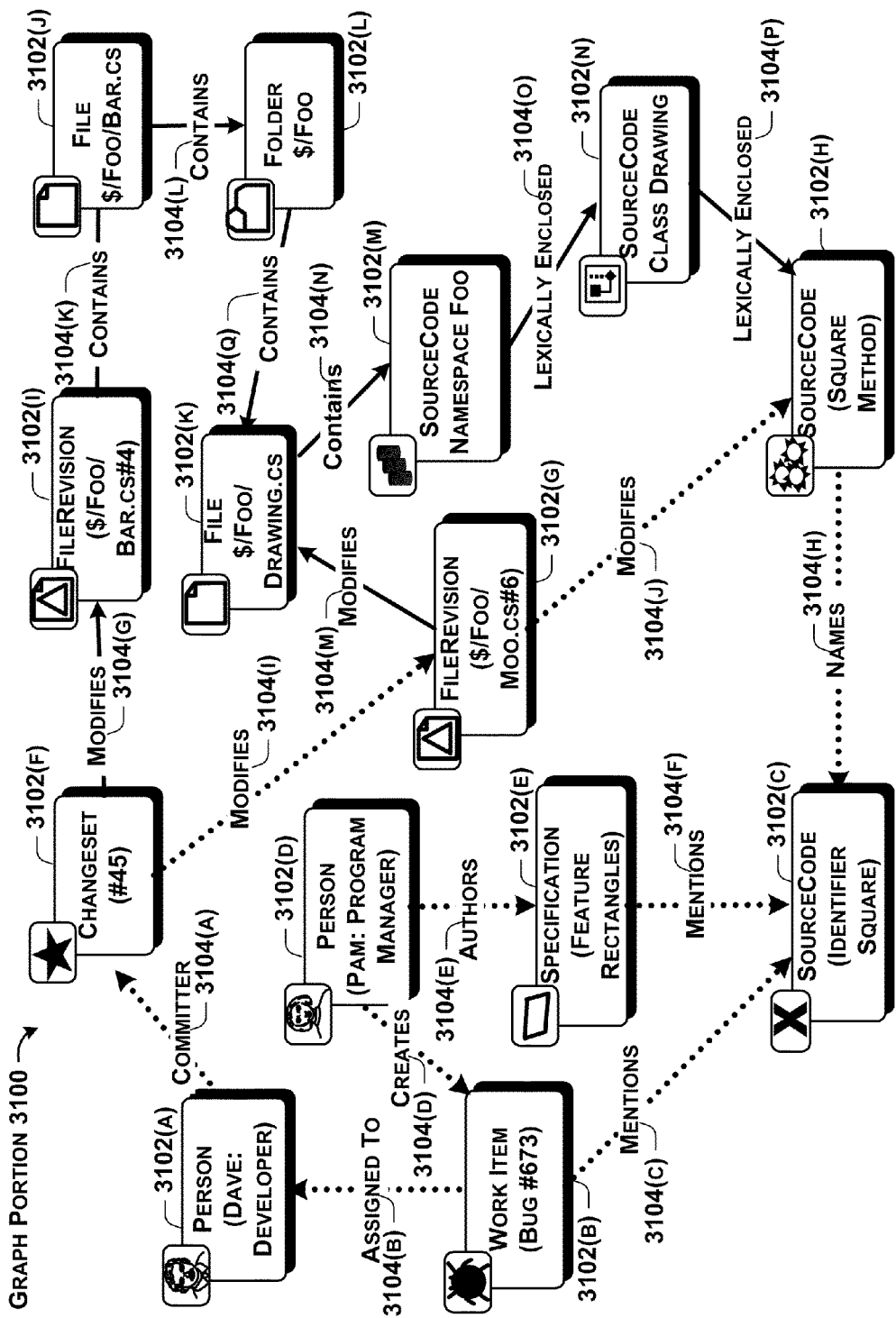
FIG. 31 illustrates an example portion of a graph, in accordance with some embodiments.

To assist the reader in understanding artifacts, edges, and paths, FIG. 31 illustrates a detailed representation of a portion of the graph 3008, generally at graph portion 3100. The graph portion 3100 can be thought of as representing a portion of the graph 3008 by virtue of including less than all of the artifacts and/or edges of the graph 3008. In this example, the graph portion 3100 includes various artifacts 3102(a)-3102(n), and various edges 3104(a)-3104(q). Note that the artifacts 3102(a)-3102(n) include individual artifacts of various different artifact types. For example, the artifact 3102(a) is a person artifact labeled "Person", the artifact 3102(b) is a work Item artifact labeled "Work Item", and the artifact 3102(c) is source code artifact labeled "SourceCode". Note also that the edges 3104(a)-3104(q) include various individual edges of various different edge types. For example, the edge 3104(a) is a committer type of edge labeled "Committer", the edge 3104(b) is an assigned to type of edge labeled "Assigned To", and the edge 3104(c) is a mentions type of edge labeled "Mentions", etc.

Two artifacts of the graph portion 3100 may be connected via a path that includes multiple edges and one or more other artifacts. Thus, the two artifacts may be directly connected via a single edge, or be indirectly connected via one or more other artifacts and via multiple edges. By traversing the path, the relationship between the two artifacts can be discovered and represented.

Consider, for example, the dotted lines represent a path through various nodes and edges. More particularly, to find the program manager responsible for the Square method (represented by the SourceCode artifact 3102(h)), the source code Identifier Square (represented by the SourceCode artifact 3102(c) can be identified being named by the Square Method. Furthermore, the Feature Rectangles specification (represented by the Specification artifact 3102(e)) can be identified as mentioning the source code Identifier Square. Pam the Program Manager (represented by the Person artifact 3102(d)) can then be identified as the author of the Feature Rectangles specification. Furthermore, Dave the Developer can be identified as a person who works with Pam because the Square Method, which the Pam artifact (artifact 3102(d)) connects and points to via the Feature Rectangles specification (artifact 3102(e)), was named (3104(h)) by the SourceCode artifact (3102(h)) that was contained in a file (3102(g)) modified by a changeset (3102(f)) checked in by Dave. Also, Pam created the work item Bug #673 (represented by the WorkItem artifact 3102(b)) which is assigned to Dave the Developer. Bug #673 mentions Identifier Square which is named by the Square Method.

The example paths described above in the graph portion 3100 can be described, and thus defined, by regular expressions. For example, a first regular expression might be: "PersonAuthors SpecificationDocument Mentions SourceCodeIdentifier NamedBy SourceCodeMethod.". To connect the Square Method to Dave the Developer, the following regular expression might be added: "SourceCodeMethod ModifiedBy FileRevision ModifiedBy Changeset CommittedBy Person." To connect Pam the Program Manager to Dave the Developer via Bug #673, the following regular expression might be added: "Person Created WorkItem AssignedTo Person." As explained above, the alphabet of these regular expressions can be nodes and edges (represented by their edge labels) from the graph. Sequences of these edge labels can include optional operators such as, without limitation, optional elements (?), loops, or sequences of one or more, or zero or more elements (+,*), alternation(s), or choosing between two possible elements (|) and grouping (which expresses associativity of the optional operators) (( . . . )).

After each edge label, a regular expression author (e.g., a user) may write an edge label-specific suffix (e.g. "ModifiedBy", or "ContainedWithin") to indicate the direction of the relationship in the regular expression. For example, in the regular expression "Person ManagedBy Person", the person on the right is the manager of the person on the left. A domain expert on a team can both read and write these regular expressions based on their knowledge of team's (e.g., a software development team) work practices and procedures.

Paths belonging to different types of teams may appear different. For example, paths associated with a first team where members have relatively rigidly-defined roles (e.g., developer, tester, and program manager) may look different than another type of team where the members' roles are less rigidly defined. Furthermore, as described below, path constraints can be used to determine which particular artifacts and/or edges, and thus paths, are visible to a particular user and/or team.

Path Constraints

In some embodiments, path constraints can be implemented to restrict, or opt-out, certain users from seeing certain artifacts and/or edges (and thus paths) of the graph 3008. Consider for instance one team in an organization that, due to restrictions (e.g., legal regulations, organizational rules, etc.), should not be able to view or otherwise access certain artifacts and edges describing relationships between those artifacts. In such situations, the metadata for individual artifacts and edges to be opted out may be modified accordingly based on a user's profile. This may include prohibiting those artifacts and edges from being viewed or otherwise discovered, removing those artifacts/edges from a particular user or users graph, and/or preventing the certain user(s)'s graph from being generated to include those artifacts/edges. In some embodiments, a configuration file can be kept that designates certain artifacts and/or edges to be opted out. For example, certain privacy laws/regulations may not allow a certain user(s) (e.g., based on a corresponding user profile(s)) to have access and/or knowledge to certain types of information that is, or might be, represented in certain artifacts/edges of a particular graph. As such a corresponding configuration file may prohibit the certain artifacts and/or edges from being generated into the particular graph, or may restrict access or discovery by the certain user(s) of the certain artifacts/edges Recall that the graph analysis module 3010 can be configured to utilize algorithms to analyze the graph 3008 and obtain meaningful, relevant information in a customizable and extensible manner. Also recall that three example path algorithms were described briefly above. To assist the reader in understanding the techniques described herein, each of these three example algorithms are described in further detail below.

Example Path Analysis Algorithm

As explained above, in some embodiments the graph analysis module 3010 may run a path analysis algorithm on the graph 3008 to compute individual node pairs. Each node pair can include paired nodes that serve as endpoints of an individual path through the graph 3008. In operation, a set of one or more individual regular expressions describing individual corresponding paths in the graph 3008 can be input into the path analysis algorithm. As explained above, individual regular expressions may be defined by a user and can represent a question or other type of statement that can be answered by identifying one or more of the individual corresponding paths. The path analysis algorithm can then compute node pairs, and thus paths, based on the set of regular expressions. The path analysis algorithm can store information describing the individual node pairs (e.g., node labels, node metadata, corresponding edge labels, corresponding edge data, etc.) as path data in database 3012. In some circumstances, two or more computed node pairs may include the same node. In other words, a single node may serve as an endpoint in two different paths. For example, consider the paths A-B and B-C. Node B serves as a node endpoint in path A-B and in path B-C.

By providing the path analysis algorithm with the set of regular expressions and storing the path data in the database 3012, the number of nodes and/or edges of the graph 3008 that are processed/considered by the path analysis algorithm (and thus the weighting and self-join algorithms) can be significantly reduced. Consider, for instance, a situation where the graph 3008 is relatively large (e.g., contains thousands of nodes and/or thousands of edges). It may be impractical or infeasible for the graph analysis algorithm to consider each node of the graph 3008 in response to each received query. More particularly, considering each node in such a situation might be on the order of $O(n^3)$—with many useless paths potentially being identified. Limiting the graph analysis algorithm to considering the nodes and edges represented by the regular expressions, rather than each node in graph 3008, can thus result in scalability and computational efficiency (e.g., on the order of $O(n^2)$). Furthermore, by storing the results as path data, duplicate path computation in response to multiple submitted queries can be avoided.

In some embodiments, the performance of the path analysis algorithm can be further enhanced (e.g., optimized) in a variety of ways. For example, as described in more detail above, one or more portions of the graph 3008, rather than all of the graph 3008, can be loaded for use (e.g., processing) by the path analysis algorithm. As such, a graph of significant size (thousands or millions of nodes and/or graphs) can be loaded for use by the graph analysis module 3010 with comparatively modest computing resources (e.g., a desktop or laptop computer with 2 GBs of RAM), and in a reasonable amount of time (e.g., approximately one hour or less).

Another way in which the performance of the path analysis may be enhanced is by reducing the number of nodes of the graph 3008 that the path analysis algorithm considers. More particularly, one or more nodes (and one or more corresponding edges) of the graph 3008 can be pruned prior to the graph 3008 being processed by the path analysis algorithm. The resulting pruned portion of the graph 3008, rather than all of the graph 3008, may then be processed. Any suitable module, tool, functionality, and/or component of platform 3000 can be configured to prune the one or more nodes. For example, in some embodiments the graph analysis module 3010 can be configured to utilize the path analysis algorithm and/or another algorithm to prune the one or more nodes. In this regard, in some embodiments, information about the graph 3008 provided by the crawler(s) 3004 (e.g., when generating the graph 3008) can be used to prune the node(s).

The one or more nodes can be pruned in any suitable way. For example, recall that the example source code crawler described above can create a SourceCode definition node and a SourceCode identifier node for each source code definition encountered by the source code crawler. In this regard, in some embodiments at least two types of situations can be identified in which a particular SourceCode Identifier node can be pruned.

First, in some circumstances a SourceCode Identifier node may exist without a corresponding definition when: (a) a textual allusion to the SourceCode Identifier is made (e.g., in a source code comment, work item, email, etc.), but (b) the SourceCode Identifier node was not realized in source code. In such a situation, the SourceCode Identifier node may be considered a mistake and thus be pruned.

Second, in some situations there may not be any "Calls", "References", or "Mentions" links to a SourceCode Identifier node. In such a situation, the SourceCode Identifier node may be pruned as well.

Example Implementation

In some embodiments, the path analysis algorithm can be implemented as a type of algorithm known as a regular language reachability (RLR) algorithm. The RLR algorithm can run in $O((|V|+|E|)|S|)$ time for a single origin node, and in time $O(|V|(|V|+|E|)|S|)$ for all origins; wherein V is the number of nodes in a graph (e.g., the graph 3008), E is the number of edges in the graph, and S is the number of states in a state machine created when a set of one or more regular expressions is compiled.

A graph, such as the graph 3008 for example, may have a power-law edge distribution: a few first nodes in such a graph may have many edges compared to other second nodes of the graph which may have comparatively few edges. Typically in such a graph, $|E|$ is within two or three times $|V|$. As such, it can be surmised that the time complexity for all-pairs regular language can be $O(|V|^2|S|)$. In some embodiments, the RLR algorithm can be started once at each node in the graph 3008 to look for node pairs between all the pairs of nodes in the graph (all-pairs regular language reachability).

To avoid impractical complexity, computing paths using the RLR algorithm may include enumerating/returning endpoints rather than details of each path connecting each node considered by the RLR algorithm. For example, a regular expression representing two endpoints (nodes) of an individual path may be provided. Thus, the question "is there any path between A and B?" may be answered. However, in many circumstances it may computationally undesirable and/or impractical to configure the RLR algorithm to enumerate/return the full path (each node and edge) connecting each node considered by the RLR algorithm (of which there may be an infinite number due to using loops in a regular expression). For example, configuring the RLR algorithm with sufficient discriminatory power to report each single path between two nodes would likely cause a significant level of algorithmic complexity. For example, configuring the RLR to return/enumerate all-pairs shortest path constrained by a set of inputted regular expressions could raise the complexity of the algorithm to $O(|V|^3|S|)$, which may be impractical for reasonably sized graphs.

Example Weighting Algorithm

The graph analysis module 3010 can also run a weighting algorithm on the graph 3008 to compute probability scores for each of the node pairs, and thus for each of the paths, computed by the path analysis algorithm. For example, recall that these node pairs may be connected to one another by, and thus form, a path (via an edge) that is defined by at least one of the regular expressions. The probability scores for these paths can be included in the path data. As such, these paths may be referred to as regular expression paths. As described above, each of these node pairs can include two nodes separated by a single edge. As such, each of the two nodes can be considered to be directly connected to the other node by the single edge. For example, a probability score may be computed for directly connected node pairs A,B and B,C. Probability scores can be indicative of the strength of the relationship, and thus connection, between the connected nodes.

Alternatively or additionally, the weighting algorithm can also identify other node pairs of the graph 3008 and compute probability scores for each of the other node pairs. The other identified node pairs may not have been computed by the path analysis algorithm, and thus may not be connected via a path defined by an individual regular expression of the set of inputted regular expressions. Accordingly, such paths may be referred to herein as non-regular expression paths. Individual other node pairs of these non-regular expression paths may be connected by any number of intervening edges and may or may not be connected by one or more intervening nodes.

Probability scores computed by the weighting algorithm can correspond to any suitable type of value and any suitable value range. For example, in some embodiments, the weighting algorithm can compute individual probability scores in the following fashion based on a range from 0.0 to 1.0, with 0.0 representing little or no relationship strength and 1.0 representing a comparatively high relationship strength.

In some embodiments, for each of node pair connected by a regular expression path (i.e., for each node pair computed by the path analysis algorithm), the weighting algorithm can assign a standard probability score of 1.0 to that node pair. For each other node pair connected by a non-regular expression path, a probability score in a range of 0.0-1.0 for that node pair can be computed based on the extent of linguistic similarity between the two paired nodes that form that other node pair. Alternatively, in some embodiments a probability score in a range of 0.0-1.0 can be computed for each node pair connected by a regular expression path and for each node pair connected by a non-regular expression path. In other words, in such embodiments, each node pair connected by a regular expression may not be assigned a standard probability score and instead can be assigned a computed probability score of 0.0-1.0 in a manner similar to node pairs connected by a non-regular expression path.

The extent of the linguistic similarity can thus represent the strength of a relationship between two paired nodes. In this regard, recall for example that mentions can be detected by a graph builder tool (e.g., by a recognizer) or other suitable functionality. For example, recall from above that an email might be processed such that one or more mentions of a software item(s) can be recognized in the plain text of the email, which can be represented in a graph as an email node. More particularly, if a mention of a bug 50 is detected in the email node for example, a new node for the bug 50 (a bug 50 node) can be created (if such a node does not already exit). Regardless, since a detected mention of bug 50 exists in the email node, there is a linguistic similarity (and thus a relationship represented as an edge) between the email node and the bug 50 node.

Furthermore, recall from Example 15 above that edges between nodes (e.g., the email node and the bug 50 node) can be weighted to represent a semantic strength relationship, or linguistic similarity, between the two nodes. For example, if several mentions are detected between the email node and the bug 50 node, the extent of the linguistic similarity between these nodes may be considered larger than if only one mention is detected between these nodes. Similarly, in this example the weighting algorithm can detect a level of linguistic similarity between paired nodes of a node pair and then effectively weight the edge(s) of the node pair accordingly by assigning a respective probability score according to the detected linguistic similarity.

In operation, the weighting algorithm can process all or part of the graph 3008 to build an inverted index of text metadata for some or all of the nodes of the graph 3008. Then, for each individual text term (e.g. word) in the inverted index, the weighting algorithm can compute a corresponding term weight ($weight_{term}$) that is inversely proportional to the frequency that the individual text term occurs in the inverted index. The computed term weight scores can then be added to the path data stored in the database 3012 (describing the individual node pairs that are connected by a non-regular expression path). Recall that in at least some embodiments, the path data can be organized in the database 3012 as an index. Accordingly, in such embodiments the computed term scores may be added to the index.

For each node pair identified in the path data that is connected via a non-regular expression, the weighting algorithm can then determine the extent of linguistic similarity, such as textual overlap, between the two paired nodes of that node pair by computing one or more preliminary probability scores for each text term (if any) that occurs in both of the paired nodes. The one or more preliminary probability scores can thus be thought of as representing the extent of linguistic similarity between the paired nodes. The weighting algorithm can then compute a probability score (i.e. a final probability score) for the respective node pair based on the preliminary score(s). In other words, the weighting algorithm can compute the probability score based on the extent of linguistic similarity between the paired nodes. More specifically, one possible way to compute the weight for a node pair connected via linguistic similarity is as follows: Each term in the inverted index is assigned a score 1.0/number of nodes containing that term. The weight for a pair of nodes that share a number of terms is the 1 minus product of the weights subtracted from 1.0, i.e., $1.0-(1.0-weight_{term1})*(1.0-weight_{term2})* \ldots *(1.0-weight_{term\ n})$.

The probability score for a node pair (connected via a non-regular expression) can be determined in any suitable way. For example, in some embodiments when a single preliminary probability score is computed for the node pair, the preliminary probability score can equal the respective node pair's probability score. When multiple preliminary probability scores are computed for the respective node pair, the multiple preliminary scores can be combined together according to a formula to provide the respective node pair's probability score. As such the value of an individual probability score for a node pair can be based at least in part on the number of different textual connections (i.e., different overlapping text terms) between the node pair in addition to the number of times each specific text term overlaps. In other words, the value of an individual probability score can be based on both the frequency that each text term occurs in each paired node of a node pair, and the number of text terms that each node pair have in common.

In some embodiments, to compute the weight for a non-regular expression path (and in some embodiments a regular expression path) consisting of edges $e_1, e_2, \ldots, e_n$, the product of the weights for its edges is used, i.e., $weight(e_1)*weight(e_2)* \ldots *weight(e_n)$ Node pairs can be connected through multiple paths such as $path_1, path_2, \ldots, path_n$ (which can be based on regular expressions or not) with different probability scores $score_{path1}, score_{path2}, \ldots, score_{pathn}$, respectively. The individual scores can be combined into a single probability through various functions:

Average($score_{path1}, score_{path2}, \ldots, score_{pathn}$)
Maximum($score_{path1}, score_{path2}, \ldots, score_{pathn}$)
$1.0-(1.0-score_{path1})*(1.0-score)* \ldots (1.0-score_{pathn})$
And others.

Recall that in some embodiments, individual edges of the graph 3008 may be attributed a corresponding confidence or probability field (e.g., configured to include a floating point number ranging from 0.0 to 1.0). The probability field may be used to store a probability score that indicates the strength of the relationship between the pair of two nodes that the edge connects. Accordingly, in some embodiments, individual probability scores corresponding to a node pair may be stored as metadata in a probability field of the edge connecting the two nodes of the node pair.

Example Self-Join Algorithm

The graph analysis module 3010 can also run a self-join algorithm on the results of the path analysis algorithm and the weighting algorithm. Based on the results, the self-join algorithm can identify (e.g., compute) additional paths other than the paths defined by the node pairs computed by the path analysis algorithm. More particularly, in operation the self-join algorithm can join individual node pairs to create the additional paths. The additional paths can indirectly link individual nodes of the linked node pairs. Each of the additional paths can thus be defined by two node endpoints that are indirectly connected to one another. Furthermore, each of the additional paths can include at least one intervening node. For example, node pairs A,B and B,C may be joined to create a additional path A-C. Additional path A-C indirectly links example nodes A and C, both of which serve as node endpoints defining an additional path A-C. Furthermore, additional path A-C includes intervening node B, which (along with the edges connecting node B with node A and node B with node C) can serve to describe the connection between A and C.

The self-join algorithm can also provide metadata for the additional paths. For example, the self join algorithm can provide metadata identifying intervening nodes and/or edges of computed additional paths. This information can serve to explain the reason (e.g., how and why) an additional path was computed. For example, for additional path A-C, metadata for B that describes B (e.g., node B's regular expression label, etc.) can be provided. This metadata serves to explain that B (and B's corresponding edges) are the reason that additional path A-C was computed.

As another example, the self join algorithm can also compute additional probability scores for each additional path. These additional probability scores can be computed in any suitable way. For example, in some embodiments an additional probability score for each additional path can be computed from the probability scores of each node pair of the additional path. For example, this may include the node pairs computed by the path analysis algorithm (having a corresponding probability score of 1.0) and the other node pairs of the graph 3008 (having a corresponding probability score ranging from 0.0-1.0).

In some embodiments, the additional paths computed by the self-join analysis can be further constrained using another set of regular expressions. These regular expressions can contain an alphabet that is the type of the nodes in the graph and the edges of the graph, and also includes the type "Mentions", computed (e.g., by the weighting algorithm above) and type named for each regular expression (e.g., computed by the Path analysis algorithm described above). Computed paths that do not conform to a regular expression may be discarded.

As a result of the graph analysis module 3010 running the path analysis algorithm, weighting algorithm, and self-join algorithm, path data of weighted paths described by the inputted regular expressions can be computed and stored in the database 3012. The weighted paths can include artifacts that are connected via one or more edges that describe the relationships between the artifacts. The path data can thus be thought of as a collection of pre-computed possible answers customized for each of the regular expressions inputted into the path analysis algorithm.

Application(s) 3014 can utilize the query functionality of query module 3018 to query database 3012 and return relevant results in an efficient and customizable manner. In contrast, if path data for the inputted regular expressions was not pre-computed and stored prior to queries being received, all nodes of the graph 3008 would likely need to be processed in response to each query.

Recall that the services 3016 can be configured to allow the one or more application(s) 3014 to access the database 3012, the graph 3008, and/or the query module 3018 via the services 3016. Accordingly, some specific examples of the application(s) 3014 that may be implemented in accordance with the described techniques are discussed in detail below.

Example Application

Hoozizat

In the context of software development, many common information needs can be identified. Individual information needs can be expressed in the form of a question. Table 6 below lists four example questions, each representing an example of a common information need:

TABLE 6

Who (e.g., engineer(s), developer(s), tester(s), program manager(s), operations, leads, etc.) should be contacted about a particular feature, API, product, or service?
Who owns a particular code product or has ever worked on the that code product in the past?
Who owns a particular specification and/or is knowledgeable about the that specification?
Which teams own the feature, product or service that I and/or my team depend on?

In some embodiments, an example application of the application(s) 3014, referred to herein as Hoozizat, can be configured to leverage a graph (e.g., graph 3008) to provide answers to questions, such as those in Table 6 above. (HOOZIZAT is a trademark of Microsoft Corporation of Redmond, Wash.). For discussion purposes, in this example Hoozizat will be described in the context of being implemented as a web search portal application of the application(s) 3014.

Consider the following example scenario. Xin, a software developer, has found a bug in his code. However, Xin did not do anything to cause the bug other than to update a library he was using that was written by another team within his software company. Xin believes the bug is caused by some change to this library, but does not know whether the bug is due to his own misconceptions in using the code or due to a bug in the library itself. If the code is not public and has not yet been shipped, Xin may be unlikely to find any useful information in this regard by searching the Internet or other public information source. Therefore, Xin would like to find someone from the library team who can look at his code and tell him if anything is wrong with his code. If there is a bug in the library's implementation, he would like to tell someone on that team to file a bug report. Alternatively, if there is a bug or other problem in the specification, Xin would like to find the person on the library team responsible for managing the library's specification to report the bug/problem.

Xin might be able to eventually discover the appropriate person or persons in his organization to contact (i.e. the appropriate contact person(s)) by searching through various organizational information sources, such as Intranet portals, employee directories, etc. Xin may also start contacting colleagues hoping to eventually be referred to the appropriate contact person(s). However, conducting such searches and contacting colleagues in such a manner will likely be extremely time consuming and inefficient.

As an alternative approach, by utilizing the techniques described herein, Xin can use Hoozizat to query the platform 3000 to expediently and efficiently find the appropriate contact person(s). For example, Hoozizat can be provided with access to path data in the database 3012, the graph 3008, and/or the query module 3018 via services 3016.

Accordingly, for discussion purposes assume Xin or another member of Xin's team had defined a set of regular expressions that were used by the graph analysis module 3010 as input. Also assume that the graph analysis module 3010 has computed and stored path data based on the set of regular expressions in the database 3012. As explained above, the path data can be thought of as a collection of previously computed (i.e., pre-computed) answers customized for each of the regular expressions. Accordingly, Hoozizat can utilize the query functionality of the query module 3018 to query the path data stored database 3012 for information regarding the appropriate contact person(s).

In this regard, Hoozizat can provide query results to Xin that actually identify the appropriate contact person(s) (e.g., person artifact(s)) rather than just individual artifacts representing source code, bug reports, or other such items. Furthermore, other people (e.g., other person artifacts) that are associated with the contact person(s) can also be identified. As such, recommendations for alternative persons to contact can be made. This may be helpful when, for instance, the appropriate contact person(s) is on vacation or otherwise unavailable when Xin needs to talk to them. To assist the reader in understanding how Hoozizat can provide such results, a brief discussion of the concepts of artifact ownership and associates is provided below followed by an example user interface that may be presented by Hoozizat.

Artifact owners: in some embodiments, query results returned by Hoozizat that include artifacts can be augmented to include other artifacts that are associated with the artifacts. In this way, individual artifacts that satisfy the query's term(s) can be returned along with other associated artifacts that may, or may not, satisfy the query's term(s). More particularly, each result that identifies a returned artifact can be augmented to also include a list of people who are owners of that artifact. This can be especially useful for artifacts that do not represent people. An artifact owner can be defined in any suitable way through regular expressions which can serve to describe the relationship (via edges) between a particular artifact and one or more owners. For example, an artifact owner might be thought of as a person (as represented by a person artifact) who has made changes to the particular artifact or that has been assigned to the particular artifact. One or more artifacts representing an artifact owner(s) can be included with a corresponding artifact in a query result.

Augmenting query results with artifact owners can allow a user, such as Xin, to quickly and easily find someone who can answer questions about a particular artifact of interest—such as an artifact returned in response to a query from Xin. Consider, for example, the following example regular expressions which may be used to augment query results to include one or more artifact owners:

"File ModifiedBy FileRevision ModifiedBy Changeset-CommittedBy Person"
"SourceCode ModifiedBy FileRevision ModifiedBy ChangeSet CommittedBy Person"

"WorkItem((Mentions| . . . |DuplicateOf) WorkItem*
(AssignedTo|CreatedBy| . . . |ResolvedBy||ClosedBy)
Person Artifact associates: in some embodiments, query results returned by Hoozizat that include a person artifact can be augmented to include a list of one or more associates (e.g., other people) for the person artifact. An artifact owner can be defined in any suitable way through regular expressions which can serve to describe the relationship (via edges) between a particular artifact and one or more associates. For example, an artifact associate might be thought of as a person (as represented by a person artifact) who works closely with another person (represented by another person artifact) who is included in query results.

Some associate relationships might be simple. For example, Alice and Bob might be considered associates if they both modified the same artifact, such as if Alice committed a changeset that modified a source code that was also modified by another changeset committed by Bob. Other relationships might be more complex. For example Alice and Bob are associates if Alice created a work item that may be a duplicate of one or more work items that mention source code that has been edited by Bob.

Figure 32:
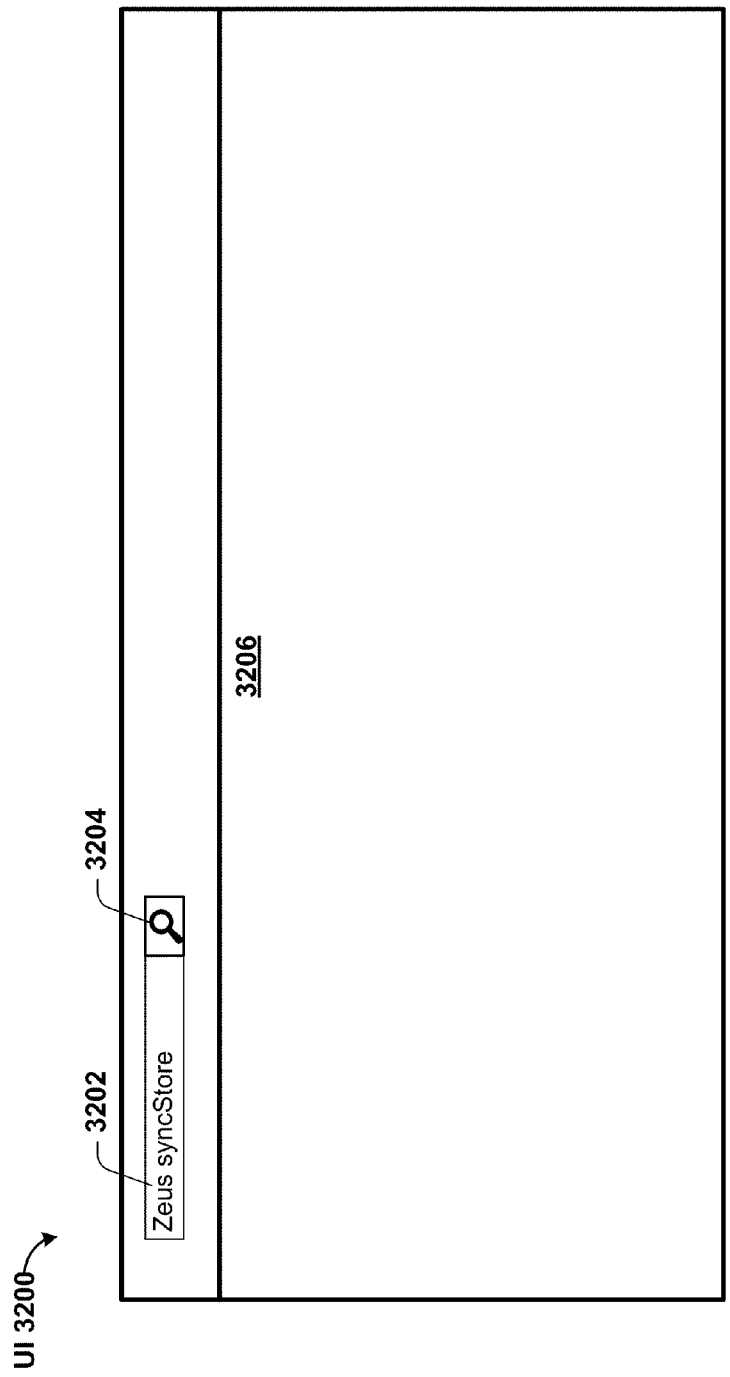
FIGS. 32-35 illustrate screenshots of an example user interface, in accordance with some embodiments.

Augmenting query results with artifact owners can assist a user, such as Xin, to identify other team members of a person who is included in a query result as an appropriate contact person. Consider, for example, the following example regular expressions which may be used to augment query results to include one or more artifact associates:

Person Commits Changeset Modifies FileRevision Modifies SourceCode ModifiedBy FileRevision ModifiedBy ChangeSet CommittedBy Person Person CreatedWorkItem (DuplicateOfWorkItem)*Mentions SourceCodeIdentifier NamedBy SourceCode ModifiedBy FileRevision ModifiedBy Changeset CommittedBy Person Hoozizat can present query results in a user interface (e.g., a web-based interface) in any suitable way. As but one example, consider FIG. 32 which illustrates an example user interface (UI), generally at 3200, which may be implemented in accordance with some embodiments. In his example, the UI 3200 includes a search box 3202 in which a user (e.g., Xin) may enter one or more search terms that may be submitted to the platform 3000 by Hoozizat as a query. The UI 3200 also includes a search control 3204 (e.g., "button") that may be activated (e.g., by selecting and clicking the button) to submit the search term(s) entered in the search box 3202. The UI 3200 also includes a results region 3206 in which query results can be returned and displayed in a useful way.

For purposes of discussion, assume here that the user is Xin and that Xin is interested in a method called "syncStore" from a code component called "Zeus" because the syncStore method has caused Xin's code to crash. However, Xin does not know why the syncStore method has caused his code to crash. Therefore, now assume Xin enters the search term "Zeus syncStore" in search tool box 3202 and activates search control 3204. As a result, a query that includes the search term "Zeus syncStore" can be submitted by Hoozizat to platform 3000.

As described in detail above, in some embodiments Hoozizat might utilize query functionality of the query module 3018 to query path data stored in the database 3012 and to return query results to Hoozizat. Recall that the path data may include pre-computed paths, and thus pre-computed answers, that correlate with a set of expressions that were previously inputted into to the path analysis algorithm by the graph analysis module 3010.

Figure 33:
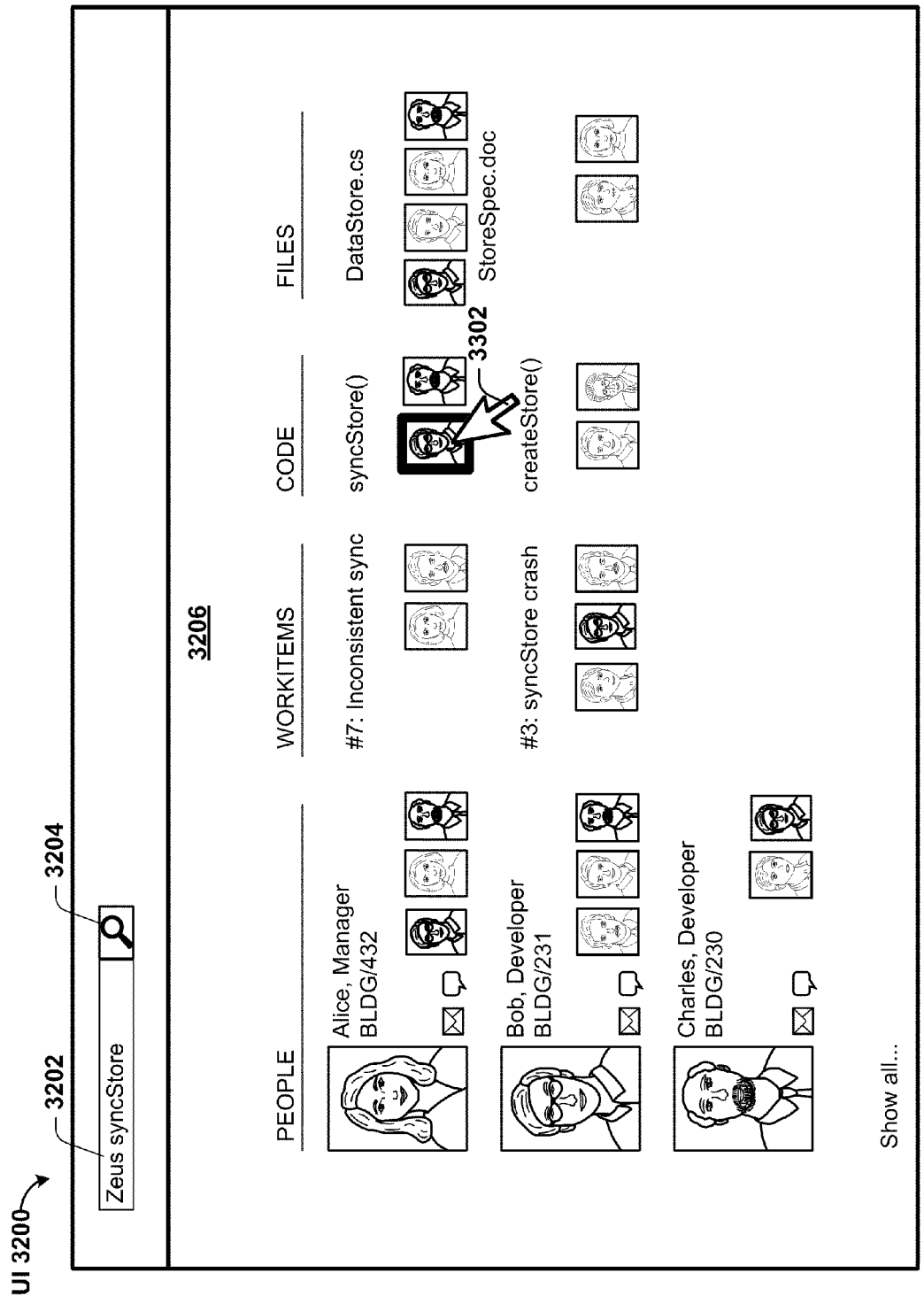

Now assume that the query results have been returned to Hoozizat and have been organized and displayed in the results region 3206 of UI 3200, as illustrated in FIG. 33. In this regard, note that in this example the results are grouped by artifact type. More particularly, a first column on the left is labeled "PEOPLE" and includes individual people artifacts that have been included in the query results. For example, a person artifact representing Alice is included in the PEOPLE column. Similarly, the columns to the right of the PEOPLE column are labeled "WORKITEMS", "CODE", and "FILES" respectively, with each column including corresponding artifacts.

Also note that the results shown in results region 3206 include additional information about each of the displayed artifacts. For example, contact information for each of the person artifacts, such as each person's role or job title, building number, email address (here via a link), chat address, etc., is included. Furthermore, next to each artifact, a list of icons (pictures) depicting people who are related to that artifact (e.g., related owner artifacts and/or associate artifacts) are also included.

Figure 34:
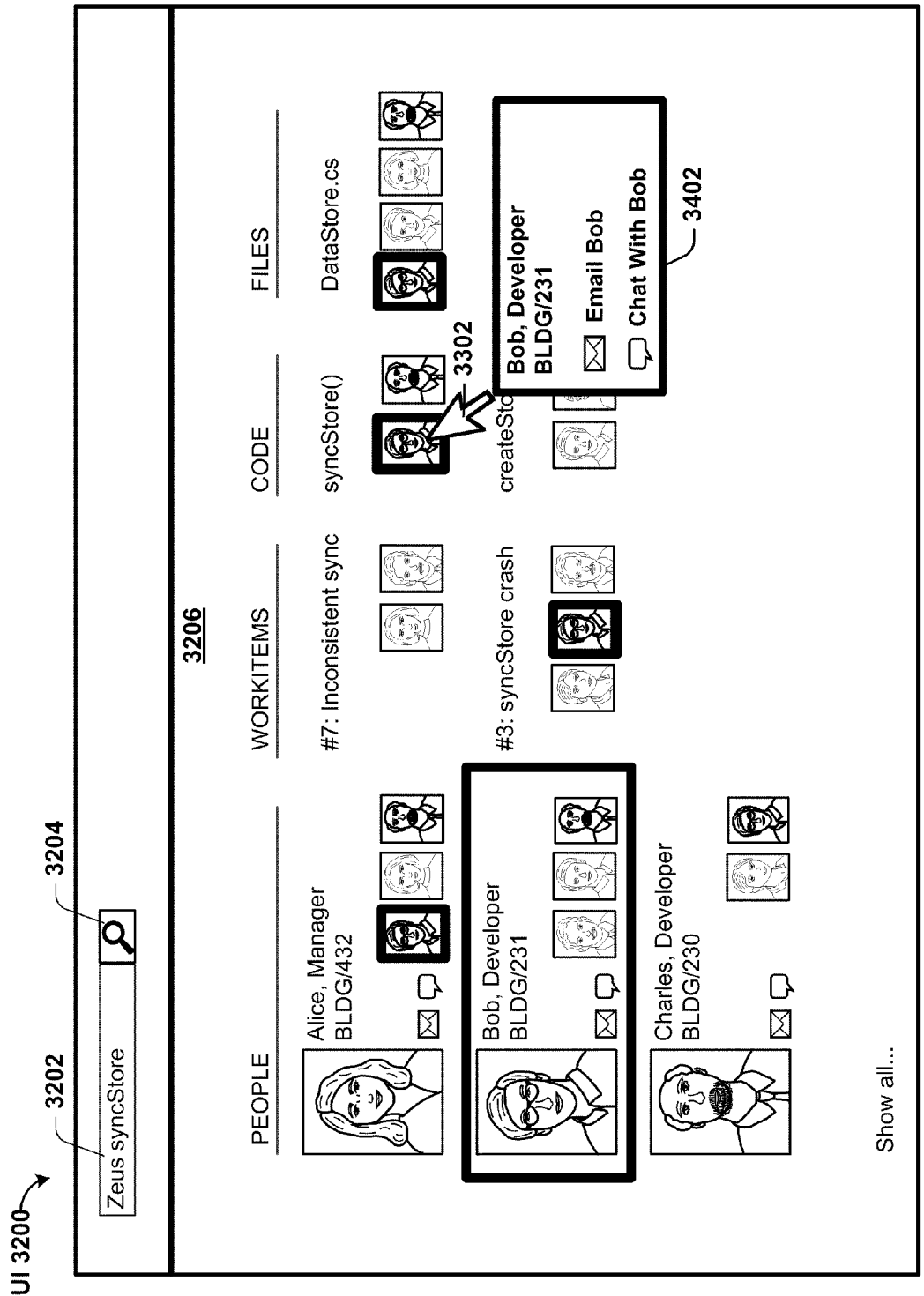

Continuing, next assume that Xin determines that Bob is the expert that he wishes to contact since Bob's icon is listed (under the CODE column) first (e.g., ranked first utilizing the above described ranking function) in the list of people related to the method syncStore( ) under the CODE column. Xin can therefore use his mouse or other input device to cause a pointer 3302 to hover over Bob's icon under the CODE column. As shown in FIG. 34, as a result of the pointer 3302 hovering over Bob's icon, additional artifacts that Bob is related to (e.g., worked on, owns, is associated with, etc.) can be highlighted—as shown by the darkened borders surrounding the various icons for Bob in the results region 3206. In addition, a pop-up information window 3402 can be displayed near pointer 3302. The pop-up information window 3402 can include contact information for Bob to facilitate Xin contacting Bob if he chooses to do so.

Next, assume that Bob is out of the office and is thus not available for Xin to contact. Xin may then easily identify another person to contact for the synStore method since icons for people related to the person artifact representing Bob are listed next to Bob in the PEOPLE column. As explained above, these people may be artifact associates of Bob with expertise similar to Bob's expertise.

Figure 35:
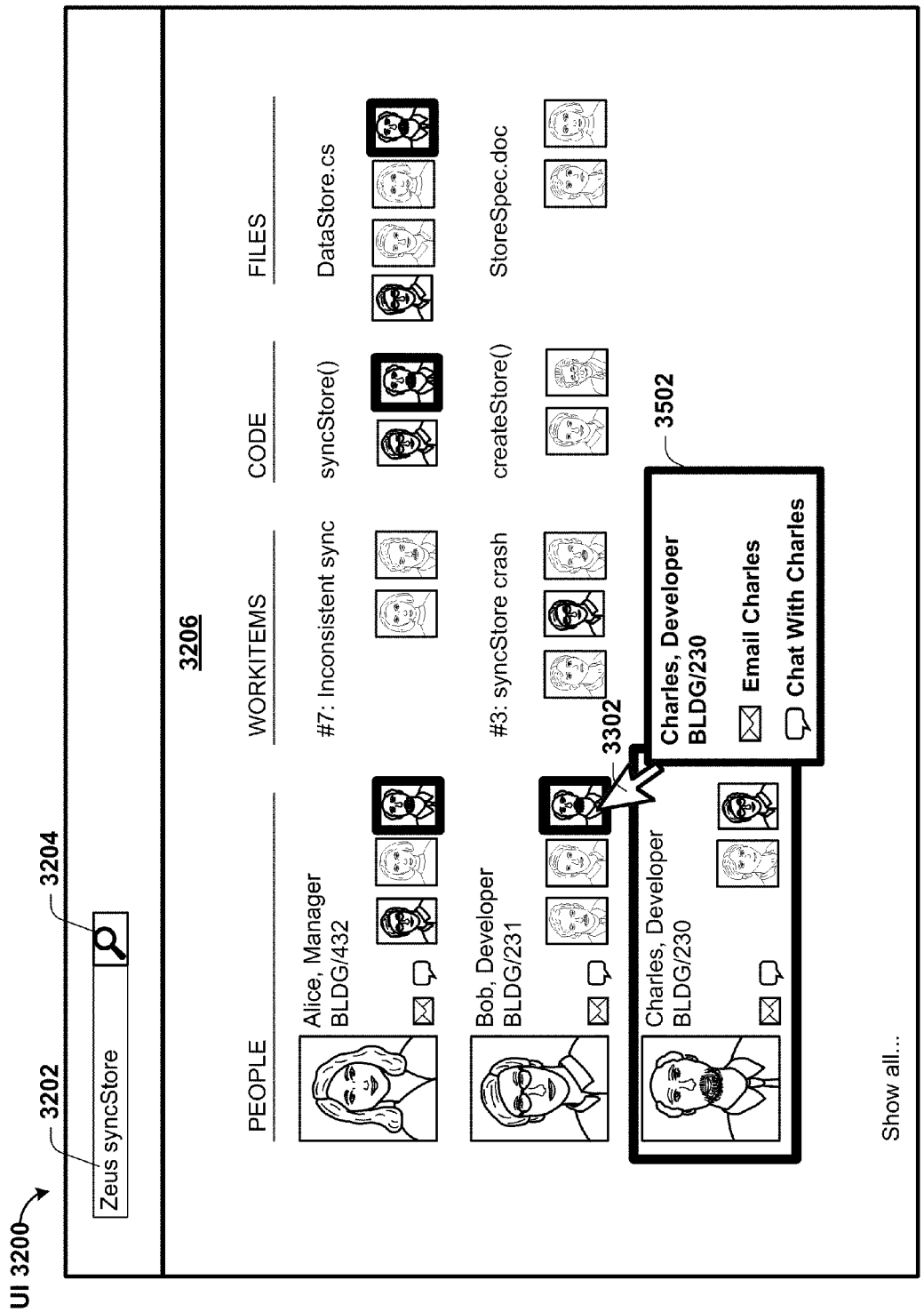

Here, assume that Charles is the next expert Xin wishes to contact since Charle's icon is listed first (e.g., ranked first utilizing the above described ranking function) in the list of people associated with Bob (i.e., with Bob's artifact). Xin can therefore use his mouse or other input device to cause the pointer 3302 to hover over Charle's icon, as shown in FIG. 35. As shown in FIG. 35, as a result of the pointer 3302 hovering over Charle's icon, additional artifacts that Charles is related to (e.g., worked on, owns, is associated with, etc.) can be highlighted—as shown by the darkened borders surrounding the various icons for Charles in the results region 3206. In addition, a pop-up information window 3502 can now be displayed near pointer 3302. The pop-up information window 3502 can include contact information for Charles to facilitate Xin contacting Charles if he chooses to do so.

Example Application

Why was a Particular Change Made?

As noted above, individual information needs can be expressed in the form of a question. In the context of software development, another example question representing a common information need is: "why was a particular change made?"

An application configured to answer this question might display a chronologically sorted (e.g., reverse chronologically sorted) list of events showing events that have happened to that software code symbol in the software development history of that symbol, including code changes, work items and messages from discussion forums that refer to that symbol for instance. One or more of these events can be discovered by the following example paths (described by regular expressions), each of which starts from a SourceCode artifact:

"SourceCode ModifiedBy FileRevision ModifiedBy Changeset"

"SourceCode MentionedBy SourceCodeIdentifier MentionedBy Changeset"

"SourceCode MentionedBy SourceCodeIdentifier MentionedBy WorkItem"

"SourceCode MentionedBy SourceCodeIdentifier MentionedBy DiscussionForumPost"

Example Discovery Application

In the context of software development, additional example questions representing common information needs might be: "who is using our code?", "who might be affected by a change to code or application program interface (API)?", and "who outside of my team depends on a feature, API, product, or service I am working on and/or responsible for?" Consider, for example, an organization that produces both applications and frameworks. A framework team may not be aware of every other individual or team who is using their framework. This may make it difficult to notify code dependents when one or more breaking changes are to be made. In some embodiments, a discovery application can thus be configured to mitigate this issue by discovering individual persons who may be affected by breaking changes. The discovery application may discover when a person in a particular team edited a particular source code which may be called by code edited by another person that does not belong to the team. For example, consider the following path (described by a regular expression):

"Person Committed ChangeSet Modifies FileRevision Modifies SourceCode CalledBy SourceCode NamedBy SourceCode ModifiedBy FileRevision ModifiedBy ChangeSet CommittedBy Person"

Once this example path is computed, the discovery application can filter results of the regular expression describing this path by limiting the results to those where the "Person" at the beginning of the path belongs to the particular development team and the "Person" at the end of the path does not belong to the particular team. A user interface of the discovery application can provide (e.g., display) the results and action items (e.g., one or more contact links, etc.) for contacting calling method owners to inform them of the breaking changes.

Example Awareness Application

Another example question representing a common information need might be: "are there recent changes that affect my code or work items?". When teams collaborate as part of a large project, a member of one team may assign a work item to a member of another team. Tracking the status of work items assigned across teams may be difficult and frustrating because one team's independent work may not be transparent to the other team. The work item can be delayed due to poor communication, differing priorities, or forgotten altogether because no one may advocate for the work item.

In some embodiments, an awareness application can be configured to mitigate this issue by improving transparency between teams. More particularly, by discovering people who have referred to a work item from another work item, people who have worked on code mentioned by related work items, or source code changed by related work items, can be found. Transparency between various teams can thus be improved. For example, consider the following paths (each described by a regular expression):

"WorkItem ((Mentions| . . . |DuplicateOf) WorkItem)* (AssignedTo|CreatedBy| . . . |ResolvedBy|ClosedBy) Person"

WorkItem ((Mentions| . . . |DuplicateOf) WorkItem)*Mentions (SourceCode ModifiedBy FileRevision ModifiedBy)? Changeset CommittedBy Person,"

WorkItem ((Mentions| . . . |DuplicateOf) WorkItem)*Mentions Changeset Modifies FileRevision Modifies Source Code"

Once the work item has been assigned, a newsfeed of the assignee's activities can be followed to watch the assignee's progress on the work item. Browsing a newsfeed for the assignee's team may provide context about the team's changing deadlines and priorities.

Example Operating Environment

Figure 36:
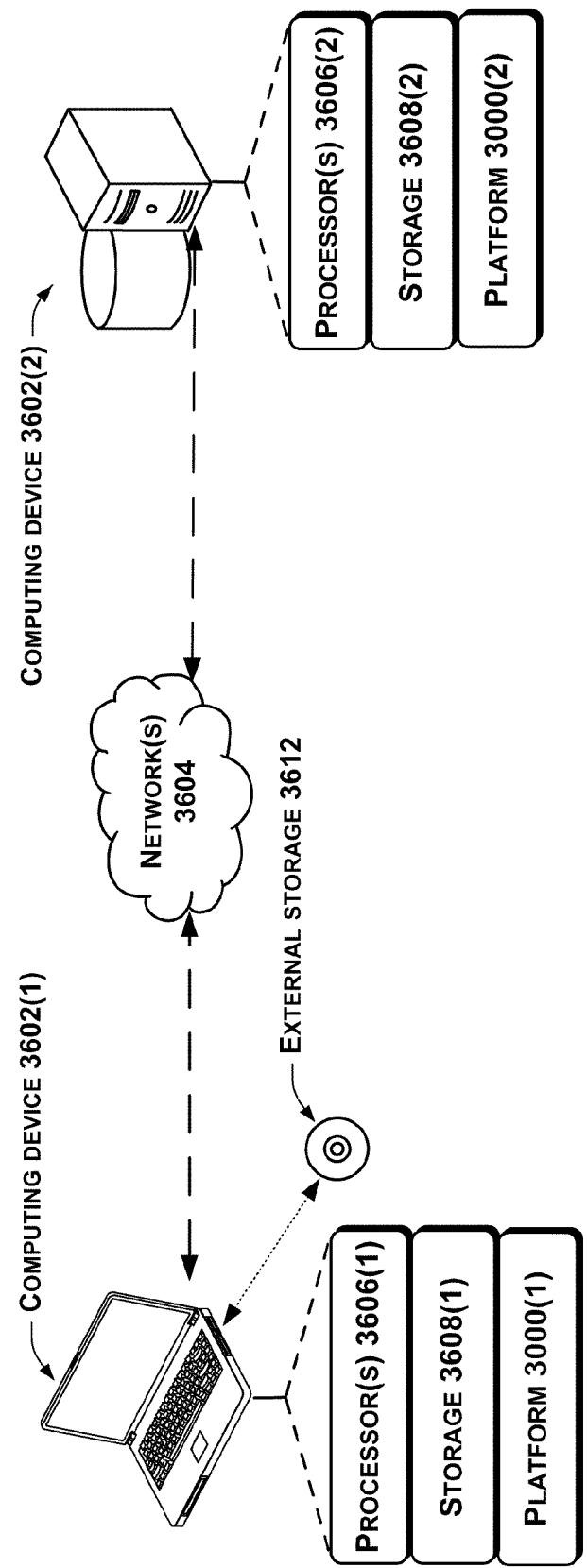
FIG. 36 illustrates an example operating environment, in accordance with some embodiments.

FIG. 36 illustrates an example operating environment 3600 in which the described graph analysis and querying techniques may be implemented, in accordance with some embodiments. For purposes of discussion, the operating environment 3600 is described in the context of the platform 3000. As such, like numerals from FIG. 30 have been utilized to depict like components. However, it is to be appreciated and understood that this is but one example and is not to be interpreted as limiting the platform 3000 to only being implemented in the operating environment 3600.

In this example, the operating environment 3600 includes first and second computing devices 3602(1) and 3602(2). These computing devices can function in a stand-alone or cooperative manner. Furthermore, in this example, the computing devices 3602(1) and 3602(2) can exchange data over one or more networks 3604. Without limitation, the network(s) 3604 can include one or more local area networks (LANs), wide area networks (WANs), the Internet, and the like.

Here, each of the computing devices 3602(1) and 3602(2) can include a processor(s) 3606 and storage 3608. In addition, either or both of these computing devices can implement all or part of the platform 3000, including: the graph builder tool 3002, graph 3008, graph analysis module 3010, database 3012, services 3016, and/or the query module 3018 for example.

As noted above, the platform 3000 (e.g., the crawler(s) 3004) can be configured to process data from the repositories 3006 to generate and/or modify the graph 3008. The platform 3000 (e.g., the query module 3018) can also be configured to receive and process queries. As such, either or both of computing devices 3602(1) and 3602(2) may be configured to receive such data and/or such queries.

Processor(s) 3606 can execute data in the form of computer-readable instructions to provide a functionality. Data, such as computer-readable instructions, can be stored on storage 3608. The storage 3608 can include any one or more of volatile or non-volatile memory, hard drives, optical storage devices (e.g., CDs, DVDs etc.), among others.

Devices 3602(1) and 3602(2) can also be configured to receive and/or generate data in the form of computer-readable instructions from an external storage 3612. Examples of external storage can include optical storage devices (e.g., CDs, DVDs etc.) and flash storage devices (e.g., memory sticks or memory cards), among others. The computing devices may also receive data in the form of computer-readable instructions over network(s) 3604 that is then stored on the computing device for execution by its processor(s).

As mentioned above, either of computing devices 3602(1) and 3602(2) may function in a stand-alone configuration. For example, the graph builder tool 3002, graph 3008, graph analysis module 3010, database 3012, and services 3016, and the query module 3018 may be implemented on computing device 3602(1) (and/or external storage 3612). In such circumstances, the described defragmentation techniques may be implemented without communicating with network 3604 and/or computing device 3602(2).

In another scenario, part of platform 3000 may be implemented on computing device 3602(1), while another part of platform 3000 may be implemented on computing device 3602(2). In such a case, communication between the computing devices might allow the described graph analysis and querying techniques to be implemented.

In still another scenario computing device 3602(1) might be a thin computing device with limited storage and/or processing resources. In such a case, processing and/or data storage could occur on computing device 3602(2) and/or upon a cloud of unknown computers connected to network(s) 3604. Results of the processing can then be sent to and displayed upon computing device 3602(1) for the user.

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices.

Example Methods

Figure 37:
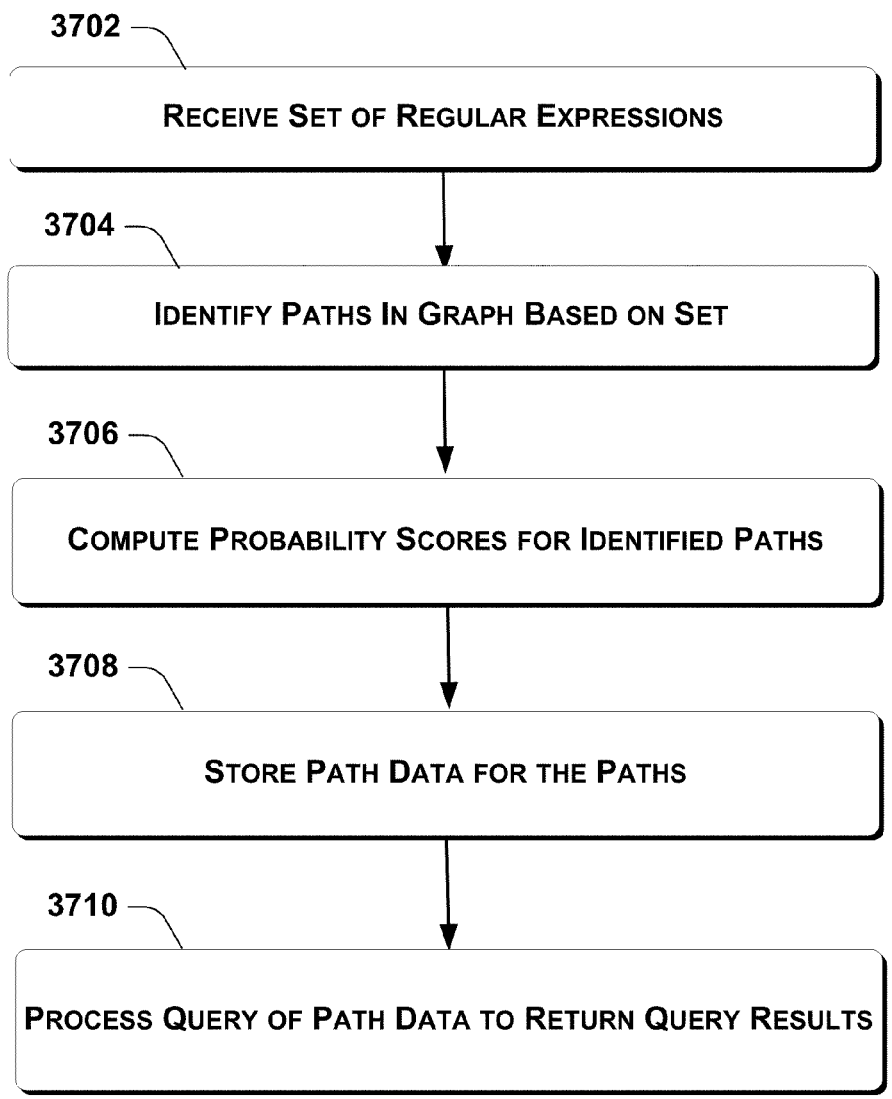
FIGS. 37 and 38 illustrate example methods, in accordance with some embodiments.
Figure 38:
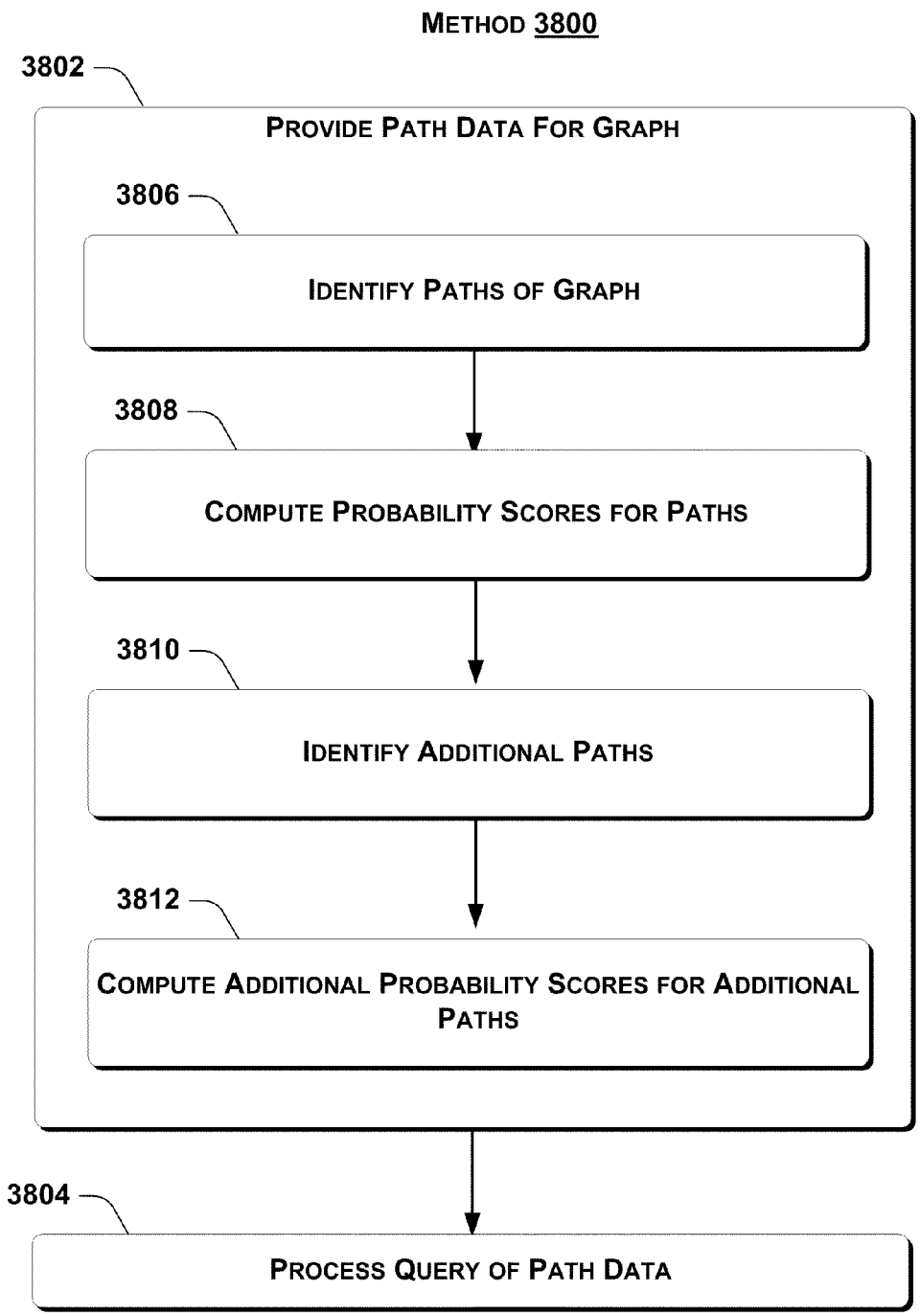

FIGS. 37 and 38 illustrate flowcharts of example processes, techniques, or methods, generally denoted as method 3700 and method 3800 respectively, that are consistent with some implementations of the described techniques. The orders in which the methods 3700 and 3800 are described are not intended to be construed as a limitation, and any number of the described blocks in each of these methods can be combined in any order to implement the method, or an alternate method. Furthermore, each of these methods can be implemented in any suitable hardware, software, firmware, or combination thereof such that a computing device can implement the method. In some embodiments, one or both of these methods are stored on a computer-readable storage media as a set of instructions such that, when executed by a computing device(s), cause the computing device(s) to perform the method(s).

Regarding method 3700 illustrated in FIG. 37, block 3702 receives a set of one or more regular expressions as input. Recall that the regular expression(s) can be defined by a user and thus can define paths in a graph that are useful to the user and/or the members of the user's team. Therefore, the set can be used to compute paths in a graph that are useful.

Block 3704 identifies paths in a graph, such as the graph 3008 for instance, based on the set of regular expression(s). For example, recall that in the context of the graph 3008, the graph analysis module 3010 can utilize a path analysis algorithm on the graph 3008 to compute individual paths defined by at least one of the regular expressions (i.e., regular expression paths). Also recall that the graph analysis module 3010 can utilize a weighting algorithm to identify other paths that may not be identified by one of the regular expressions (i.e., non-regular expression paths). Also recall that path analysis algorithm can further utilize a self-join algorithm to compute additional paths by joining individual paths computed by the path analysis algorithm. Individual additional paths can include at least two nodes separated by one or more intervening nodes and edges.

Block 3706 computes probability scores for the identified paths. For example, as explained in detail above, the graph analysis module 3010 can utilize a weighting algorithm and a self-join algorithm to compute probability scores for each of the identified paths. This may include assigning a standard probability score (e.g., 1.0) to regular expression paths and/or computing individual probability scores (e.g., ranging from 1.0 to 1.0) based on a linguistic similarity between individual paired nodes of the graph 3008.

Block 3708 stores path data for the identified paths. For example, the path data can be stored in a searchable location (e.g., the database 3102) that can accessed (e.g., searched) by one or more applications (e.g., application(s) 3014). Without limitation, the path data may include data identifying the identified paths and/or metadata about the individual identified paths (including the probability scores computed at block 3706).

Block 3710 processes a query of the path data to return query results. For example, query functionality of the query module 3018 can be utilized to search the path data in response to a query from the user of a team, or another team member of the user's team, to return query results associated with (e.g., describing) one or more paths that satisfy the query and that are relevant to the user (or a team member). For example, the query results may identify and/or describe one or more particular nodes of the path(s) that satisfy one or more terms of the query. In addition, in some embodiments the query results may identify and/or describe a relationship(s) between individual identified nodes.

Regarding method 3800 illustrated in FIG. 38, block 3802 provides path data for a graph (e.g., the graph 3800) and block 3804 processes a query of the path data to return query results. As explained above, the query results may describe one or more paths (and thus one or more nodes) that satisfy the query (i.e., that satisfy the query's search terms). In some embodiments, processing the query can include ranking multiple nodes of the graph to be returned in the query based at least in part on one or more suitable ranking factors, such as computed probability scores and/or computed additional probability scores that can be computed by the graph analysis module 3010 for instance.

In this example, block 3802 includes blocks 3806 through block 3812. More particularly, block 3806 identifies paths in a graph, such as the graph 3008 for instance. For example, as explained above, in some embodiments the graph analysis module 3010 described above can receive a set of one or more regular expressions and utilize the set to compute the paths.

Block 3808 computes probability scores for the paths identified at block 3806. For example, as described in detail above, the graph analysis module 3010 can assign one or more standard scores to individual paths (identified at block 3806) and/or compute individual probability scores for the individual paths based on linguistic similarities between individual paired nodes.

Block 3810 identifies additional paths of the graph. For example, as described in detail above, in some embodiments the graph analysis module can utilize a self-join algorithm to join individual paths identified at block 3806. As a result, individual additional paths can include two or more of the paths identified at block 3806.

Block 3812 computes additional probability scores for the additional paths computed at block 3810. For example, as described in detail above, the graph analysis module 3010 can utilize the self-join algorithm to compute individual additional probability scores based on individual probability scores that were computed for the paths identified at block 3806. In other words, block 3812 can compute the additional probability scores based on the probability scores computed at block 3808.

The invention claimed is:

1. A computing device comprising:
   one or more hardware processors; and
   one or more hardware memory devices or hardware storage devices having instructions stored thereon that, when executed by the one or more hardware processors, cause the one or more hardware processors to:
   identify paths in a graph, wherein one or more of the identified paths are defined by a set of regular expressions, nodes of the graph represent software development items and are separated by edges describing relationships between individual nodes, and the one or more of the identified paths have corresponding nodes and corresponding edges arranged consecutively that correlate with one or more corresponding sequences of ordered terms in the set of regular expressions;
   compute probability scores for the one or more of the identified paths; and
   store path data for the one or more of the identified paths in a searchable location accessible by one or more applications, wherein the path data includes the computed probability scores,
   wherein the software development items represented by the nodes of the graph include programming language constructs.

2. The computing device of claim 1, wherein the instructions cause the one or more hardware processors to:
   process a query of the path data to identify one or more query results associated with an individual identified path that is defined by an individual regular expression; and
   return the one or more query results in response to the query, wherein the one or more query results satisfy one or more terms of the query.

3. The computing device of claim 2, wherein the individual identified path comprises two nodes separated by an intervening node and intervening edges.

4. The computing device of claim 3, wherein one or both of the intervening node or the intervening edges describe a connection between the two nodes in the individual identified path.

5. The computing device of claim 1, wherein the instructions cause the one or more hardware processors to compute the probability scores by computing at least one individual probability score based on a linguistic similarity between two individual paired nodes of the graph.

6. The computing device of claim 5, wherein the instructions cause the one or more hardware processors to compute the probability scores by:
   determining an extent of linguistic similarity between the two individual paired nodes; and
   based on the extent of linguistic similarity, computing the at least one individual probability score.

7. The computing device of claim 1, wherein the instructions cause the one or more hardware processors to:
   process a query of the path data to identify query results associated with at least two of the identified paths; and
   rank the at least two of the identified paths based at least in part on one or more of the computed probability scores.

8. The computing device of claim 1, wherein the instructions cause the one or more hardware processors to:
   load less than an entirety of the graph in memory before the paths of the graph are identified and before the probability scores are computed.

9. The computing device of claim 1, wherein the instructions cause the one or more hardware processors to:
   prune a portion of the nodes of the graph before the paths of the graph are identified.

10. A system comprising:
    a graph builder configured to represent software development items as nodes of a graph and to detect relationships between individual nodes of the graph;
    a graph analysis module configured to utilize a set of one or more user-defined regular expressions to compute path data for paths of the graph, wherein one or more of the paths are defined by an individual user-defined regular expression, and wherein individual paths comprise two or more of the nodes and at least one edge describing at least one of the relationships;
    a query module configured to:
    receive a query, and
    responsive to receiving the query, search the path data and return query results describing at least one of the paths; and
    at least one hardware processor configured to execute the graph builder, the graph analysis module, and the query module.

11. The system of claim 10, wherein the graph analysis module is further configured to:
    load a portion of the graph into memory prior to computing the path data; or
    prune one or more nodes of the graph prior to computing the path data.

12. The system of claim 10, wherein the graph analysis module is further configured to compute probability scores for the paths, and wherein at least one of the probability scores is computed based on linguistic similarity between at least two nodes of the at least one path described in the query results.

13. The system of claim 12, wherein the least one path described in the query results comprises a plurality of described paths, and wherein the query module is further configured to rank the plurality of described paths based at least in part on one or more of the probability scores.

14. The system of claim 10, wherein the at least one path described in the query results includes two paired nodes separated by an intervening node and intervening edges, and wherein one or both of the intervening node or the intervening edges describe a connection between the two paired nodes.

15. A method performed by a computing device, the method comprising:
    providing path data for a graph based on a set of regular expressions, wherein providing the path data comprises:
    identifying paths of the graph, wherein at least one of the identified paths is defined by an individual regular expression of the set, and wherein the identified paths include nodes representing software development items and edges describing relationships between individual nodes, computing probability scores for individual identified paths, identifying additional paths, wherein individual identified additional paths comprise two or more of the identified paths, and computing additional probability scores for the identified additional paths based on the computed probability scores; and processing a query of the path data to identify query results that satisfy the query, wherein processing the query comprises ranking multiple nodes to be included in the query results based at least in part on one or more of the computed probability scores or the computed additional probability scores.

16. The method of claim 15, wherein computing the probability scores for the individual identified paths comprises assigning a standard probability score to at least one of the individual identified paths.

17. The method of claim 15, wherein computing the probability scores for the individual identified paths comprises computing individual probability scores for one or more of the individual identified paths based on linguistic similarities between individual paired nodes of the one or more individual identified paths.

18. The method of claim 17, wherein computing the individual probability scores comprises:

determining an extent of textual overlap between the individual paired nodes; and based on the extent of textual overlap, computing the individual probability scores.

19. The method of claim 15, further comprising restricting access to one or more of the nodes based on a user profile.

20. The method of claim 15, wherein the software development items include a person.

21. The method of claim 15, wherein:

the software development items represented by the nodes of the graph include software developers, object classes, methods, software bugs, code check-ins, and source code changes, and the relationships described by the edges of the graph indicate that:

a first one of the software development items contains a second one of the software development items, a third one of the software development items mentions a fourth one of the software development items, a fifth one of the software development items was sent by a first one of the software developers and received by a second one of the software developers, and a sixth one of the software development items was authored by a third one of the software developers.

* * * * *